United States Patent [19]

Woodrum

[11] Patent Number: 5,628,002
[45] Date of Patent: May 6, 1997

[54] BINARY TREE FLAG BIT ARRANGEMENT AND PARTITIONING METHOD AND APPARATUS

[76] Inventor: Luther J. Woodrum, P.O. Box 1847, Poughkeepsie, N.Y. 12601

[21] Appl. No.: 970,399

[22] Filed: Nov. 2, 1992

[51] Int. Cl.$^6$ ........................................................ G06F 7/24
[52] U.S. Cl. ................................. 395/607; 395/898
[58] Field of Search ....................... 395/600, 800, 395/898

[56] References Cited

U.S. PATENT DOCUMENTS

| | | | |
|---|---|---|---|
| 4,181,821 | 1/1980 | Pirz et al. | 179/1 |
| 5,018,201 | 5/1991 | Sugawara | 381/43 |
| 5,131,055 | 7/1992 | Chao | 395/25 |
| 5,317,507 | 5/1994 | Gallant | 364/419.13 |
| 5,317,741 | 5/1994 | Schwanke | 395/700 |

OTHER PUBLICATIONS

M. Mano, "Digital Logic and Computer Design" Prentice–Hall, pp. 145–149. 1979.
G. Salton "Automatic Text Processing" Addison–Wesley pp. 328–338, 1989.

Primary Examiner—Thomas G. Black
Assistant Examiner—Jack M. Choules
Attorney, Agent, or Firm—Joseph B. Taphorn

[57] ABSTRACT

Arrangement of fields in binary tree nodes provides a minimal storage encoding storing fixed and variable length keys in factored form in a multilevel tree. A locating method, and apparatus embodying that method, directed by an argument key, which may or may not be stored in the tree, traces a path following arcs upward or downward between nodes in said binary tree, starting from the top node or any other node, until it finds either the argument key or the delta arc where said argument key would be inserted into said tree. The novel binary tree encoding also provides for path tracing starting at a data backpointer field, which allows accessing of neighboring data entries in collating sequence order.

18 Claims, 5 Drawing Sheets

BINARY TREE FLAG BIT ARRANGEMENT AND PARTITIONING METHOD AND APPARATUS

Table of Contents

Table of Contents
Introduction
Background of the Invention
Prior Art
Summary of the Invention
Claims
Abstract
Drawings

BACKGROUND OF THE INVENTION

1. Field of the Invention

This invention relates to a binary tree arrangement storing fixed or variable length keys, and a method and apparatus for locating the insert arc or node in such an arrangement.

2. Introduction

The invention provides a novel binary tree arrangement for a machine representation storing both fixed and variable length keys, together with their lengths, organized by the nodes and connections between nodes in said binary tree. The arrangement minimizes the storage required for the machine representation of said nodes, connections, keys and their lengths.

The invention provides method and means for controlling the locating step(s) of a binary tree insertion operation, It uses a principle based on a minimal difference or a maximal similarity relationship among the keys stored in the tree.

The embodiments of this invention include unique methods and apparatus for controlling the execution of a computer. This application describes the steps performed and the machine representation in sufficient detail that a person skilled in the art can make and use them in hardware, microprogram, or program. Thus the inventions can be utilized in either a special purpose or general purpose computer system.

The invention provides the control logic for said insertion method in a binary tree having said novel binary tree arrangement, said control logic minimizing the number of storage accesses and stores for carrying out said locating step(s) and inserting operation, and minimizing the amount of elapsed time required for a machine to execute said operations.

The invention provides both method and means for said control logic that is especially suited for direct use in a special purpose apparatus for executing the subject processes, and especially suited for incorporation in a reduced instruction set computer (RISC) in the form of instructions which can be executed in a single cycle.

The methods and apparatus of the invention provide economic advantage for sorting and indexing, which are heavily used in commercial computing environments; especially providing a competitive economic advantage for computer execution of database operations and associative classes in object oriented programming, logic programming, and constraint logic programming.

DESCRIPTION OF THE PRIOR ART

The prior art includes publications such as "Sorting and Searching", by D. E. Knuth, published in 1973 by Addison Wesley. The prior art also includes the following U.S. patents: U.S. Pat. No. 3,916,387 "Directory Searching Method and Means", and U.S. Pat. No. 4,086,628 "Directory Generation System Having Efficiency Increase with Sorted Input."

The above prior art apply to searching and inserting in binary trees, where a forward path trace is followed by a backward path trace to complete an insert. The path trace utilizing the forward and backward path trace to locate the insert arc enables the prior art to locate the insert arc by processing a number of nodes approximately equal to 1.4 times the base two logarithm of the number of keys in the tree, plus the nodes on the backward path trace.

The prior art includes "Blasting Through The Information Theoretic Barrier With FUSION TREES", by Michael L. Fredham and Dan E. Willard, published in the Proceedings of the 22-nd ACM Symposium on Theory for Computing, (1990), pp. 1–7. In this prior art, multiplication is used to select bits of a .key in order to form an index into a complete binary tree having a number for entries that is an exact power of two.

This prior art utilizes an insertion method requiring polynomial time for new nodes in a multiway tree. As a result, claims for faster sorting in this prior art apply only to enormously large numbers of entries, as the "constant" time to use for each sub-logarithmic operation is so huge that it would require having trillions of entries before the time is competitive with other art.

More closely related prior art is "New Trie Data Structures Support Very Fast Search Operations", by Dan E. Willard, published in the Journal of Computing and System Sciences, volume 28, in 1984, pp. 379–394. In this prior art, two keys are stored at each binary tree node. Searching and inserting follow a downward path trace, starting from a top node. Said two keys are selected from the left and right subtrees, respectively, of said binary tree node. Said downward path trace proceeds by forming two quantities by exclusive-oring a new key with said two stored keys, and then comparing the two quantities. The lower of the two quantities determines whether the new key directs the downward path trace into said left or said right subtree of said node.

Also stored at each binary tree node are pointers to the subtrees of said node. Thus the space requirements are at least four words per entry, and in practice are more, because of the encoding of terminal nodes. No means nor method for backtrace is provided.

The above prior art mentions forming a multilevel tree structure by utilizing trees for each level, wherein the keys are restricted to the word length of the machine. The first level is thus represented by a first level tree. At the end of each path in the first level tree is a pointer to a next level tree for the next word in the key, and so on. No encoding methods, no arrangements of the fields to accomplish the multilevel encoding, are disclosed. The above prior art does not provide for variable length keys, except for U.S. Pat. No. 3,916,387 which does not elaborate the actual representation for variable length key support.

In the prior art U.S. Pat. No. 3,916,387 no part of any key is stored in the tree, but all locating is done by means of bit testing. It is somewhat similar to the Fusion Tree methods, except that the Fusion Tree methods espouse the use of multiplication for decoding multiple bits for path tracing.

SUMMARY OF THE INVENTION

Accordingly, it is an object of the invention to provide a faster means and method for locating the insert arc in a binary tree.

Another object of the invention is to provide a binary tree arrangement and insertion method and apparatus that is simpler and easier to use.

The subject invention locates the insertion are by processing a number of nodes which could actually be less than the base two logarithm of the number of tree entries. It locates the insert are on a forward path trace, stopping when it first processes the insert arc. Thus is does not necessarily trace the complete forward path; nor does it effect a backward trace.

In case the lengths of the paths in the binary tree are not evenly distributed, the above prior art locates an insertion are in a number of steps equal to the length of the path to and already-existing entry plus the number of arcs traced along the backpath, whereas the subject invention never requires more steps to locate an insertion point than the length of the path, and on the average requires fewer steps than the length of an already existing path.

Another advantage of the invention over the prior art is that said prior art uses a flag bit as a part of each binary tree node representation to signal whether the node is a left or a right successor of its predecessor node, whereas the subject invention does not need nor use a left/right successor flag bit.

Yet another advantage of the subject invention over the above prior art is that the above prior art employs bit tests for path tracing, whereas the subject invention does not use bit testing for path tracing but rather uses a novel minimal difference or maximal similarity partitioning operation for path tracing during insertion.

The subject invention also has economic advantage over the prior art for building indexes and for sorting.

Partial order trees are also sometimes called "heap trees", after Floyd Patterson; see the "Communications of the ACM", 1965. The prior art employing partial order trees, or heap trees, require a number of steps proportional to the base two logarithm of the number of records being sorted, and require one memory fetch for each step, and on the average require one store into memory for every 2 steps.

Thus partial order sorting methods require approximately a total number of memory fetches or stores of 1.5 times the base two logarithm of the number of records, with ⅓ of the memory interactions being stores. The subject invention requires approximately the same number of memory interactions, but of the memory interactions only either 2 or 3 of them are stores into memory. Since random access memory performs stores slower than fetches from memory, the subject invention method has another advantage over the prior art.

A typical example is as follows: For 30,000 keys, a typical average binary tree path length ranges from 15 nodes to 23 nodes. A partial order tree sorting method would require 15 memory fetches, and an average of 8 stores to process #1 key through the sorting tree. The subject invention would have an average of approximately 19 memory fetches, and from 2 to 3 stores. Thus the total number of memory operations is slightly less than that for a partial order tree method (21 or 22 versus 23), and 2 or 3 stores versus 8 stores for the partial order tree.

Another advantage of the invention over the prior art is that the novel apparatus for the locating step enables a general purpose computer to execute in one instruction the same work as 14 to 17 instructions in a computer that does not have the novel apparatus, and, furthermore, the novel apparatus enables the single instruction to execute in one machine cycle, thereby providing a speedup that is estimated to be between two and five times.

Another advantage of the invention over the prior art is that the novel apparatus enabling the work to be done in 1 machine cycle allows the instruction to be included in a Reduced Instruction Set Computer (RISC) machine, wherein all instructions are required to execute in one cycle, thereby providing the machine with an order of magnitude speedup of the essential work done for sorting applications and indexing applications. Since sorting and indexing account for 15 to 25% of all commercial computer applications, the subject invention confers a significant economic advantage to sorting and indexing.

Another key feature of the subject invention is that it may be used to operate upon tree nodes containing portions of keys limited to the maximum size of a word for a given architecture,

DETAILED DESCRIPTION OF THE EMBODIMENTS OF THE INVENTION

Binary Tree Mapping

Figure 1:
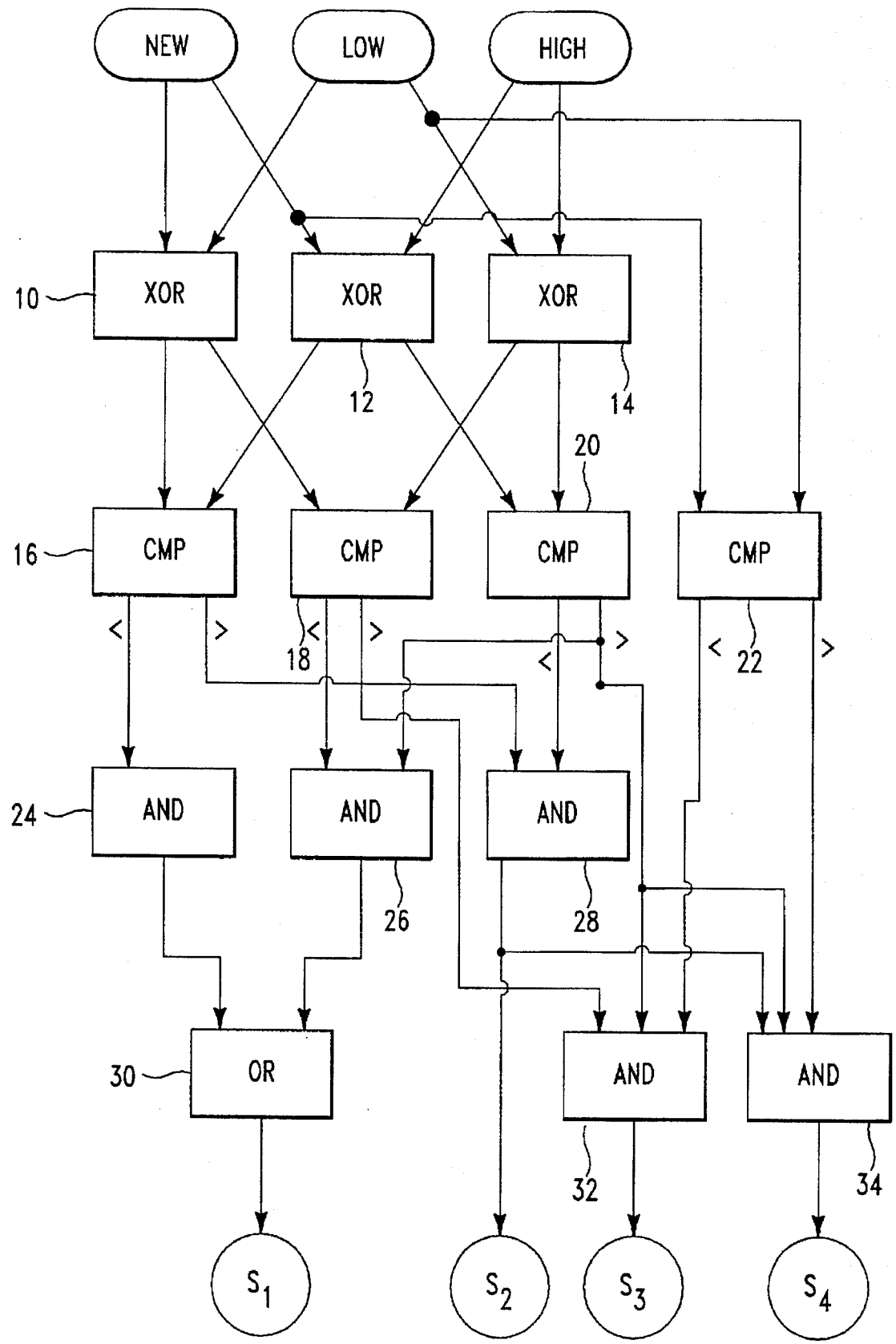
FIG. 1 is a diagram of one embodiment of the logic for carrying out the invention in hardware or software.

Each node N of the binary tree consists or two arc pointer fields, and a key field. The two arc fields represent the connections between said node and its predecessor and successors, Following the terminology of U.S. Pat. No. 3,916,387, the arc fields may be of the absolute, offset, or invertible type.

The key field, k, is a fixed or variable length field, and contains the key that is the smallest key associated with any of the entries in the right subtree of said node N.

Each node, except for the top node in the tree, has a left and a right subtree, which are accessed by using the left and right arc fields respectively of said node.

When there is only one entry in a subtree, the pointer has the value of the data pointer associated with the single key.

The top node only has a right arc field, and therefore has only a right subtree, and no left subtree. The key stored at the top node is the smallest key that is stored in the tree.

Note that the above description may be replaced by an equivalent description, where the key stored at a node is the largest key stored in the left subtree of said node, and then the top node would only have a left subtree, and no right subtree.

Since the left arc field for the top node is never used, since there is only a right arc from said top node, said top left arc field is used to point upward to a prior level of index tree. The top left arc field is called the B field, or backward pointer field.

The f01 flag bit in the B field is a one if the right successor of the top node is an inner node, i.e. it has two successors, or the f01 flag bit in the B field is a zero if the right successor of the top node is an end of path node.

The f10 bit in the B field is a one if the end of path arc that points to the top node from a prior level is a right arc, or the f10 bit in the B field is a zero if the end of path arc that points to the top node from a prior level is a left arc.

This use of the B field makes it possible to trace both upward and downward across levels.

The connections, or arcs, between binary tree nodes are represented by only two fields, using subtraction invertible fields to represent the three connections between any node and its three neighbors, as described in U.S. Pat. No. 3,916,387. Three fields may be used, but the use of two fields is believed to be the best mode for the invention.

Given the above description, a typical binary tree node from the tree would be as shown in the following table A:

TABLE A

| Binary Tree Node Format | | | | |
|---|---|---|---|---|
| Left Arc Field | | Right Arc Field | | Key field(s) |
| Low arc pointer to subtree of low keys | Left arc flag bits f10 f01 | High arc pointer to subtree of high keys | Right arc flag bits f10 f01 | Key field (may be variable length) |
| Flag bits for the left and right successors of the left successor of this node. | | Flag bits for the left and right successors of the right successor of this node. | | |

For example, in table B, which follows, z is at the end of the path (cop) if the left arc field at x is ANDed with the left successor flag bit mask F10 is non-zero.

q is at the end of the path (cop) if the left arc field at x is ANDed with the left successor flag bit mask f10 is non-zero.

The left arc field, stored at node y in table B, is equal to the address of the left successor of node y, node z, minus the address of node x.

The right arc field, stored at node y in table B, is equal to the address of the right successor of node y, node q, minus the address of node x.

We may represent this relationship by the equations "z=x+left_arc_field(y)", and "q=x+right_arc_field(y)". Given a node x and anode y, the above line enables us to compute the address of either the left or right successor node of y.

Also, solving the above for x, we find that x=z–left_arc_field(y), and x=q–right_arc_field(y). Thus, given node y and either of its two successors, z or q, we can compute x using the appropriate relationship.

Another significant reason for using subtraction fields is that the resulting data structure is completely relocatable, and the connection fields are independent of any base pointers or pointer registers used to access the entries. This not only applies to invertible fields, but also to non-invertible fields, such as the backward pointer field B.

The combination of these enables the entire data structure to be traced from any given pair of nodes, or from a single node with a backward field, to any other node in the entire structure without the use of a stack or other temporary work area except for the use of three registers, two of which hold two node pointers, and the other register is used as a temporary for computing predecessors and successors.

TABLE B

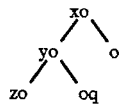

Flag Bit Mapping for Flag bits stored in Predecessor's Arc Fields.

FIG. 1 diagrammatically depicts the generation of four output signals, providing a grouping of a new key or word with a low key or word, a grouping of said new key with a high key or word, a grouping of said low key with said high key with said new key being smaller than said low key, and a grouping of said low key and said high key with said new key being higher than said high key, respectively.

The low key is interpreted as a key from a low, or left, subtree of a selected node, and the high key is interpreted as a key from a high, or right subtree, of the selected node.

The minimal difference compare mechanism in FIG. 1 can be used for a downward path trace locating step, locating an are for subsequent insertion, or for an upward or downward path trace locating step.

The output signals testing a given key against a given node are obtained by first feeding or gating the signals representing the new key into exclusive-or circuits 10 and 12, respectively the low and high key signals of the node. A third exclusive-or circuit 14 receives the low and high key signals.

Signals from the exclusive-or circuits are received by three of a bank of four compare circuits. Thus signals from exclusive-or circuits 10 and 12 are received by compare circuit 16; from exclusive-or circuits 10 and 14 by compare circuit 18; from exclusive-or circuits 12 and 14 by compare circuit 20. A fourth compare circuit 22 receives the signals representing the new key and the low node key.

From the compare circuits, the signals are sent on to AND circuits. A first bank of AND circuits receives the exclusive-or input compare circuits according to whether the new key compared low or high with the low and high keys of the node. Of these, AND circuit 24 receives a signal from compare circuit 16 when the product of exclusive-or circuit 10 is less than that of 12. And circuit 24 receives a signal from compare circuit 18 when the product of exclusive-or circuit 10 is less than that of 14, and from compare circuit 20 when the product of exclusive-or circuit 14 is greater than that of 12.

AND circuit 28 receives a signal from compare circuit 16 when the product of exclusive-or circuit 10 is greater than that of 12, and from compare circuit 20 when the product of exclusive-or circuit 12 is less than that of 14.

The first bank of AND circuits, 24 26, and 28 sends signals on to an OR circuit 30 and a second bank of AND circuits 32 and 34. The OR circuit 30 receives signals from AND circuits 24 and 26 and will provide an output signal S1 when either passes a signal, Signal S1 indicates that the new key is associated with keys like the node low key and that nodes in the low subtree should be processed. And circuit 28 directly provides an output signal S2, Signal S2 indicates that the new key is associated with keys like the high key and that nodes in the high subtree should be processed.

AND circuit 32 receives a signal from compare circuit 18 when the product of exclusive-or circuit 10 is greater than that of 14, from compare circuit 20 when the product of exclusive-or circuit 12 is greater than that of 14, and from compare circuit 22 when the new key is greater than the node low key.

AND circuit 32 then produces the output signal S3. Signal S3 indicates that the new key is numerically smaller than the node low key and numerically smaller than the node high key and the insertion are or point is determined.

AND circuit 34 receives a signal from AND circuit 28, a signal from compare circuit 20 when the product of exclusive-or circuit 12 is greater than that of 14, and from compare circuit 22 when the new key is greater than the node low key.

On the appearance of these three signals, it generates output signal S4. Signal S4 indicates that the insert arc as a high successor has been found and the new key is numerically higher that both the node low key and the node high key.

Figure 2:
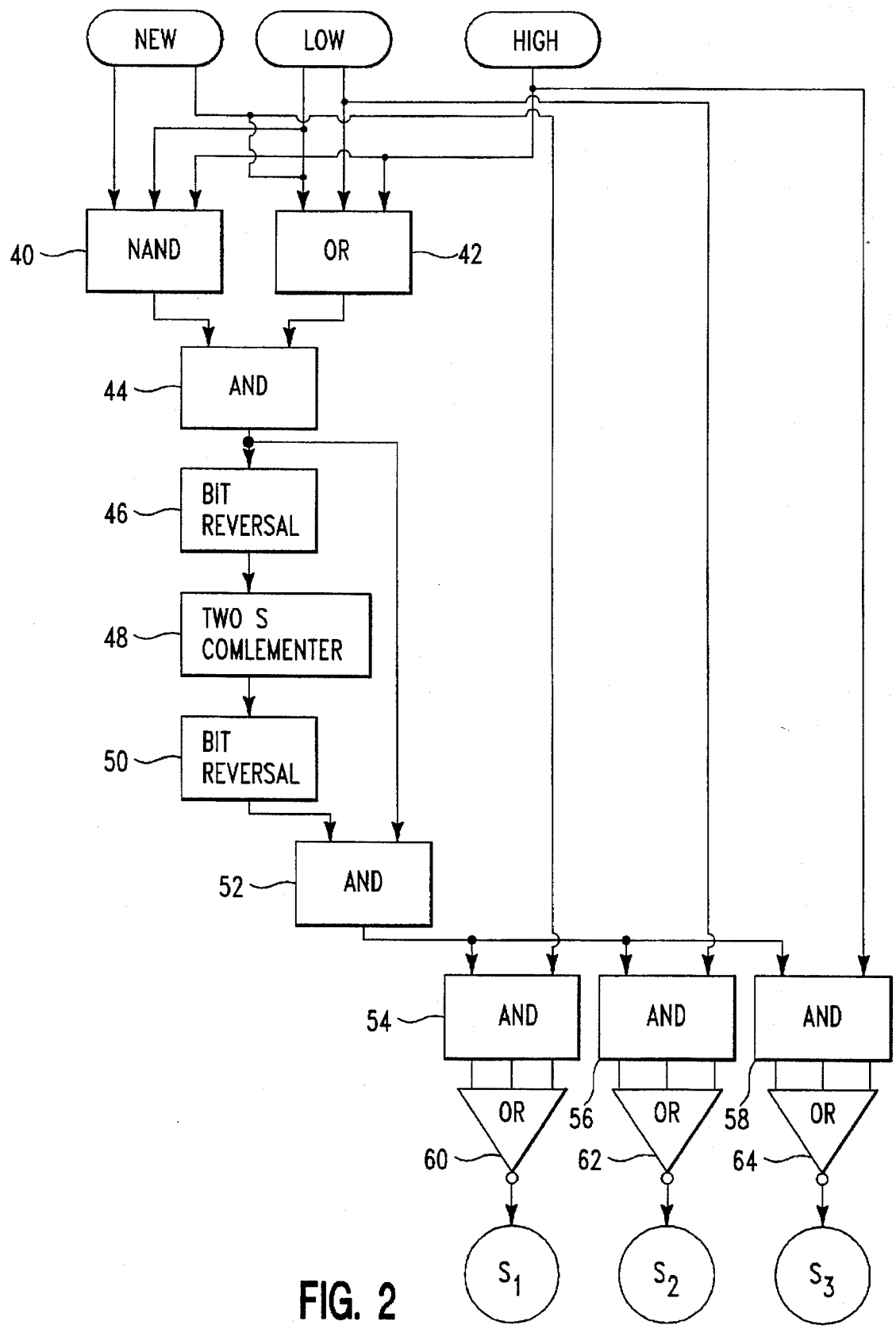
FIG. 2 is a diagram of another embodiment of the logic for carrying out the invention in hardware or software.

FIG. 2 depicts a modified embodiment involving a three-way compare, where three output signals are provided. The mechanism computes a mask which identifies a highest order bit position where the three respective bits of said new key or word, said low key or word, and said high key or word are not all equal. Said mask then selects said bit from each of the three keys, and provides three output signals, each output signal having the value of the bit selected by said mask in said new key, said low key, and said high key.

In this embodiment, the output signals from testing a new key against a given node are obtained by first feeding or gating the signals representing the new key and the low and high keys or the node into a NAND circuit or logic mechanism 40, and an OR circuit or logic mechanism 42. The output signal of the NAND circuit 40 and the OR circuit 42 are exactly as wide as the keys or key words and are fed to a first AND circuit or logic mechanism 44.

The output signal of the AND circuit or logic mechanism 44 is also the same width as a key or key word, and is fed to a bit reversal circuit or logic mechanism 46 which functions to provide an output signal with the bits in its input signal reversed from low order to high order. The output signal from complementer circuit or logic mechanism 48 which functions to provide an output signal that is the twos complement of its input signal. The output signal of the twos complementer circuit or logic mechanism 48 is fed to a second bit reversal circuit or logic mechanism 50.

A second AND circuit or logic mechanism 52 receives the output signal of the bit reversal circuit or logic mechanism 50 and the output signal of the first AND circuit 44. The output signal of the AND circuit 52 is fed to each of a bank of three AND circuit or logic mechanisms; third AND circuit 54, fourth AND circuit 56, and fifth AND circuit 58, The new key signal also is fed to the third AND circuit 54; the node low key to the fourth AND circuit 56; and the node high key signal to the fifth AND circuit 58.

The NAND circuit or logic mechanism 40, the OR circuit 42, the AND circuit 44, the first bit reversal circuit 46, the twos complementer circuit or logic mechanism 50 and the AND circuit 52 as connected compute the mask which identifies the highest order bit position of the new key and the node low key and the node high key that are not all equal. The mask then enables selecting the bit in the corresponding bit position from each of the keys through the bank of AND circuits 54, 56, and 58.

Each output of each of the AND circuits 54, 56, and 58 is the same bit width as a key or key word, and will have only zero bits in positions other than the position of the first bit of inequality of the three keys, and will have the the three bits in the position of inequality from each of the three keys, the new key, the node low key, and the node high key, respectively.

Three funnel OR circuit or logic mechanisms 60, 62, and 64 sum up the outputs of the respective AND circuit or logic mechanisms 54, 56, and 58, which are one key or key word wide. Their outputs S1, S2, and S3, are zero if the bit position selected by the mask of the key inputted into the corresponding AND circuit is zero, and one if it is a one.

The significance of the output signals S1, S2, and S3 are set forth in the following table C. The computing system embodying the invention then takes action accordingly.

The three output bits are interpreted as follows.

TABLE C

| NEW key bit | LOW key bit | HIGH key bit | Significance |
|---|---|---|---|
| 0 or 1 | 0 1 | 0 1 | All three keys are equal, there being no bit position where a combination other than 0 0 0 or 1 1 1 appears. |
| 0 | 0 | 1 | NEW key is grouped together with LOW key, and the subtree containing said NEW and LOW keys is on the path to the delta arc. |
| 0 | 1 | 0 | NEW key is grouped together with HIGH key, and said LOW key is greater than said HIGH key. This output signals an error. |
| 0 | 1 | 1 | LOW key is grouped together with HIGH key, and first node on the path to the delta arc is the predecessor of said selected node. Also NEW key is smaller than either said low key or said high key. |
| 1 | 0 | 0 | LOW key is grouped together with HIGH key, and first node on the path to the delta arc is the predecessor of said selected node. Also NEW key is higher than either said low key or said high key. |
| 1 | 0 | 1 | NEW key is grouped together with HIGH key, and the subtree containing said LOW and said HIGH keys is on the path to the delta arc. |
| 1 | 1 | 0 | NEW key is grouped together with said LOW key, and said LOW key is numerically greater than said HIGH key. This output signals an error. |

CONSERVATION OF FLAG BITS

Cases may arise where all of the bits in an are pointer field may be required by the underlying architecture for addressing. In this case, it is desirable to use some of the bits in the key field for storing flag bits, but also to not compromise any of the fully stored key values.

This is accomplished by using a top decoding node, which decodes some of the high order bits of the stored keys (a prefix of the stored keys.) This decoding is then represented by a plurality of arc pointer fields at the top decoding node, each of which points to a binary tree containing only keys beginning with the decoded key prefix. For example, in order to use this method to decode one key prefix bit, two arc pointer fields are required at the top decoding node.

All keys having a zero high order bit are stored in the binary tree addressed by the first arc pointer field, and all keys having a high order bit equal to one are stored in the binary tree addressed by the second are pointer field.

Then the keys in the binary tree addressed by the first arc pointer field all have the high order stored bit equal to zero, and all of the keys stored in the binary tree addressed by the second arc pointer field have the high order bit equal to one.

Figure 3:
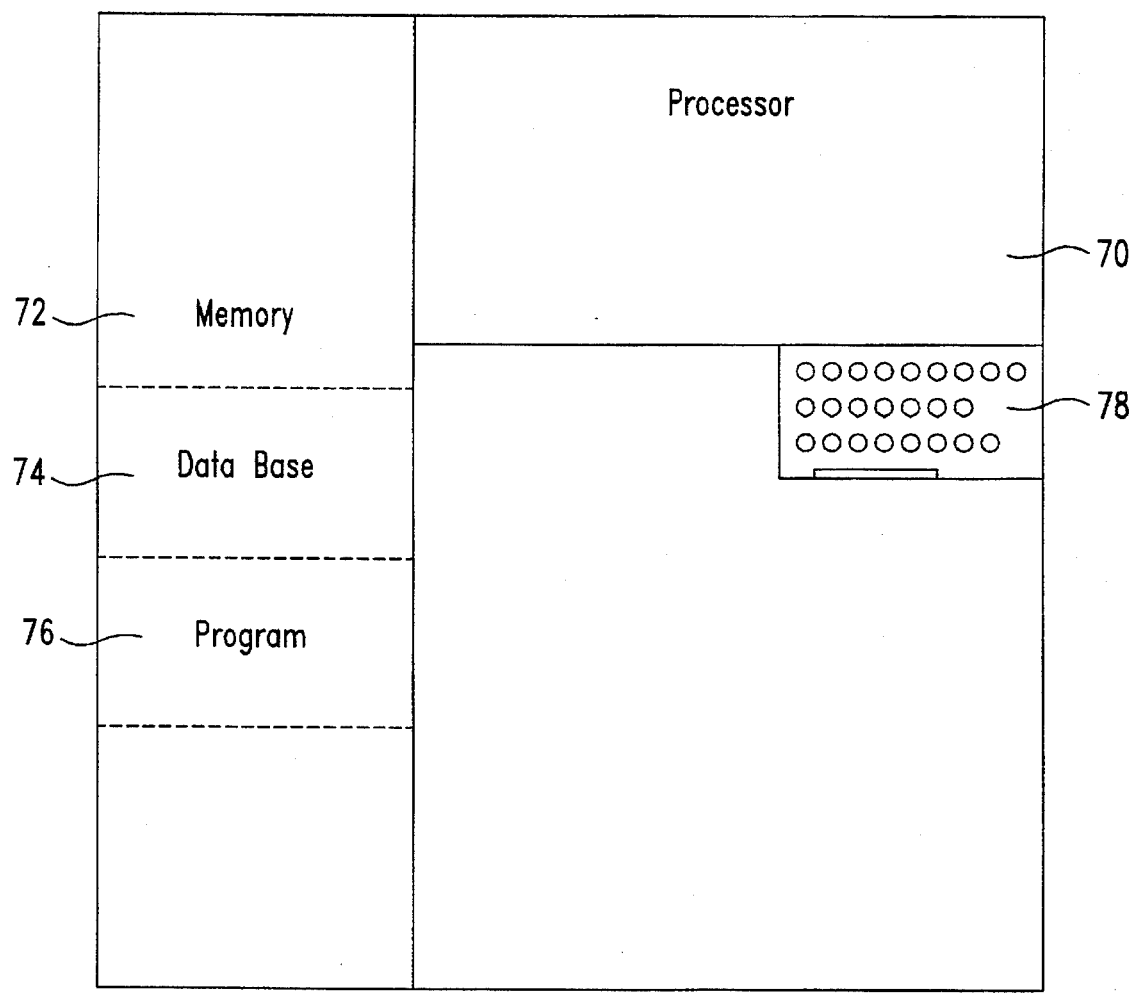
FIG. 3 is a diagram of a system embodying the invention.
Figure 4:
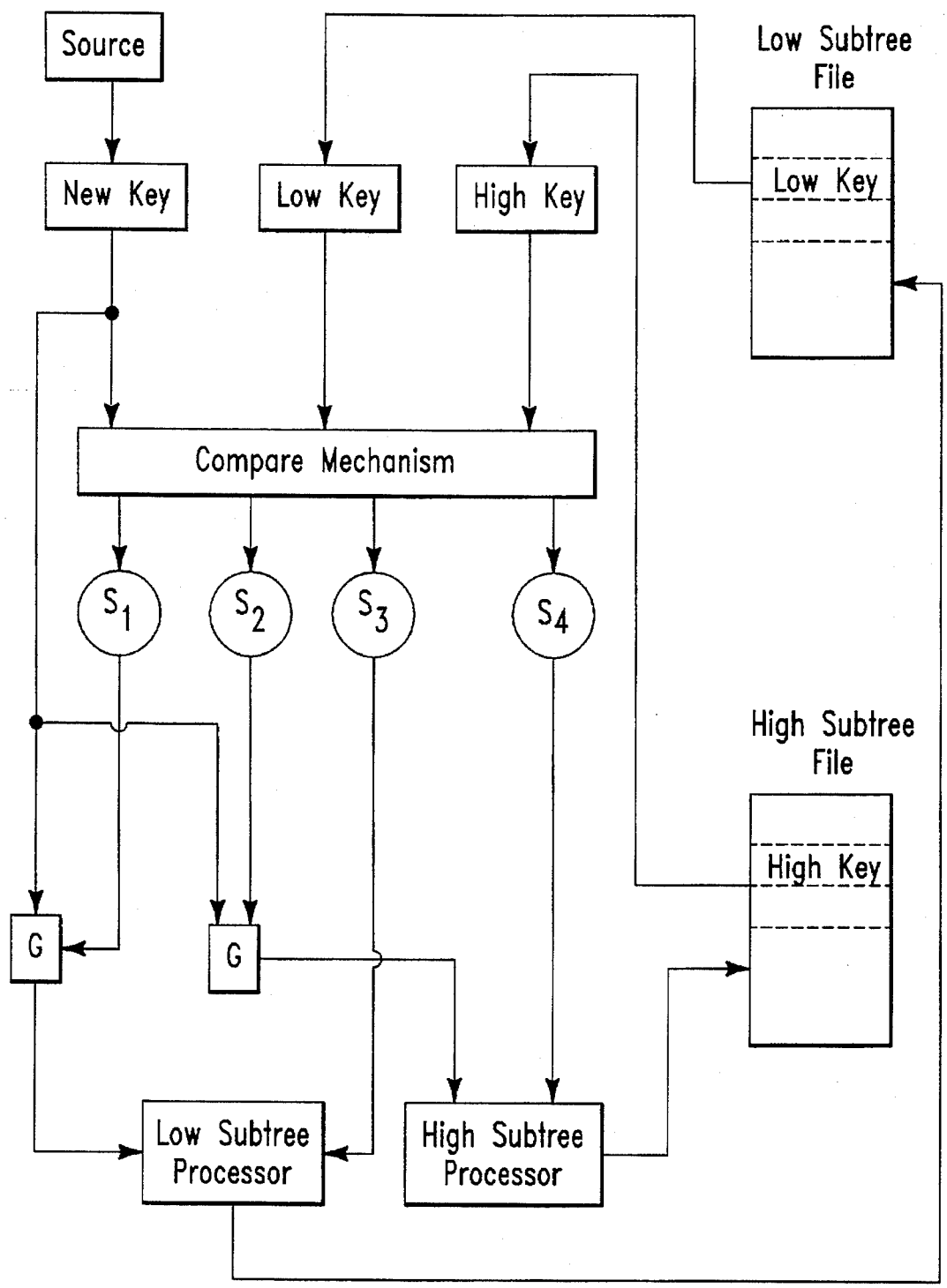
FIG. 4 is a diagrammatic view of a system for sorting three keys into two sets.
Figure 5:
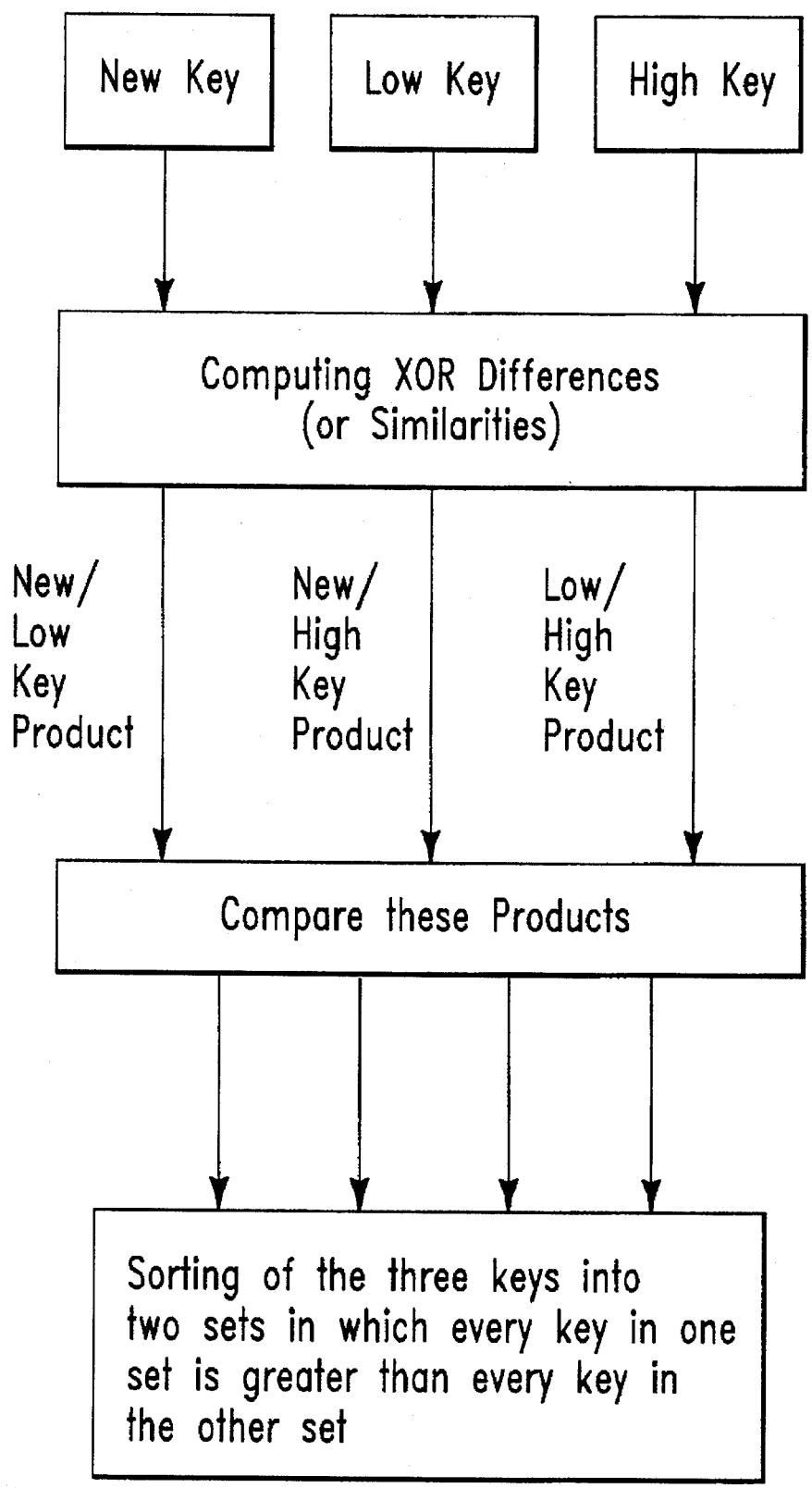
FIG. 5 is a flow chart of a method for sorting three keys into two sets.

FIG. 3 diagrammatically shows different parts of a system embodying the invention. Included are a processor 70, a memory 72 has subarea 74 in which the data base is stored, and subarea 76 in which the program for carrying out the invention is stored and its table, and a keyboard 78 for entering new data. The program guides the processor to update the data base and the table in memory.

EMBODIMENT in C-LANGUAGE PROGRAM

An embodiment of the invention in a program written in the "C" language is set forth in the APPENDIX. The 22 modules of the program are set forth in sub-appendices as follows:

APPENDIX A—LJWSYS
APPENDIX B—RAMBAM
APPENDIX C—LJWDEF
APPENDIX D—LJWVARS
APPENDIX E—WORDMACS
APPENDIX F—I_INDEX
APPENDIX G—I_CURSOR
APPENDIX H—AINSERT
APPENDIX I—ADELETE
APPENDIX J—SIG_BIT
APPENDIX K—AFIND
APPENDIX L—AFINDC
APPENDIX M—LOADBITS
APPENDIX N—LJW_QCTR
APPENDIX O—LJW_Q
APPENDIX P—NEXT
APPENDIX Q—FWPREFIX
APPENDIX R—FINDC
APPENDIX S—LJWGLOBL
APPENDIX T—SEE_NODE
APPENDIX U—SIG_BITS
APPENDIX V—C2W

General guides for using the program of the APPENDIX are as follows:

CREATE and FREE an INDEX
------------------------

I_INDEX int   i_index(ljw_index *index, int unique, int num_priorities);

Instantiate an index, and return the pointer to it.

Arguments:

index: The user declared pointer to the ljw_index
        structure.

unique:   A one if the index must have unique keys, or
        a zero if duplicates are allowed.

num_priorities:   The number of priority fields that are
        associated with each index entry. A
        number between 0 and 255.

Return codes:

ljw_ok: The index was instantiated.

ljw_nospace: There was not enough space.

------------------------

UI_INDEX int   ui_index(ljw_index *index);

Uninstantiate index, and free the space for the entries.

Return codes:

ljw_ok: The index was uninstantiated.

------------------------

SCAN_INDEX int   scan_index(ljw_index *index, void display_funct(u));

Display all of the entries in an index. Very useful for debugging.

Arguments:

display_function: The user supplied function to display the user's data structure. Only the user knows how the data structure is organized.

Return codes:

ljw_ok: The index was scanned.

---

NUM_PFS int   num_pfs(ljw_index *index);

Count the number of priority fields in this index.

Returned:

A number between 0 and 255.

---

NUM_ENTRIES int   num_entries(ljw_index *index);

Count the number of entries in this index.

Returned:

The number of entries in the index.

---

INSERT and DELETE an INDEX ENTRY

---

AINSERT int   ainsert(ljw_index *index, char *K, int len, u_data_pointer );

Insert a variable length key into the index, and associate data_pointer with the key. Duplicates are only allowed if the index was declared with 'unique' set to zero.

Arguments:

> index: The pointer to the index origin. This is the
> pointer obtained from the i_index function.
>
> key: A pointer to a character string.
>
> len: The number of bytes in the character string.
>
> data_pointer: The pointer to be associated with the key
> after it is inserted in the index.

Return codes:

> ljw_ok: The operation was successful.
>
> ljw_found: Attempt to insert a duplicate key in a unique
> restricted index.
>
> ljw_no_space: Not enough room in memory for insertion.

---

ADELETE int    adelete(ljw_index *index, char *key, int len);

Delete the specified key and its associated data pointer from the index.

Return codes:

> ljw_ok: The operation was successful.
>
> ljw_not_found: No matching key was found.

---

STORE PRIORITY FIELDS

---

STP int    stp(ljw_cursor *cursor, int priority_number, long priority );

Arguments:

> cursor: The cursor selects the index entry to be
> modified.

priority_number: The priority field to be selected.

priority: Priority values are positive numbers only, and are limited to be in the range from 0 to

255.

Return codes:

ljw_ok: The operation was successful.

---

FIND an INDEX ENTRY from a KEY

---

AFIND int afind(ljw_index *index, char *key, int len, unsigned long *data_pointer);

Search the index for the specified key.

The afind function can only be used to retrieve the data pointer for a single key, and does not produce any information that would enable you to access the next or previous entries in the index. For retrieving multiple index entries, see the afindc, next, and prior functions.

Arguments:

key: A pointer to a character string.

len: The number of bytes in the character string.

data_pointer: The user's data pointer associated with this key.

This argument will be filled in by this function.

Copyright (c) LJW September, 1992.

Return codes:

ljw_found: The key and associated data pointer were located ljw_not_found: The key is not in the index.

---

FWPREFIX int fwprefix(ljw_index *index, char *key, int len, int *match_count,unsigned long *data_pointer);

Find all entries whose keys are prefixes of this key. fwprefix only matches whole text words in the key. A match cannot separate a word in its middle.

Arguments:

key: The result is the longest prefix of this key.

len: The length of key.

match_count: This will be set by fwprefix to the number of
            words that were matched in the prefix of key.

data_pointer: The user's data pointer associated with the
           matching keyword. This field is filled in by
           fwprefix.

This function is very useful for processing an input string containing keywords, as it allows you to put the keywords into an index, along with a pointer that determines the action to be taken. You do not have to embed the word boundary recognition logic in your program.

Return codes:

ljw_found: A matching index key and data pointer
        were found.

ljw_not_found: No index key satisfies the requirement.
        match_count is set to zero.

---

FPREFIX

```
int    fprefix(ljw_index *index, char *key, int len,
               int *match_count, unsigned long *data_pointer)
;
```

Find prefix, not necessarily delimited by word boundary.
The index key that is equal to a prefix of the input
string is chosen.

Arguments:

key: The result is the longest prefix of this key.

len: The length of key.

match_count: This will be set to the number of bytes
        that were matched in the prefix of key.

data_pointer: The user's data pointer associated with the
        matching keyword. This field is filled in by
        fwprefix.

Copyright (c) LJW September, 1992.

Return codes:

ljw_found: A matching index key and data pointer
        were found.

ljw_not_found: No index key satisfies the requirement.
        match_count is set to zero.

---

FIND an INDEX ENTRY and SET CURSOR

---

AFINDC

```
int    afindc(ljw_cursor *cursor, ljw_index *index, char *key,
              int len, unsigned long *data_pointer);
```

Find a specified key in the index and set the cursor to this entry. afinde is designed to be used in conjunction with the next and prior functions.

Arguments:

cursor: Must be initialized to the NULL pointer by the
        application program.

key: A pointer to a character string.

len: The number of bytes in the character string.

data_pointer: The user's data pointer associated with this
        key.

Return codes:

ljw_found: The matching index key and data pointer were
        found.

ljw_not_found: The key is not in the index. The cursor is
        set anyway. next and prior will still work.

---

FMPC int    fmpc(ljw_cursor *cursor, int priority_number);

Find maximim priority.

After this operation you can use the cursor to retrieve the actual maximum priority via the gtp operation, retrieve the key via the get_key operation, or retrieve the data pointer via the get_data operation.

Arguments:

cursor: The cursor will be set to the index entry
        associated with the cursor having the maximum
        priority. If the cursor does not exist, then
        fmpc creates one. You can also create the
        cursor yourself by means of the i_cursor function.

priority_number: The priority field to be selected.

---

IDENTIFY by KEY and TRAVERSE an INDEX

---

The following operations identify a subset of the keys in an index, X, thus creating a cursor, which can be used to enumerate the identified subset via the next or prior operations.

X denotes the set of index keys having the indicated relationship to the search key, K.

---

The parameter names for the following operations are:

cursor: The cursor to be set by the identify operation.

K: The pointer to the character string key.

len: The number of bytes in the key.

IDLT ( X < K )

u   idlt(ljw_cursor *cursor, ljw_index *index, char *K, int len);

Identify index keys that are less than K.

IDLE ( X <= K )

u   idle(ljw_cursor *cursor, ljw_index *index, char *K, int len);

Identify index keys that are less than or equal to K.

IDEQ ( X == K)

u   ideq(ljw_cursor *cursor, ljw_index *index, char *K, int len);

Identify index keys that are equal to K.

IDNE ( X != K )

u  idne(ljw_cursor *cursor, ljw_index *index, char *K, int len);

Identify index keys that are not equal to K.

IDGE ( X >= K )

u  idge(ljw_cursor *cursor, ljw_index *index, char *K, int len);

Identify index keys that are greater than or equal to K.

IDGT ( X > K )

u  idgt(ljw_cursor *cursor, ljw_index *index, char *K, int len);

Identify index keys that are greater than K.

Copyright (c) LJW September, 1992.

Return codes:

ljw_ok: If the interval is non-empty. The cursor is set
        to identify the index entries with keys in the
        specified interval.

ljw_not_found: If the interval is empty. The cursor is
        not set. If the cursor existed then it
        is freed up, and the cursor is set to
        the null pointer.

------------------------------------------------------------

The above operations (except for ==) define open sets of index keys. The family of operations begining with idi (identify interval) identify intervals with two ends, which may be open or closed on either end.

An interval is a range of key values. The low end of the range is specified by a first key, and the high end of the range is specified by a second key.

An interval is closed when it includes both the first and second keys. An interval is completely open when it does not include either the first key nor the second key, but includes all of the key values in between.

A half open interval includes only one of the end key values, either the first one or the second one, but not the other one. A half open interval that is open on the right includes the low key value, but not the high key value. A half open interval
that is open on the left includes the high key value, but not the low key value.

The suffix, oo, oc, co, or cc, signifies an interval that is open on the left and open on the right, open on the left and closed on the right, closed on the left and open on the right, and closed both on the left and right ends, respectively.

IDIOO (open-open)

int    idioo(ljw_cursor *cursor, ljw_index *index,
       char *K1, int L1, char *K2, int L2);

IDIOC (open-closed)

int    idioc(ljw_cursor *cursor, ljw_index *index,
       char *K1, int L1, char *K2, int L2);

IDICO (closed-open)

```
int    idico(ljw_cursor *cursor, ljw_index *index,
       char *K1, int L1, char *K2, int L2);
```

IDICC (closed-closed)

```
int    idicc(ljw_cursor *cursor, ljw_index *index,
       char *K1, int L1, char *K2, int L2);
```

Arguments:

K1: The first key is the left end, or low value for the interval.

K2: The second key is the right end, or high value for the interval.

L1: The length of the first key K1.

L2: The length of the second key K2.

Return codes:

ljw_ok: If the interval is non-empty. The cursor is set to identify the index entries with keys in the specified interval.

ljw_not_found: If the interval is empty. The cursor is not set. If the cursor existed then it is freed up, and the cursor is set to the null pointer.

---

The arguments and return codes are similar for prefixed-by and prefixes-of.

ID_PF_OF (PREFIXES OF)

```
int    id_pf_of(ljw_cursor *result_cursor, ljw_index *index,
                                            char *K, int len);
```

Identify the set of index entries whose keys are prefixes of the input string K of length len.

ID_PF_BY (PREFIXED BY)

```
int    id_pf_by(ljw_cursor *cursor, ljw_index *index, char *K,
                                            int len);
```

Identify the set of index entries whose keys are prefixed by the input string K of length len.

Return codes:

ljw_ok: If the interval is non-empty. The cursor is set to identify the index entries with keys in the specified interval.

ljw_not_found: If the interval is empty. The cursor is not set. If the cursor existed then it is freed up, and the cursor is set to the null pointer.

------------------------------------------------------------

INTERSECTION and UNION of INDICES

------------------------------------------

Intersection, union, and sans are performed on sets of data pointers, not on sets of keys!

IDINTSEC (INTERSECTION)

int idintsec(ljw_cursor *result_cursor, ljw_cursor *cursor1, ljw_cursor *cursor2);

Identify the intersection of two sets of data pointers specified by two cursors.

IDUNION (UNION)

int idunion(ljw_cursor *result_cursor, ljw_cursor *cursor1, ljw_cursor *cursor2);

Identify the union of two sets of data pointers specified by two cursors.

IDSANS (SANS)

int idsans(ljw_cursor *result_cursor, ljw_cursor *cursor);

Identify the set of data pointers selected by the first cursor but not by the second cursor. i.e. the first set SANS the second.

---

INSTANTIATE and UNINSTATIATE CURSOR

---

I_CURSOR int i_cursor(ljw_cursor *cursor, ljw_index *index);

Instantiate a cursor for the specified index, if one does not already exist.

Arguments:

cursor: If the cursor is NULL, then memory is allocated to hold the cursor.

index: The pointer to the ljw_index.

Return codes:

ljw_ok: The operation was successful. The pointer to
        the index is stored in the cursor.

ljw_nospace: The cursor remains NULL if there is
        insufficient memory.

---

UI_CURSOR int   ui_cursor(ljw_cursor *cursor);

Uninstantiate the cursor, and free up the space. The index is not changed.

Return codes:

ljw_ok: Operation was successful.

---

EXTRACT INFORMATION from an INDEX CURSOR

---

GET_KEY int   get_key(ljw_cursor *cursor, char **key);

The key is extracted for the cursor selected entry. The cursor keeps track of the space for the retrieved key. The space for the key will be freed when the cursor is used next or when the cursor is uninstantiated.

Arguments:

cursor: An instantiated cursor that has been set to an
        entry.

key: The key associated with the current cursor entry.
        This field is set by get_key.

Return codes:

ljw_found: The key associated with this cursor has been located.

ljw_not_found: If the cursor doesn't define an index entry.

---

GET_DATA int    get_data(ljw_cursor *cursor, unsigned long *data_pointer);

The data pointer associated with the cursor selected index entry is extracted.

Arguments:

cursor: An instantiated cursor that has been set to an entry.

data_pointer: The user's data pointer associated with the current cursor entry.  This field is set by get_data.

Return codes:

ljw_found: The data pointer associated with this cursor has been located.

ljw_not_found: If the cursor doesn't define an index entry.

---

GTP long   gtp(ljw_cursor *cursor, int priority_number);

Get the priority value for the indicated priority field from the cursor selected index entry.

Return codes:

priority value: The value associated with this priority field.

ljw_not_found: If the cursor does not define an index
entry.

---

TRAVERSE identified SUBSETS of INDEX ENTRIES

---

NEXT int    next(ljw_cursor *cursor, unsigned long *data_pointer);

The cursor is set to the next index entry in collating sequence order. The data pointer for the next entry, if there is one, is returned.

Arguments:

cursor: An instantiated cursor that has been set.

data_pointer: The user's data pointer associated with the
next entry. This is set by next if there were
unprocessed index entries. data_pointer is set to NULL if there were no more unprocessed entries.

Return codes:

ljw_found: There were unprocessed entries.

ljw_not_found: All the entries have been processed.
The cursor pointer is set to zero and
the cursor is uninstantiated. data_pointer
is set to NULL.

---

PRIOR int    prior(ljw_cursor *cursor);

The cursor is set to the prior index entry in collating sequence order. The data_pointer for the prior entry, if there is one, is returned.

Arguments:

cursor: An instantiated cursor that has been set.

data_pointer: The user's data pointer associated with the prior entry. This is set by prior if there were unprocessed index entries. data_pointer is set to NULL if there were no more unprocessed entries.

Return codes:

ljw_found: There were unprocessed entries.

ljw_not_found: All the entries have been processed. The cursor pointer is set to zero and the cursor is uninstantiated. data_pointer is set to NULL.

---

It will be appreciated that while applicant has shown preferred embodiments of the invention, that other and different applications of the principles of the invention will be apparent to those skilled in the art. Accordingly, it is desired to be limited only by the scope and spirit of the appended claims.

APPENDIX A -- LJWSYS

```
#ifndef    LJWSYS_H
#define    LJWSYS_H
//    ---------------------------------------------------------------
//    The ljwsys.h file, containing the necessary includes and
//    definitions to compile the RAMBAM indexing.
//
//    Copyright (c) LJW September, 1992.
//    All rights reserved.
//    ---------------------------------------------------------------
//    ---------------------------------------------------------------
//    If DEBUG is on, then generate the VALIDITY checks for
//    run-time validity checking of the RAMBAM control blocks.
//    The validity checking can be activated independently of
//    DEBUG, by defining VALIDATE and not defining DEBUG.
//
//    DEBUG allows the trace mechanism to operate, allowing
//    selective tracing by program and line number.
//
//    VALIDATE only does validity checking.  When it detects
//    an invalid condition, it produces a message, and returns
//    ljw_failure.
//    ---------------------------------------------------------------
#ifdef     DEBUG
    #define    VALIDATE
```

```
endif include "rambam.h"

include <stdio.h>        /*   These are common to both.
     */
include <stdlib.h> include <string.h> include <fcntl.h> include <time.h> include <limits.h> include "c2w.h"

include "ljwdef.h"

#include "ljwvars.h"

#include "wordmacs.h"

#include "sig_bits.h"
     /*   See if this is the PC-DOS environment, or if it is
          a UNIX workstation environment.                      */

/*   ----------------------------------------    */
     /*   Test for the workstation environment.       */
     /*   ----------------------------------------    */
#ifndef   PC_ENV
#define farmalloc malloc
#define farfree free
#define far
#endif
     /*   ----------------------------------------    */
     /*   Test for the PC-DOS environment.            */
     /*   ----------------------------------------    */
#ifdef    PC_ENV
```

```
#include <alloc.h>
#include <mem.h>
#include <sys\stat.h>
#include <dos.h>
#define system(x)
    /*    There is no equivalent system command    */
    /*    in PC-DOS.                               */
#endif
    /*    ---------------------------------------  */
    /*    Test for the AIX environment.            */
    /*    ---------------------------------------  */
#ifdef   AIX_ENV
#include <sys/stat.h>
#endif
endif
```

APPENDIX B -- RAMBAM

```
#ifndef RAMBAMH
#define RAMBAMH
/*        The RAMBAM.H file.         */
/*        Copyright (c) LJW August 1992.    */
/*        All rights reserved.              */
#include <limits.h>
#define u unsigned long
#ifndef   ljw_index
typedef unsigned long ljw_index;
#endif
#ifndef   ljw_cursor
typedef unsigned long ljw_cursor;
#endif
/* The return codes from the rambam functions (ints) */
enum _return_codes   {
  ljw_ok            =  0,
  ljw_no_space      = -1,
  ljw_not_found     = -2,
  ljw_found         = -3,
  ljw_trace_error   = -4,
  ljw_invalid_input = -5,
  ljw_failure       = INT_MIN
};
```

```
/* define ljw_failure    2147483647L */
/* Allow for both spellings */
#ifndef ljw_nospace
#define ljw_nospace ljw_no_space
endif ifndef    ljw_graph
define    ljw_graph unsigned long
endif ifndef    ljw_graph_cursor
define    ljw_graph_cursor    unsigned long
endif ifndef    ljw_qctr
long ljw_qctr(char   *name, int line_number);
endif ifndef    ljw_ctr
     extern    long ljw_ctr;
endif ifndef    PC_ENV
ifdef     DEBUG
void ljw_q0(char     *program, int  line);
void ljw_q1(char     *program, int  line, char *msg);
//   void ljw_q9(char     *program, int  line, char *msg, ...);
#ifndef    ljw_q2
void ljw_q2(char     *program, int  line, char *msg, void *a1);
endif ifndef    ljw_q3
void ljw_q3(char     *program, int  line, char *msg, void *a1, void *a2);
```

```
endif
#ifndef    ljw_q4
void ljw_q4(char    *program, int    line, char *msg,
        void *a1, void *a2, void *a3) ;
#endif
#ifndef    ljw_q5
void ljw_q5(char    *program, int    line, char *msg,
        void *a1, void *a2, void *a3, void *a4) ;
#endif
#ifndef    ljw_q6
void ljw_q6(char    *program, int    line, char *msg,
        void *a1, void *a2, void *a3, void *a4, void *a5) ;
#endif
#ifndef    ljw_q7
void ljw_q7(char    *program, int    line, char *msg,
        void *a1, void *a2, void *a3, void *a4,
        void *a5, void *a6) ;
#endif
#ifndef    ljw_q8
void ljw_q8(char    *program, int    line, char *msg,
        void *a1, void *a2, void *a3, void *a4,
        void *a5, void *a6, void *a7) ;
#endif
#ifndef    ljw_q9
void ljw_q9(char    *program, int    line, char *msg,
        void *a1, void *a2, void *a3, void *a4,
        void *a5, void *a6, void *a7, void *a8) ;
#endif
```

```
endif
#ifndef   q0
     #ifdef     DEBUG
     #define    q0     ljw_q0(__FILE__,__LINE__);
     #else
     #define    q0
     #endif
endif
#ifndef   q1
     #ifdef     DEBUG
     #define    q1(message)     ljw_q1(__FILE__,__LINE__,message);

#else
     #define    q1(message)
     #endif
endif
#ifndef   q2
     #ifdef     DEBUG
     #define    q2(msg1,msg2)   ljw_q2(__FILE__,__LINE__,      \
          msg1,((void *)msg2));
     #else
     #define    q2(msg1,msg2)
     #endif
endif
#ifndef   q3
     #ifdef     DEBUG
     #define    q3(msg1,msg2,msg3)   ljw_q3(__FILE__,__LINE__,msg1
,\
          ((void *)msg2), ((void *)msg3));
```

```
    #else define    q3(msg1,msg2,msg3)

endif endif ifndef    q4 ifdef    DEBUG define    q4(msg1,msg2,msg3,msg4)    ljw_q4(__FILE__,__LINE__,msg1,\

((void *)msg2),((void *)msg3),((void *)msg4));

else define    q4(msg1,msg2,msg3,msg4)

endif endif ifndef    q5 ifdef    DEBUG define    q5(msg1,msg2,msg3,msg4,msg5)    ljw_q5(__FILE__,__LINE__,msg1,\

((void *)msg2),((void *)msg3),((void *)msg4),((void *)msg5));

else define    q5(msg1,msg2,msg3,msg4,msg5)

endif endif ifndef    q6 ifdef    DEBUG define    q6(msg1,msg2,msg3,msg4,msg5,msg6)                    \
    ljw_q6(__FILE__,__LINE__,msg1,((void *)msg2),                   \
        ((void *)msg3),((void *)msg4),((void *)msg5),               \
        ((void *)msg6));

#else
```

```
        #define   q6(msg1,msg2,msg3,msg4,msg5,msg6)
        #endif
endif
#ifndef   q7
        #ifdef    DEBUG
        #define   q7(msg1,msg2,msg3,msg4,msg5,msg6,msg7)              \
        ljw_q7(__FILE__,__LINE__,msg1,((void *)msg2),                 \
             ((void *)msg3),((void *)msg4),((void *)msg5),            \
             ((void *)msg6),((void *)msg7));
        #else
        #define   q7(msg1,msg2,msg3,msg4,msg5,msg6,msg7)
        #endif
endif
#ifndef   q8
        #ifdef    DEBUG
        #define   q8(msg1,msg2,msg3,msg4,msg5,msg6,msg7,msg8)         \
        ljw_q8(__FILE__,__LINE__,msg1,((void *)msg2),                 \
             ((void *)msg3),((void *)msg4),((void *)msg5),            \
             ((void *)msg6),((void *)msg7),((void *)msg8));
        #else
        #define   q8(msg1,msg2,msg3,msg4,msg5,msg6,msg7,msg8)
        #endif
endif
#ifndef   q9
        #ifdef    DEBUG
        #define   q9(msg1,msg2,msg3,msg4,msg5,msg6,msg7,msg8,msg9)    \
        ljw_q9(__FILE__,__LINE__,msg1,((void *)msg2),                 \
```

```
            ((void *)msg3),((void *)msg4),((void *)msg5),      \
            ((void *)msg6),((void *)msg7),((void *)msg8),      \
            ((void *)msg9));
    #else
    #define    q9(msg1,msg2,msg3,msg4,msg5,msg6,msg7,msg8,msg9)
    #endif
endif
endif
//  ------------------------------------------------
//  The following definitions work in the PC_ENV
//  for 80286 machines, where int is a 16-bit number.
//  ------------------------------------------------
#ifdef    PC_ENV
#ifdef    DEBUG
    #ifndef    q0
    #define    q0    ljw_q0(__FILE__,__LINE__);
    #endif
#else
    #ifndef    q0
    #define    q0
    #endif
endif
ifdef    DEBUG
    #ifndef    q1
    #define    q1(message)    ljw_q1(__FILE__,__LINE__,message);
    #endif
#else
    #ifndef    q1
```

```
        #define    q1(message)
        #endif
endif ifdef    DEBUG
        #ifndef    q2
        #define    q2(msg1,msg2)    ljw_q9(__FILE__,__LINE__,msg1,msg2
);
        #endif
#else
        #ifndef    q2
        #define    q2(msg1,msg2)
        #endif
endif ifdef    DEBUG
        #ifndef    q3
        #define    q3(msg1,msg2,msg3)    ljw_q9(__FILE__,__LINE__,msg1
,msg2,msg3);
        #endif
#else
        #ifndef    q3
        #define    q3(msg1,msg2,msg3)
        #endif
endif ifdef    DEBUG
        #ifndef    q4
        #define    q4(msg1,msg2,msg3,msg4)    ljw_q9(__FILE__,__LINE__
```

```
,msg1,msg2,msg3,msg4):
    #endif
#else
    #ifndef    q4
    #define    q4(msg1,msg2,msg3,msg4)
    #endif
endif ifdef    DEBUG
    #ifndef    q5
    #define    q5(msg1,msg2,msg3,msg4,msg5)    ljw_q9(__FILE__,__LINE__,msg1,msg2,msg3,msg4,msg5);
    #endif
#else
    #ifndef    q5
    #define    q5(msg1,msg2,msg3,msg4,msg5)
    #endif
endif ifdef    DEBUG
    #ifndef    q6
    #define    q6(msg1,msg2,msg3,msg4,msg5,msg6)    ljw_q9(__FILE__,__LINE__,msg1,msg2,msg3,msg4,msg5,msg6);
    #endif
#else
    #ifndef    q6
    #define    q6(msg1,msg2,msg3,msg4,msg5,msg6)
    #endif
endif
```

```
ifdef    DEBUG ifndef    q7 define    q7(msg1,msg2,msg3,msg4,msg5,msg6,msg7)    ljw_q9(__
FILE__,__LINE__,msg1,msg2,msg3,msg4,msg5,msg6,msg7);

endif else ifndef    q7 define    q7(msg1,msg2,msg3,msg4,msg5,msg6,msg7)

endif endif ifdef    DEBUG ifndef    q8 define    q8(msg1,msg2,msg3,msg4,msg5,msg6,msg7,msg8)    ljw_
q9(__FILE__,__LINE__,msg1,msg2,msg3,msg4,msg5,msg6,msg7,msg8);

endif else ifndef    q8 define    q8(msg1,msg2,msg3,msg4,msg5,msg6,msg7,msg8)

endif endif ifdef    DEBUG ifndef    q9 define    q9(msg1,msg2,msg3,msg4,msg5,msg6,msg7,msg8,msg9)
ljw_q9(__FILE__,__LINE__,msg1,msg2,msg3,msg4,msg5,msg6,msg7,msg endif else ifndef    q9
```

```
        #define    q9(msg1,msg2,msg3,msg4,msg5,msg6,msg7,msg8,msg9)
        #endif
endif ifdef    DEBUG
     void ljw_q0(char    *program, int   line);

void ljw_q1(char    *program, int   line, char *msg);

void ljw_q9(char    *program, int   line, char *msg, ...);
#endif
endif
//   ------------------------------------------------
//   The end of the definitions that work in the PC_ENV
//   for 80286 machines, where int is a 16-bit number.
//   ------------------------------------------------
/*   ------------------------------------------ */
/*   The following entries are extracted from the */
/*   rambam.doc file.                          */
/*   They have been altered since.             */
/*   ------------------------------------------ */
int    i_index(ljw_index *index, int unique, int num_priorities);

int    ui_index(ljw_index *index);
int    scan_index(ljw_index *index, void display_funct(u));
int    num_pfs(ljw_index *index);
long   num_entries(ljw_index *index);
int    ainsert(ljw_index *index, char *K, int len, u data_pointer
);
```

```
int    adelete(ljw_index *index, char *key, int len );

int    stp(ljw_cursor *cursor, int priority_number, long priority
);

int    afind(ljw_index *index, char *key, int len, u *data_pointe
r);

int    fprefix(ljw_index *index, char *key, int len,
               int *match_count, u *data_pointer);

int    fwprefix(ljw_index *index, char *key, int len,
                int *match_count, u *data_pointer);

int    afindc(ljw_cursor *cursor, ljw_index *index, char *key,
              int len,u *data_pointer);

u      idlt(ljw_cursor *cursor, ljw_index *index, char *K, int len);

u      idle(ljw_cursor *cursor, ljw_index *index, char *K, int len);

u      ideq(ljw_cursor *cursor, ljw_index *index, char *K, int len);

u      idne(ljw_cursor *cursor, ljw_index *index, char *K, int len);

u      idge(ljw_cursor *cursor, ljw_index *index, char *K, int len);

u      idgt(ljw_cursor *cursor, ljw_index *index, char *K, int len);

int    idioo(ljw_cursor *cursor, ljw_index *index,
       char *K1, int L1, char *K2, int L2);

int    idioc(ljw_cursor *cursor, ljw_index  *index,
       char *K1, int L1, char *K2, int L2);

int    idico(ljw_cursor *cursor, ljw_index *index,
       char *K1, int L1, char *K2, int L2);

int    idicc(ljw_cursor *cursor, ljw_index *index,
       char *K1, int L1, char *K2, int L2);

int    idintsec(ljw_cursor *result_cursor, ljw_cursor *cursor1,
```

```
            ljw_cursor *cursor2);
    int     idunion(ljw_cursor *result_cursor, ljw_cursor *cursor1,
            ljw_cursor *cursor2);
    int     idsans(ljw_cursor *result_cursor, ljw_cursor *cursor);
    int     id_pf_of(ljw_cursor    *result_cursor, ljw_index *index,
               char *K, int len);
    int     id_pf_by(ljw_cursor    *cursor, ljw_index *index,
               char *K, int len);
    int     i_cursor(ljw_cursor *cursor, ljw_index *index);
    int     ui_cursor(ljw_cursor *cursor);
    int     get_akey(ljw_cursor *cursor, char** key);
    int     get_data(ljw_cursor *cursor, u *data_pointer);
    long    gtp(ljw_cursor *cursor, int priority_number);
    int     next(ljw_cursor *cursor, u *data_pointer);
    int     prior(ljw_cursor *cursor, u *data_pointer);
    int     fmp(ljw_cursor *cursor, int priority_number);
#endif
```

APPENDIX C -- LJWDEF

```
#ifndef LJWDEF_H
#define LJWDEF_H
//   ------------------------------------------------
//   The ljwdef.h file, containing
//   the syntax definitions for the LJW indexing.
//   Copyright (c) LJW 1989, 1992.
//   All rights reserved.
//
//
//         WARNING!
//
//   This work contains licensed program
//   material.
//
//   This work may not be copied in any
//   form without the permission of
//   Luther J. Woodrum
//
//   ------------------------------------------------ ifndef   LJW_WORDLETS
define   LJW_WORDLETS    1L
#define   ALF(c)    ((((c) >= 'a') && ((c) <= 'z')) || \
                     (((c) >= 'A') && ((c) <= 'Z')) || \
```

```
                                 ((c) == '_') || ((c) == '\''))
#define   DIG(c)      (((c) >= '0') && ((c) <= '9'))
#define   ALFDIG(c)   ((((c) >= 'a') && ((c) <= 'z'))  ||  \
                       (((c) >= 'A') && ((c) <= 'Z'))  ||  \
                       (((c) == '_') || ((c) == '\''))  ||  \
                       (((c) >= '0') && ((c) <= '9')))
#define   DLM(c)      ( ( ( (c) < 'a' ) || ( (c) > 'z' ) ) && \
                        ( ( (c) < 'A' ) || ( (c) > 'Z' ) ) && \
                          ( (c) != '_') && ( (c) != '\'')  && \
                        ( ( (c) < '0' ) || ( (c) > '9' ) ) )
#endif
#ifndef   u
#define   u  unsigned long
#endif
#ifndef   NUL
#define   NUL    0L
#endif
#ifndef   NULL
#define   NULL  0L
#endif
/*
#ifndef   FAILURE
#define   FAILURE    2147483647L
#endif
*/
//      ---------------------------------------------
//              The ljw_indexx structure.
//      ---------------------------------------------
```

```
#ifndef    ljw_indexx
typedef    struct              {
    u           org;           //  The origin word for the index.
    int         num_pfs;       //  # priority fields.
    int         unique_keys;   // 1 if unique keys only.
    u           indexx_flag;   //  Must be ljw_indexx_flag to be
                               //  valid.
    long        total;         //  Total number of entries.
                               }    ljw_indexx;
#define    ljw_indexx_flag    1113171923L
#endif
//   ---------------------------------------------------
//   The q_ljw_index macro, for displaying the contents
//   of the ljw_indexx structure.  Only the fields in the
//   ljw_indexx structure per se are displayed, not the
//   entries in the tree.
//   The display is only generated when compiling with
//   DEBUG defined.
//   ---------------------------------------------------
#ifndef    q_ljw_index
    #ifdef    DEBUG
#define    q_ljw_index(index)                              \
q2("The pointer to ljw_index   is %Fp\n",index);           \
q2("The pointer to ljw_indexx is %Fp\n",*index);           \
                               {                           \
ljw_indexx     *q_ljw_index_indexx;                        \
q_ljw_index_indexx = (ljw_indexx *)(*index);               \
q4("TOT_ORG = %Fp, num_pfs = %d, unique_keys = %d\n",      \
```

```
        q_ljw_index_indexx->org,                    \
        q_ljw_index_indexx->num_pfs,                \
        q_ljw_index_indexx->unique_keys);           \
                                }
        #endif
#ifndef DEBUG
#define  q_ljw_index(index)
    #endif
endif ifndef  ljw_cursorr
//      ------------------------------------------
//          The cursor structure, ljw_cursorr.
//          Copyright (c) LJW 1988, 1991
//      ------------------------------------------
typedef   struct    {
    u   *index;     //  The pointer to the index origin
                    //  arc.
    u   *yy;        //  The start point of the arc.
    u   *zz;        //  The end point of the arc.
                    //  When the state bit EQ is on, zz is
                    //  the data pointer for the cursor entry.
    u   lb;         //  The lower bound of the interval.
                    //  If the state is EQ, then lb is the
                    //  last four bytes of the key string,
                    //  rounded up to a multiple of 4 bytes.
    u   n;          //  The last key word used to position
                    //  the cursor.
    int scope;      //  The scope of the enumeration.
```

```
        int  state;    //  The state.
        int  i;        //  The depth in the tree;
                       //  Also the number of bytes equal
                       //  between the key and index entries,
                       //  rounded up to a multiple of 4 bytes.

u    R0;       //  The number of bytes reserved to hold
                       //  the key, when the get_key operation is
                       //  invoked.
        char *K0;      //  The pointer to the key from get_key.
        u    L0;       //  The number of bytes in the key from
                       //  get_key (not including the trailing
                       //  \0 byte)
        u    R1;       //  The amount of space reserved for K1.
        char *K1;      //  The first key in an interval.
        int  L1;       //  The length of the first key in an interval.
        u    R2;       //  The amount of space reserved for K2.
        char *K2;      //  The second key in an interval.
        int  L2;       //  The length of the second key in an
                       //  interval.
        //  R1 and R2 are the amounts of space reserved for
        //  the two keys. Initially they are zero.
        //  Subsequently, when space is required for the two keys,
        //  if there is already enough space reserved, just use it
        //  Otherwise, free up the existing area and allocate
        //  another that is big enough.
```

```
        //
        //      The expected value of the number of times an allocate
        //      has to be done is equal to LN(N) +.05771, where N is the
        //      total number of times the area is checked.
        //      Bits in the state variable:
        //          z is a right successor.
        #define     zright      8
        #define     zorigin     0       /* z is at the origin. */
        //      In what follows, "key" denotes a word which is
        //      a word in an argument key (assuming that the
        //      cursor has been set via some operation that
        //      uses an argument key.)
        #define     LT      4       //  index key < key.
        #define     LE      6       //  index key <= key.
        #define     EQ      2       //  index key = key (the cursor is
                                    //  pointing at an entry).
        #define     GE      3       //  index key >= key.
        #define     GT      1       //  index key > key.
                }   ljw_cursorr;
//      ------------------------------------------------
//              CURSOR STATES:
//      ------------------------------------------------
//      The cursor is represented by the yz arc in the
//      ljw_cursorr structure, which is stored as yy
//      and zz, together with the zright, LT, EQ, and
//      GT bits in the state field.
/*
```

In general, a cursor can have a yz arc as a left or a right
arc, and one of the combinations LT, EQ, or GT selected.
LT means that the index key is less than the argument key,
EQ means that they are equal, and GT means that the index key
is greater than the argument key.
The yz arc can be anywhere in the data structure, but
certain combinations raise problems, and so we refrain from
storing these combinations in the cursor.
Whenever y is not equal to z, we can trace from the yz arc
to anywhere in the structure, without complications.
However, If y = z, then either z is at the top of a little tree,
or it is at the origin of the tree of trees.
How can we tell which of these two cases holds?
Since y = z, does it make any sense to say that yz is a left or
a right arc? Or is it even necessary?
Ambiguity enters in when y = z. We have no way of determining
whether z is the origin or not.
Consider: If y = z is the top node of a little tree, and if
the B field indicates a left successor, then the predecessor
at the prior level can either be the origin, or another
little tree.
If y = z is the origin node, then the predecessor of z cannot
be computed the same way as the predecessor of a top node of
a little tree. This is because the field stored at the origin
is equal to the successor minus the origin address, whereas
the field stored in the B field of a top node is equal to the
top node address minus the predecessor.
Given only a single node, y = z, we therefore cannot determine whether said node is the origin or whether it is the top of a little tree.

Therefore, when we are in a little tree, we will refrain from storing a cursor that has y = z, and then we won't have this problem.

So, we will only store a cursor with y = z when the node y = z is the origin.

This simplifies the initialization logic for certain operations.

The state field only records the status of the yz arc, the LT, EQ, GT states, whether yz is left or right, and whether the top node of the TOT is selected.

In addition to the state field in the cursor, the scope field stores information about the scope of the operation that set the cursor.

The need for this can be seen by considering the sequence of identifying a set of index entries, and enumerating them via next or prior.

Suppose that the cursor is set via the afind function.

Then prior and next can access any of the index entries by means of repeated use.

But if the cursor is set via an identify function, e.g. indetifying an interval, then only the index entries in the interval may be enumerated.

This means that next and prior have to know whether the set was defined via identify, or whether the cursor was just set via an afindc or some other such operation.

Therefore there must be a field in the cursor that can be used for this purpose.

Similarly, the scope field must contain the information that a set of data pointers is the result of a cursor, which are participating in a subsequent cursor operation, such as union or intersection.

The cursor must also specify when an enumeration is complete, so that subsequent calls to prior or next return ljw_not_found. To that end, we use the name of the function as a prefix, and "_start" as a suffix, to signify the initial condition.
*/

```
//      ----------------------------------------
//      The codes for each of the operations,
//      to store in the scope variable in the
//      cursor, so we can tell what operation
//      was done last.
//      ----------------------------------------
//      COPYRIGHT (C) LJW, September, 1992.

#define    i_index_start      01
        #define    ui_index_start     02
        #define    scan_index_start   03
        #define    num_pfs_start      04
        #define    num_entries_start  05
        #define    ainsert_start      06
        #define    adelete_start      07
```

```
#define    stp_start        08
#define    afind_start      09
#define    afindc_start     10
#define    idlt_start       11
#define    idle_start       12
#define    ideq_start       13
#define    idne_start       14
#define    idge_start       15
#define    idgt_start       16
#define    idioo_start      17
#define    idioc_start      18
#define    idico_start      19
#define    idicc_start      20
#define    idintsec_start   21
#define    idunion_start    22
#define    idsans_start     23
#define    idxpfxk_start    24
#define    idkpfxx_start    25
#define    i_cursor_start   26
#define    ui_cursor_start  27
#define    get_key_start    28
#define    get_data_start   29
#define    gtp_start        30
#define    next_start       31
#define    prior_start      32
#define    fmp_start        33
#define    f_pfx_start      34
#define    f_dpfx_start     35
```

```
#define   i_graph_start      36
#define   ui_graph_start     37
#define   insert_node_start  38
#define   insert_arc_start   39
#define   get_node_start     40
#define   id_preds_start     41
#define   id_succs_start     42
#define   next_node_start    43
#define   id_node_fwd_start  44
#define   id_node_bwd_start  45
#endif
// ------------------------------------------------
#ifndef   q_ljw_cursor
    #ifdef   DEBUG
#define   q_ljw_cursor(cptr)                              \
q0;                                                       \
if (ctr)                              {                   \
ljw_cursorr  *crsr;                                       \
int   z_right;                                            \
N    *vc;                                                 \
if ((*cptr) == NULL)                  {                   \
printf("The cursor at %Fp is NULL.\n",cptr);              \
                                      }                   \
else                                  {                   \
crsr = (ljw_cursorr *)(*cptr);                            \
printf("crsr = %Fp\n",crsr);                              \
printf("index    = %Fp\n",crsr->index);                   \
printf("   yy = %Fp:\n",crsr->yy);                        \
```

```
        printf("    zz = %Fp:\n",crsr->zz);                         \
        printf("    lb = %Fp\n",crsr->lb);                          \
        printf(" state = %d\n",crsr->state);                        \
        printf("     i = %d\n",crsr->i);                            \
        if (crsr->state == zorigin)   {                             \
        printf("    The cursor is at the origin.\n");               \
                                      }                             \
        else                          {                             \
        z_right = crsr->state & zright;                             \
        printf("In see_ljw_cursor, z_right = %d\n",z_right);        \
        {cn((N *)(crsr->yy), (N *)(crsr->zz), z_right);    }        \
                                      }                             \
                                    }                               \
                                  }
    #else
    #define   q_ljw_cursor(c)
    #endif
endif
    /*----------------------------------------
    The syntax of the various functions follows.
    ----------------------------------------*/
u    a2w(char *, int, int);
#ifndef   ascan
u    ascan(ljw_index *index);
#endif
#ifndef   ffree
//   ----------------------------------------
//   Define the ffree macro.
```

```
//    ------------------------------------------------
    #ifdef    PC_ENV
        #define ffree(x)    farfree((void far *)x)
    #endif
    #ifndef   PC_ENV
        #define ffree(x)    free((void *)x)
    #endif
endif
#ifndef   thd
    void thd();
#endif
#ifndef   NODE
#define NODE 282475249L
#endif
#ifndef   ljw_space
/*---------------------------------------------------
The space control block ljw_space.
-----------------------------------------------------*/
typedef struct {
u    ljw_free; /* The arc to the tree top.   */
u    ljw_base; /* The base for the space.    */
u    ljw_length;    /* The number of bytes in the space. */
u    ljw_super_space; /* The arc to the superspace,
            if there is one, otherwise zero. */
    }    ljw_space;
#endif
u    wsearch(u *, u *, int);
u    winsert(u *, u *, int, u);
```

```
u       wdelete(u *, u *, int);
u       wsrch2(u *, u);
u       wins2(u *, u, u);
u       wdel2(u *, u);
u       wscan2(u *);
u       a2w(char *, int, int);
unsigned long  load_bits(unsigned long m[], u start, u n);
void store_bits(u *m, u start, u n, u value);
ljw_space *ispace(u);

//      ---------------------------------------------
//      The following definitions are used in ainsert,
//      adelete, afind, etc..
//      ---------------------------------------------
#define nodedb
#define sn 16
#define sn4 20
#define B e0
#define RO e0
#define M 4
#define M4 (-4L)
#define M2 (-2L)
#define M1 (-1L)
#define m4 (4L)
#define m3 (3L)
#define m2 (2L)
#define m1 (1L)
#define f00 (0L)
#define f01 (1L)
```

```
#define f10 (2L)
#define f11 (3L)
#define cf10 (-3L)
#define    ljw_priority_limit  255
```

```
//  ----------------------------------------------------
//  The following is the value of the B field for
//  a subtree of equals.
//  ----------------------------------------------------
#define equals_arc -4L    //  The arc field value for the
                          //  origin of a subtree of equals.
#define   equals_flag    equals_arc
#define   SESIZE    4L
#define gobble(lng,c,l,nx) ((a=c,c=c+lng) < l ? a :     \
           a=gs(&c,&lng,&l,&nx))
```

```
/*-----------------------------------------------------
   These are the private structure declarations for LJW.
------------------------------------------------------*/
```

/* The structure definitions for the tree node N and
the cursor C. This is the node with a left arc e0,
a right arc e1, and a key k.

All three of these are unsigned integers, for various
reasons.

The EDGE fields e0 and e1.
---------------------------

Whenever the node N is a TOP NODE, i.e. the
table parameter for the next etc. programs.
These decode the TOP NODE as follows:

The e0 field is equal to the left successor of N,
minus the predecessor of N.

The e1 field is equal to the right successor of N,
minus the predecessor of N.

The B field, B.

----------------

The B field occupies the same position in the node N
as the left arc field e0. It is a subtraction offset
arc from the top node in the little tree to the node
from the predecessor little tree that points to the
current little tree's top node.

The penultimate bit in the B field is a zero if the
top node in the current little tree is a left successor
of the node in the predecessor tree, or is a one if
the top node in the current little tree is a right
successor of the node in the predecessor tree.

Thus, the expression " (u)2 & node->B " is used to test
the bit. If true, then the current little tree's
top node is a right successor.

If the predecessor node in the predecessor little tree
is the top node in that little tree, then the top node
of the current little tree must be a right successor,
because the top node in a little tree only has a right
forward arc.

Also, by convention, the top node in each little tree
is its own predecessor. Therefore if the current
top node is a left successor of the predecessor little
tree's top node, (which will be indicated by the predecessor's node's predecessor being itself), then
the node consists of a single left arc field, and
this special node is called the ORIGIN for the entire
tree of trees.

The B field's last bit is used to signify whether
there is only one entry in the tree, or if there
are at least two.

Thus if b is the B field, then (b & 1) is non-zero
if there is exactly one entry in the tree, and
it is zero if there are at least two tree entries.

Inner arcs
------------

Each arc v going to an inner node y has
(v & 2) = 0 if y points to a left inner node,
and (v & 2) is not 0 if y points to a left
sink, and
(v & 1) = 0 if y points to a right inner node,
and (v & 1) is not 0 if y points to a right sink.
Therefore the sink arcs are completely unused
for the purpose of indicating end-of-path
conditions.
This then allows them to be used for something else.

Sink arcs
----------

Accordingly, for a sink arc v,
(v & 2) = 0 if the arc does not point to a next level top node of a next level little tree, or
(v & 2) equals 0 when it does points to a next
level little tree.

If (v & 2) = 0, and (v & 1) = 0 then there are
more records than one that are associated with
the key that ends with the sink arc v,
so that v points only to a subtree of duplicates,
and when (v & 2) is not 0 and (v & 1) is not 0
then there are both a next level little tree and
also one or more records that match the key.
Accordingly, at the top node at the next level,
the arc field f in front of the first field in the
top node either points to a single record, or it
points to a subtree of equal records.

If (f & 3) = 0, then it points to a subtree of
equals, otherwise it is equal to 1, and f points
to a single record.

Since f is an ORIGIN field, it is identified as
a left arc by the B field in the top node that
it points to in the subtree of equal keys.
Therefore when backtracing in a subtree of equals,
when it gets to the origin for the tree, the units
bit position is a one to indicate the subtree of
equals.

Similarly, the ORIGIN for the entire tree of trees
has the two low order bits of its arc field used
as a sink arc that points to the appropriate type
of entry.

```
The KEY field k.
-----------------

The k field is the lower bound for all of the
entries in the right subtree in the node N.
k is unsigned because the binary collating sequence
for four bytes has to be the same for characters
as it is for 32-bit numbers.
Four unsigned bytes map into a 32-bit unsigned word.
Now, here is the actual N typedef statement!      */
//   -------------------------------------------------
//   The definition of the structure N, for a NODE.
//   -------------------------------------------------
#ifndef   N
typedef   struct     {
          u e0;      //   The left arc field.
          u e1;      //   The right arc field.
          u k;       //   The key field.
nodedb    u node;    //   The NODE field, for debugging.
                     }   N;
#endif
//   -------------------------------------------------
//   The node has the format
//
//   |   e0   |   e1   |   k   |   node
//   -------------------------------------------------
//   | left arc|right arc|  key   |   validity check
//   -------------------------------------------------
//123456789 123456789 123456789 123456789 123456789 123456789 12
```

3456789

```
/* Rambam GRAPH functions. */
/* These will be added to rambam.h if and when they become
available to the user.  They have not been written yet. */
int    i_graph(ljw_graph *graph);

int    ui_graph(ljw_graph *graph);

int    insert_node(ljw_graph *graph, char *node_name,
           u node_rec_ptr);

int    insert_arc(ljw_graph *graph, char *first_node,
           char *last_node, u arc_rec_ptr);

int    get_node(ljw_graph    *graph,   ljw_graph_cursor *gcursor,
           char *node_name);

int    id_preds(ljw_graph_cursor *gcursor, char *node_name);

int    id_succs(ljw_graph_cursor *gcursor, char *node_name);

int    next_node(ljw_graph_cursor *gcursor);

int    id_node_fwd(ljw_graph_cursor *gcursor, ljw_graph *graph );

int    id_node_bwd(ljw_graph_cursor *gcursor, ljw_graph *graph);
#endif
```

APPENDIX D -- LJWVARS

```
//   Copyright (c) LJW September, 1992.
//   All rights reserved.
#ifndef   LJWVARS_H
#define   LJWVARS_H
#ifndef   ctr
#define   ctr    (ljw_qctr(__FILE__,__LINE__))
#endif
#ifndef   ljw_ctr
    #ifdef    DEBUG
extern    long ljw_ctr;
    #endif
endif
#ifndef qainsert
#define qainsert q1("Beginning ainsert\n");
#endif
#ifndef qadelete
#define qadelete q1("Beginning adelete\n");

#endif
#ifndef qscan
#define qscan q1("Beginning scan\n");

#endif
#ifndef qaf
```

```
#define qaf      q_u("af",af)
#endif
#ifndef qalt
#define qalt     q_N_adr("alt",alt)
#endif
#ifndef qb
#define qb       q_u("b",b)
#endif
#ifndef qbase
#define qbase    q_u("base",base)
#endif
#ifndef qct4
#define qct4     q_int("ct4",ct4)
#endif
ifndef qd
#define qd       q_u("d",d)
#endif
#ifndef qdif
#define qdif     q_u("dif",dif)
#endif
#ifndef qe
#define qe       q_u_adr("e",e)
#endif
#ifndef qeop
#define qeop     q_u("eop",eop)
endif //   Copyright (c) LJW September, 1992.
```

```
//    All rights reserved.
#ifndef qf
#define qf      q_u("f",f)
#endif
#ifndef qh
#define qh      q_u("h",h)
#endif
#ifndef qi
#define qi      q_int("i",i)
#endif
#ifndef ql
#define ql      q_u("l",l)
#endif
#ifndef qlb
#define qlb     q_u("lb",lb)
#endif
#ifndef qleft
#define qleft   q_u("left",left)
#endif
#ifndef qlevel
#define qlevel  q_int("level",level)
#endif
#ifndef qlh
#define qlh     q_u("lh",lh)
#endif
#ifndef qn
#define qn      q_u("n",n)
#endif
```

```
#ifndef qnh
#define qnh     q_u("nh",nh)
#endif
#ifndef qnl
#define qnl     q_u("nl",nl)
#endif
#ifndef qnn
#define qnn     q_N_adr("nn",nn)
endif //    Copyright (c) LJW September, 1992.
//    All rights reserved.
#ifndef qnw
#define qnw     q_int("nw",nw)
#endif
#ifndef qr
#define qr      q_N_adr("r",r)
#endif
#ifndef qrf
#define qrf     q_u("rf",rf)
#endif
#ifndef qright
#define qright  q_u("right",right)
#endif
#ifndef qrl
#define qrl     q_int("rl",rl)
#endif
#ifndef qrt
#define qrt     q_int("rt",rt)
```

```
endif
#ifndef qs
#define qs       q_u("s",s)
#endif
#ifndef qt
#define qt       q_N_adr("t",t)
#endif
#ifndef qtable
#define qtable   q3("table = %Fp: %Fp\n",table,*table);
#endif
#ifndef qindexx
#define qindexx      q2("indexx = %Fp: %Fp\n",indexx);
#endif
#ifndef qv
#define qv       q_u("v",v)
#endif
#ifndef qw
#define qw       q_u("w",w)
#endif
#ifndef qx
#define qx       q_N_adr("x",x)
#endif
#ifndef qxe
#define qxe      q_u_adr("xe",xe)
#endif
#ifndef qcw
#define qcw      q_long_adr("cw",cw)
#endif
```

```
    q6("%s = %Fp, e0: %Fp e1: %Fp k: %Fp\n",name,value,value->e
0,value->e1,value->k);
```

```
endif ifndef qq_nn define qq_nn    q_N_adr("nn",nn)

endif ifndef qq_x define qq_x     q_N_adr("x",x)

endif ifndef qq_y define qq_y     q_N_adr("y",y)

endif ifndef qq_z define qq_z     q_N_adr("z",z)

endif ifndef qq_r define qq_r     q_N_adr("r",r)

endif ifndef qq_z_B define qq_z_B q2(" z->B = %Fp\n",z->B);

endif ifndef cc_node ifdef    VALIDATE define cc_node(name,the_node)                                          \ ljw_ctr++;                                                              \ if(the_node->node != NODE)       {                                      \
```

```
#ifndef qy
#define qy      q_N_adr("y",y)
#endif

//   Copyright (c) LJW September, 1992.
//   All rights reserved.
#ifndef qz
#define qz      q_N_adr("z",z)
#endif
#ifndef q_u
#define q_u(name,value)   q3("%s = %Fp\n",name,value);
#endif
#ifndef q_int
#define q_int(name,value)    q3("%s = %d\n",name,value);
#endif
#ifndef q_long
#define q_long(name,value)   q3("%s = %ld\n",name,value);
#endif
#ifndef q_long_adr
#define q_long_adr(name,value)                               \
q5("%s = %Fp, *%s = %Fp\n",name,value,name,*value);
#endif
#ifndef q_u_adr
#define q_u_adr(name,value)                                  \
q5("%s = %Fp, *%s = %Fp\n",name,value,name,*value);
#endif
#ifndef q_N_adr
#define q_N_adr(name,value)                                  \
```

```
        printf("In %s, line %d, the pointer ",__FILE__,__LINE__); \
        printf(name);                                              \
        printf(", %Fp, is not pointing at a node.\n",the_node);    \
        printf("The counter = %ld\n",ljw_ctr);                     \
        return(ljw_failure);     }
    #endif
    #ifndef   VALIDATE
    #define cc_node(name,the_node)
    #endif
endif
// ---------------------------------------------------------
#ifdef   DEBUG
    long see_node(char *pgm, int line_num, N *y, N *z, int z_right);
    #ifndef   cn
        #define   cn(y,z,z_right)                                  \
            if ((see_node(__FILE__,__LINE__,y,z,z_right)) == ljw_failure) \
            return(ljw_failure);
    #endif
#else
    #ifndef   cn
        #define   cn(y,z,z_right)
    #endif
endif
// ---------------------------------------------------------
#ifdef   DEBUG
```

```
    void see_node3(char *pgm, int line_num, char *leg, N *x, N
*y, N *z);

ifndef   cn3 define   cn3(s,x,y,z)    see_node3(__FILE__,__LINE__,s
,x,y,z);

endif else ifndef   cn3 define   cn3(s,x,y,z)

endif endif

//   Copyright (c) LJW September, 1992.

//   All rights reserved.

ifndef ccx define ccx      cc_node("x",x)

endif ifndef ccy define ccy      cc_node("y",y)

endif ifndef ccz define ccz      cc_node("z",z)

endif ifndef cct define cct      cc_node("t",t)

endif ifndef ccnn define ccnn     cc_node("nn",nn)

endif ifndef ccalt
```

```
#define ccalt   cc_node("alt",alt)
#endif
#ifndef qq_alt
define qq_alt q1("qq_alt;\n");    ccalt endif
ifndef qq_t
define qq_t    q1("qq_t;\n");     cct endif
ifndef qa_n
#define qa_n    q2("a_n = %Fp\n",a_n);

endif ifndef qd
define qd      q2(" d = %Fp\n",d);

#endif
//   Copyright (c) LJW September, 1992.
//   All rights reserved.
#endif
```

APPENDIX E -- WORDMACS

```
#ifndef    WORDMACS_H
#define    WORDMACS_H
/*---------------------------------------------------------
The wordmacs collection of macros for operations on
trees.
Copyright (c) LJW April, 1992.
All rights reserved.
This work may not be copied in any
form without the permission of
Luther J. Woodrum
-----------------------------------------------------------*/
#ifndef    get_r
#define    get_r(y,z)                                       \
    /*    ---------------------------------------------*/   \
    /*    get_r, the function to find the last     */       \
    /*    right arc (r,nn) on the path to y.       */       \
    /*    ---------------------------------------------*/   \
    /*    ql("Begin get_r.\n");                 */          \
/*printf("The starting arc is %Fp  %Fp\n",y,z);*/           \
    r = y;    /*qr;*/    l = r->k;  /*ql;*/                 \
    for ( nn =  (N *)((u)z & M4) ;      l <= r->k; )        \
                          {                                 \
    /*    qq_r;       qnn;        */                        \
    t = (N *)( (u)nn - (r->e0 & M4));    cct;  qq_t;        \
    nn = r;   r = t;    /*qr;      */                       \
```

```
                                }                               \
        /*      ql("End get_r.\n");*/                           \
        /*      qr;  qnn;       qq_r;*/
#endif
#ifndef   get_rx
//      -----------------------------------------------
#define   get_rx(y, z)    x = (N *)(((u)z & M4) - (y->e0 & M4));  \
                get_r(y, z);
//      -----------------------------------------------
#endif
#ifndef   gdl
#define   gdl                                                   \
/*-------------------------------------------------- */         \
/*      Go down into the left subtree of z.          */         \
/*      v must be set before invoking gdl.           */         \
/*-------------------------------------------------- */         \
eop = v & f10;       qeop;                                      \
e = &z->e0;   v = *e;   x = y;   y = z;                         \
z = (N *)((u)x + (v & M4));                                     \
/*      qe;  qv;  qx;  qy;  qz;  */
//              y o x
//                :
//              z o y'
//               / \
//             z' o  o
#endif
#ifndef   gdr
#define   gdr                                                   \
```

```
/*---------------------------------------------*/  \
/*  Go down into the right subtree of z.       */  \
/*  v must be set before invoking gdr.         */  \
/*---------------------------------------------*/  \
eop = v & f01;     qeop;                           \
r = z;     e = &z->e1;    nl = nh;                 \
v = *e;  x = y;   y = z;   z = (N *)((u)x + (v & M4));  \
/*qr;      qe;       qv;       qy;   qz;*/
#endif
// ---------------------------------------------
#ifndef   gup1
#define   gup1(x,y,z)         {             \
          yz_left_get_x(x,y,z);             \
          step_up(x,y,z);     }
#endif
// ---------------------------------------------
/*  ---------------------------------------------
    yz_left_get_x, the function to compute the
    predecessor of a left arc.
    ---------------------------------------------*/
//           x' o
//               :
//             y o
//              / \
//           z o
#ifndef   yz_left_get_x
#define   yz_left_get_x(x,y,z)              \
    x = (N *)(((u)z & M4) - (M4 & y->e0));
```

```
endif
/*  ----------------------------------------------
    yz_right_get_x, the function to compute the
    predecessor of a right arc.
    ----------------------------------------------*/
//              o x'
//              :
//              o y
//             / \
//                o z
#ifndef  yz_right_get_x
#define  yz_right_get_x(x,y,z)                    \
    x = (N *)(((u)z & M4) - (M4 & y->e1));
#endif
/*  ----------------------------------------------
    xy_left_get_right_z.
    ----------------------------------------------*/
#ifndef  xy_left_get_right_z
#define  xy_left_get_right_z(x,y,z)         {     \
    r = y;      /* Save the last right arc.  */   \
    cop = x->e0 & f01;/* Set end-of-path-flag.*/  \
    v = y->e1;        /* Get the arc field.   */  \
    n1 = n ^ r->k; /* Get the XOR.            */  \
    goto go_down;  /* Go down from there.     */  \
                                                  }
endif
/*  ----------------------------------------------
    xy_right_get_right_z.
```

```
------------------------------------------------*/
#ifndef   xy_right_get_right_z
#define   xy_right_get_right_z(x,y,z)          {    \
    r = y;    /* Save the last right arc.   */   \
    eop = x->e1 & f01;/* Set end-of-path-flag.*/ \
    v = y->e1;      /* Get the arc field.    */   \
    n1 = n ^ r->k;  /* Get the XOR.          */   \
    goto go_down;   /* Go down from there.   */   \
                                                   }
endif
/*  -------------------------------------------------
    xy_left_get_left_z.
    ------------------------------------------------*/
#ifndef   xy_left_get_left_z
#define   xy_left_get_left_z(x,y,z)            {    \
    eop = x->e0 & f10;/* Set end-of-path-flag.*/ \
    v = y->e0;      /* Get the arc field.    */   \
    get_r(x,y);     /* Get the limit node.   */   \
    n1 = n ^ r->k;  /* Get the XOR.          */   \
    goto go_down;   /* Go down from there.   */   \
                                                   }
endif
/*  -------------------------------------------------
    xy_right_get_left_z.
    ------------------------------------------------*/
#ifndef   xy_right_get_left_z
#define   xy_right_get_left_z(x,y,z)           {    \
    r = x;    /* Save the last right arc.   */   \
```

```
            eop = x->e1 & f10;/* Set end-of-path-flag.*/  \
            v = y->e0;       /* Get the arc field.    */  \
            n1 = n ^ r->k;   /* Get the XOR.          */  \
            goto go_down;    /* Go down from there.   */  \
                                                      }
endif
//      ------------------------------------------
//      This demonstrates how to determine whether
//      the inner arc xy is a left or a right arc.
//      ------------------------------------------
//              if (x->k <= y->k)         {                \
//                                                        \
//                          x o y'                        \
//                             \                          \
//                              y o z'                    \
//                                 / \                    \
//                                z o                     \
//                                          }             \
//              else                      {               \
//                                                        \
//                              x o y'                    \
//                                 /                      \
//                                y o z'                  \
//                                   / \                  \
//                                  z o                   \
//                                          }
#ifndef  left_arc
#define  left_arc(x,y)  ( (x->k) > (y->k) )
```

```
endif
#ifndef    right_arc
#define    right_arc(x,y) ( (x->k) <= (y->k) )
#endif
#ifndef    step_up
#define    step_up(x,y,z) {    z = y;    y = x;    }
#endif
#ifndef    step_down
#define    step_down(x,y,z)    {    x = y;    y = z;    }
#endif
//    ---------------------------------------------------
//    up_level(y,z), the function to go up a level from
//    a node, z, to get an arc yz on the prior level.
//    up_level computes y in the prior level little tree,
//    so that yz is an EOP arc in the prior level tree.
//    If the arc yz is a left arc, then up_level(y,z)
//    is a zero.
//    If the resulting arc is a right arc, then
//    up_level(y,z) is equal to f10.
//    ---------------------------------------------------
#ifndef    up_level
#define    up_level(y,z)                              \
     ((y = (N *)((u)z - (z->B & M4))), (z->B & f10))
#endif
//    ---------------------------------------------------
//    if_up_level(y,z), the function to go up a level
//    from a node y.
//    ---------------------------------------------------
```

```
#ifndef  if_up_level
#define  if_up_level(y,z)    z = y;    if (up_level(y,z))
#endif
//    ---------------------------------------------
//    top_arc(x,y) is non-zero if x and y are both
//    the top node of a little tree.
//    ---------------------------------------------
#ifndef  top_arc
#define  top_arc(x,y)   (x == y)
#endif
//    ---------------------------------------------
//    tree_origin(y) is non-zero if y is
//    the origin node of the tree of trees.
//    ---------------------------------------------
#ifndef  tree_origin
#define  tree_origin(y) (!(y->B & M4))
#endif
//    ---------------------------------------------
//    inner_z_get_top(x,y,z) traces the backpath
//    to the top node in a little tree, starting
//    with an arc yz, where z is an inner node.
//
//    When finished, x and y are both equal.
//    Using the step_up(x,y,z) and up_level(y,z)
//    functions gets the arc in the little tree on
//    the next level up the backpath.
//    ---------------------------------------------
#ifndef  inner_z_get_top
```

```
#define   inner_z_get_top(x,y,z)   {              \
/*   q1("Beginning inner_z_get_top.\n"):*/        \
/*   q4("x = %Fp, y = %Fp, z = %Fp\n",x,y,z):*/\
while (!(top_arc(y,z)))           {              \
    if (left_arc(y,z))   {                       \
        yz_left_get_x(x,y,z)                     \
/*   q1("yz is a left arc.\n"); */               \
/*   q4("x = %Fp, y = %Fp, z = %Fp\n",x,y,z);*/\
                         }                       \
    else                 {                       \
        yz_right_get_x(x,y,z)                    \
/*   q1("yz is a right arc.\n");      */         \
/*   q4("x = %Fp, y = %Fp, z = %Fp\n",x,y,z);*/\
                         }                       \
q1("In inner_z_get_top.\n");                     \
        step_up(x,y,z)                           \
                              } }
#endif
/*   ------------------------------------------   */
/*   The yz_left_get_eop macro, to compute        */
/*   the eop flag bit for z either from the       */
/*   e0 or e1 field at x, depending on            */
/*   whether xy is a left or a right arc          */
/*   respectively.                                */
/*   ------------------------------------------   */
#ifndef   yz_left_get_eop
#define   yz_left_get_eop(x,y,z)                  \
if (x->k <= y->k)    /* See if xy is a left   */  {   \
```

```
                       /* or a right arc.      */    \
                       /* It's a right arc.    */    \
            eop = (x->e1 & f10);                }    \
else        /* xy is a left arc.               */  {  \
            eop = (x->e0 & f10);                }
#endif
/*    ---------------------------------------   */
/*    The yz_right_get_eop macro, to compute    */
/*    the eop flag bit for z either from the    */
/*    B field at x or from the e0 or e1 field   */
/*    at x if x,y is not the top node.          */
/*    ---------------------------------------   */
#ifndef   yz_right_get_eop
#define   yz_right_get_eop(x,y,z)                    \
if (x->k <= y->k)   /* See if xy is a left     */ {  \
                    /* or a right arc.         */    \
    if (top_arc(x,y))   /* Right */  {               \
        eop = (x->B & f01);          }               \
    else                             {               \
        eop = (x->e1 & f01);         }          }    \
else        /* xy is a left arc.     */         {    \
    eop = (x->e0 & f01);                        }
#endif
/*    ---------------------------------------   */
/*    The yz_left_get_f macro, to get the two   */
/*    EOP flag bits from the arc yz, using the  */
/*    arc field at y.                           */
/*    ---------------------------------------   */
```

```
#ifndef   yz_left_get_f
#define   yz_left_get_f(y,z)                      \
f = f11 & y->e0;
#endif
/*   ----------------------------------------   */
/*   The yz_right_get_f macro, to get the two    */
/*   EOP flag bits from the arc yz, using the    */
/*   arc field at y.                             */
/*   ----------------------------------------   */
#ifndef   yz_right_get_f
#define   yz_right_get_f(y,z)                     \
f = f11 & y->e1;
#endif
//   ----------------------------------------
//   Trace the backpath to the top of
//   the current little tree, starting
//   with a left arc yz.
//   ----------------------------------------
#ifndef   left_z_get_top
#define   left_z_get_top(x,y,z)     {      \
          yz_left_get_x(x,y,z)             \
          step_up(x,y,z)                   \
          inner_z_get_top(x,y,z)           \
                                    }
endif
//   ----------------------------------------
//   Trace the backpath to the top of
//   the current little tree, starting
```

```
//      with a right arc yz.
//      ------------------------------------
#ifndef    right_z_get_top
#define    right_z_get_top(x,y,z)    {        \
           yz_right_get_x(x,y,z)              \
           step_up(x,y,z)                     \
           inner_z_get_top(x,y,z)             \
                                     }
endif
//      ----------------------------------------------------
//      The choose macro, to choose which way to go from
//      a given arc in the tree.
//
//      Given a key from the left subtree of a node, low,
//      and a key from the right subtree of the same node,
//      high, choose computes the three exclusive-or
//      quantities nl, nh, and lh, where n is the key we
//      are using to locate a delta arc in the tree,
//      l is the low value, and h is the high value.
//
//      Then it branches to c, d, or e, if nl, nh, or lh
//      respectively is the smallest of the three
//      exclusive-or quantities.
//      ----------------------------------------------------
#ifndef    choose
#define    choose(low, high, c, d, e)                    \
           nl = n ^ low;  nh = n ^ high;  lh = nl ^ nh;  \
           if (nl < nh)                    {             \
```

```
                    if (nl < lh)    goto c;             \
                    else            goto e;             \
                                            }           \
            else                            {           \
                    if (nh < lh)    goto d;             \
                    else            goto e;             \
                                            }
endif
#ifndef    yz_left_get_state
#define    yz_left_get_state                            \
    state = (1 < n ? LT : ((n == 1) ? EQ : GT));
#endif
#ifndef    yz_right_get_state
#define    yz_right_get_state                           \
    state = (1 < n ? LT : ((n == 1) ? EQ : GT)) + zright;
#endif
#ifndef    signal_if_found
#define    signal_if_found                              \
if (state & EQ)        {                                \
    /*    q1("Found.\n");     */                        \
    return((u)z);   /* Signal that the entry was found.*/ \
                    }                                   \
else                    {                               \
    /* q1("Not found.\n");          */          \
    return(ljw_not_found);                              \
                    }
endif
#ifndef    signal_not_found
```

```
#define   signal_not_found                        \
                    {                             \
    /*   q1("Not found.\n");  */                  \
    return(ljw_not_found);                        \
                    }                             \
#endif
#ifndef  get_cursor
//  --------------------------------------
//  Get the cursor variables back into
//  the local names for them.
//  --------------------------------------
#define   get_cursor(cursor)         {            \
ljw_cursorr    *get_cursor_s_cursor;              \
get_cursor_s_cursor = (ljw_cursorr *)(*cursor);   \
y = (N *) get_cursor_s_cursor->yy;                \
z = (N *) get_cursor_s_cursor->zz;                \
l = get_cursor_s_cursor->lb;                      \
state = get_cursor_s_cursor->state;               \
i = get_cursor_s_cursor->i;           }
#endif
#ifndef   save_cursor
#define   save_cursor(cursor)        {   \
ljw_cursorr    *get_cursor_s_cursor;         \
get_cursor_s_cursor = (ljw_cursorr *)(*cursor);   \
get_cursor_s_cursor->yy = (n *)y;                 \
get_cursor_s_cursor->zz = (n *)z;                 \
get_cursor_s_cursor->lb = l;                      \
get_cursor_s_cursor->state = state;       \
```

```
get_cursor_s_cursor->i = i;          }
#endif
//   ----------------------------------------------------------
//   Starting with the user variable "index", of type
//   ljw_index *, this macro validity checks the parameter,
//   and computes the RAMBAM "indexx" variable, of type
//   ljw_indexx *.
//   ----------------------------------------------------------
#ifndef  get_indexx
#define  get_indexx                                              \
if (index == NUL)               {                                \
     printf("Failure in %s at line %d.\n",__FILE__,__LINE__);    \
     printf("A null index pointer was passed to %s.\n");         \
     printf("ljw_ctr = %ld\n",ljw_ctr);                          \
     return(ljw_failure);                                        \
                                }                                \
indexx = (ljw_indexx *)(*index);                                 \
if (indexx == NUL)              {                                \
     printf("Failure in %s at line %d.\n",__FILE__,__LINE__);    \
     printf("Uninitialized ljw_index pointer %Fp at location %Fp\
.\n",indexx,index);                                              \
     printf("ljw_ctr = %ld\n",ljw_ctr);                          \
     return(ljw_failure);                                        \
                                }                                \
if (indexx->indexx_flag != ljw_indexx_flag) {                    \
     printf("Failure in %s at line %d.\n",__FILE__,__LINE__);    \
     printf("Invalid ljw_index pointer %Fp at location %Fp.\n",i
```

```
ndexx,index);\
    printf("ljw_ctr = %ld\n",ljw_ctr); \
    return(ljw_failure);                         \
                                              }
endif
endif
```

APPENDIX F -- I_INDEX

```
/* ---------------------------------------------
The i_index function, to instantiate an ljw_index.
Copyright (c) LJW September, 1992.
All rights reserved.
---------------------------------------------*/ undef DEBUG include "ljwsys.h"

int  i_index(ljw_index *index, int unique, int num_priorities)
{
// Begin variable declarations.

ljw_indexx    *indexx;

int   ival;

long  lval;

time_t    the_time;

// End of variable declarations.

ifdef    EXPIRE if (time(0) > EXPIRE)           {
    printf("This software and its license have expired.\n");
    return(ljw_failure);
                                }
endif ql("Begin i_index..\n");

if ( (unique != 0) && (unique != 1) )   {
    printf("In i_index, the unique keys argument is not a 1 or 0.\n");
    return(ljw_failure);
```

```
                                                }
if ((num_priorities > ljw_priority_limit)    ||

(num_priorities < 0))            { printf("In i_index, the num_priorities argument is invalid.
\n");

return(ljw_failure);
                                         }
indexx = (ljw_indexx *)(farmalloc(sizeof(ljw_indexx)));

if (0L == indexx)               { q1("Not enough space to i_index.\n");

return(ljw_nospace);

} else                            { q2("The ljw_index structure is at %Fp\n",index);

q2("the ljw_indexx structure is at %Fp.\n",indexx);

*index = (ljw_index)indexx;    //   Set the pointer to ljw_indexx
.

//   Set the indexx_flag.

indexx->indexx_flag = ljw_indexx_flag;

indexx->org = NULL; //   Set the TOT origin.

indexx->num_pfs = num_priorities;  //   Set the number of
                        //   priority fields.

indexx->unique_keys = unique; //   Set the option for unique key
s only.

indexx->total = 0;      //   Initialize the total number of ent
ries.

q_ljw_index(index);

return(ljw_ok);
                                }
                                        }
```

```
//   -----------------------------------------------------
//   The ui_index function, to uninstantiate an ljw_index.
//   ----------------------------------------------------- int    ui_index(ljw_index *index)        {
if (*index != NULL)              {
ffree(*index);
*index = NULL;
                                 }
return(ljw_ok);
                                         }

//   -----------------------------------------------------
//   num_pfs, the number of priority fields in an index.
//   -----------------------------------------------------
int    num_pfs(ljw_index *index)         {
ljw_indexx     *indexx;  //   The ljw_indexx pointer.
u      num;
indexx = (ljw_indexx *)(*index);   //   Get ljw_indexx ptr.
num = indexx->num_pfs;
if (( num < 0 ) || (num > 255))    {
printf("Invalid number of priorities in ljwindex at %lx\n",index);
return(ljw_failure);
                                   }
return(num);   //   If not invalid, then give back the number.
                                         }

//   -----------------------------------------------------
//   num_entries, the number of entries in an index.
```

```
//    --------------------------------------------
long   num_entries(ljw_index *index)          {
ljw_indexx     *indexx;   //   The ljw_indexx pointer.
long num;
indexx = (ljw_indexx *)(*index);   //   Get ljw_indexx ptr.
num = indexx->total;
if ( num < 0 )                      {
printf("Negative number of entries in ljwindex at %lx\n",index);
return(ljw_failure);
                                    }
return(num);   //   If not invalid, then give back the number.
                                    }
```

APPENDIX G -- I_CURSOR

```
/*------------------------------------------------
The ui_cursor program.
Copyright (c) LJW September, 1992.
All rights reserved.
This work may not be copied in any
form without the permission of LJW
--------------------------------------------------*/
#include "ljwsys.h"
//   ------------------------------------------------
//   The i_cursor function.
//   ------------------------------------------------
int      i_cursor(u *cursor_ptr,ljw_index *index)     {
/* cursor: The address of the address of the real cursor.
 */
// Declare variables.
ljw_cursorr    *real_cursor_ptr;     //   The "real" pointer to the cursor.
u    n0,n1,n2;
// End of variable declarations.
q1("Begin i_cursor.\n");
real_cursor_ptr = (ljw_cursorr *)(farmalloc(sizeof(ljw_cursorr)));
if(real_cursor_ptr == NULL)        {
    q1("Not enough space to allocate the ljw_cursorr.\n");
    return(ljw_nospace);
```

```
                                    }
*cursor_ptr = (u)real_cursor_ptr;
real_cursor_ptr->index = index;//  Store the index pointer.
real_cursor_ptr->state = 0;      //  Initilize the state.
real_cursor_ptr->R0 = 0; //  Initialize the number of bytes
                         //  reserved for the get_key key.
real_cursor_ptr->K0 = NULL;  //  Initialize the key pointer
                             //  for get_key.
real_cursor_ptr->L0 = 0; //  Initialize the length for get_key.

real_cursor_ptr->R1 = 0; //  Initialize the number of bytes
                         //  reserved for the low key of an
                         //  interval.
real_cursor_ptr->K1 = NULL;  //  Initialize the pointer for the
                             //  low key of an interval.
real_cursor_ptr->L1 = 0; //  Initialize the length of the
                         //  low key of an interval.
real_cursor_ptr->R2 = 0; //  Initialize the number of bytes
                         //  reserved for the high key of an
                         //  interval.
real_cursor_ptr->K2 = NULL;  //  Initialize the pointer for the
                             //  high key of an interval.
real_cursor_ptr->L2 = 0; //  Initialize the length of the
                         //  high key of an interval.
real_cursor_ptr->scope = 0;  //  Initialize the scope of the
                             //  set defined by the cursor.
real_cursor_ptr->yy = (u *)NULL;  //  Initialize the start of
```

```
                                        //   The arc yz.
real_cursor_ptr->zz = (u *)NULL;        //   Initialize the end of
                                        //   The arc yz.

q_ljw_cursor(cursor_ptr);           //   Display it if debugging.

return(ljw_ok);         //   Success.
                                                                }
//   ----------------------------------------------------------------
//   The ui_cursor function.
//
//   Given the index pointer, ui_cursor uninstantiates
//   cursor, and stores a NULL pointer instead of the pointer
//   that was pointing to the cursor.
//   ----------------------------------------------------------------
int       ui_cursor(u *cursor_ptr)                      {
// Declare variables.
ljw_cursorr    *cursor;    //   The "real" pointer to the cursor.
// End of variable declarations.
q1("Begin ui_cursor.\n");
q_ljw_cursor(cursor_ptr);
cursor = (ljw_cursorr *)(*cursor_ptr);  //   Get the cursor pointer.
if(cursor != NULL)                      {
//   ----------------------------------------------------------------
//   Check the reserved areas in the cursor, and free
//   them if necessary.
//   ----------------------------------------------------------------
    ffree(cursor->K0);    //   Free the area for get_key.
    ffree(cursor->K1);    //   Free the low key of an interval.
```

```
        ffree(cursor->K2);   //  Free the high key of an interval.
        ffree(cursor);  //   And finally free the cursor.
                                    }
*cursor_ptr = NULL;
return(ljw_ok);
                                            }
```

APPENDIX H -- AINSERT

```
/*-----------------------------------------------------
The ainsert program.
Copyright (c) 1988, 1989 by Luther J. Woodrum.
All rights reserved.
April 29, 1989.
This work may not be copied in any
form without the permission of
Luther J. Woodrum
Given the pointer to ljw_index, and
      the key (a string), and
      the int number of bytes in the key, and
      a number a_n to associate to the new key,
the ainsert program adds the association to the index.
-----------------------------------------------------*/
#include "ljwsys.h"
#define catdb
#define deldb
#define insdb
#define scandb
extern    long ljw_ctr;
/*
Field names     Bits and Values     Description
-----------     ---------------     -----------
*ORG, e0, and   Low order two bits
```

| | | |
|---|---|---|
| e1 (sink arcs) | | |
| | 00 | Goes to a subtree of equals |
| | 01 | Goes to a single record |
| | 10 | Goes to another level |
| | 11 | Goes to another level and also to a subtree of equals. |
| *ORG | The rest. | These equal top_node - ORG. |
| e0 and e1 (arcs going to inner nodes) | Low order two bits | |
| | 00 | The arc goes to an inner node with two inner successor nodes. |
| | 01 | The arc goes to an inner node with an inner left successor node, and a right sink successor. |
| or | 10 | The arc goes to an inner node with a left sink success and a right inner successor. |
| | 11 | The arc goes to an inner node with two sink successors. |
| B | Low order two bits | |
| | 00 | This top node is a left successor, and there are at least two tree entries. |
| | 01 | This top node is a left |

|    | successor, and there is only one tree entry. |
|----|-----|
| 10 | The top node is a right successor, and there are at least two tree entries. |
| 11 | The top node is a right successor, and there is only one tree entry. |

ORG and B in combination:

When B indicates that the top node is a left successor, and its predecessor is an ORG field (which is known by the fact that it is its own predecessor), then the ORG field is the origin of the tree of trees.

When B indicates that the top node is a left successor, and its predecessor has an arc equal to equals_arc, then the ORG field indicates that the little tree is a subtree of equal keys, and is ordered by record address. When this is the case, the backtrace can step over one to get to the B field for the node, and thus continue.

```
                    Copyright (c) LJW August 26, 1991 */
int     ainsert(ljw_index *index, char *K, int ct, u a_n)
{
/* index: The pointer to the pointer to the TOP EDGE.     */
/*    a_n: The new data pointer of the                    */
/*    new insert pair (n,a_n).           */
// Declare variables.
int i;     /* The index into the new key.                 */
N *nn;     /* New node for insert.                        */
```

```
N *x;      // The predecessor of y.
u *xe;     // The arc taken at x to go to y.
N *y;      /* Starting node of current arc.    */
N *z;      /* Ending node of current arc, and  */
           /* also the address of the next little tree.  */
N *r;      /* Last starting node of a right arc.  */
u *e;      /* Address of arc selected.         */
u v; /* The value of *e.                       */
u n;       /* The new key for the insert.      */
u key;     /* The reversed key from the string. */
u nl;      /* The difference of n and nl.      */
u nh;      /* The difference of n and nh.      */
u lh;      /* The difference of nl and nh.     */
u eop;     /* The end-of-path flag.            */
u b; /* A temporary for computing arcs. */
u s; /* A temporary for computing arcs. */
u d; /* A dummy variable, just to see it.     */
u rf;      // f10 if the new inserted arc is
           // a right arc, otherwise f00.
ljw_indexx    *indexx;   //   The pointer to the ljw_indexx.

// End of variable declarations.

/*-------------------------------------------------------
The index parameter is the pointer to the pointer to the
ljw_indexx structure. ljw_indexx->org is a subtraction offset
arc to the top node in the tree. If the arc is NUL, then
the index is empty.
```

```
-----------------------------------------------------------*/
//   ---------------------------------------
//   Validity checking the index argument.
//   and getting the indexx variable.
//   ---------------------------------------
get_indexx;      //   Get the indexx variable and do all the nice
                 //   validity checking.
d = NUL;  i = 0;
nn = (N *) indexx;   v = nn->e0;
if (((u)nn & f11))              {
    printf("ainsert: The indexx pointer, %Fp, is invalid.\n",indexx);
    printf("         It must be aligned on a four-byte boundary.\n");
    return(ljw_failure);
                                }
q3("nn = %Fp, v = %Fp",nn,v);
if (v == NUL)                   {
    q1("The indexx was empty.\n");

rf = f00;  e = (u *)nn;   *e = -(u)e;
    q4("e = %Fp, *e = %Fp, rf = %d\n",e,(*e),rf);

goto catenate;
                                }
//   ------------------------------------------------
//   There is at least one entry in the index.
//   Look at each level until finding the insert arc.
//   ------------------------------------------------
```

```
z = (N *)(v + (u)nn);     qz;    qq_z;

for ( ; i < ct ; i = i + 4)                              {
//    ----------------------------------------------------
//    Look in the little tree at the current level,
//    starting at the node z, and using the arc value v
//    to get to z.
//    ----------------------------------------------------
key = *((u *)(&K[i]));
q3("i = %d, key = %Fp\n",i,key);
n = c2w( key, i, ct );
q3("n = %Fp, v = %Fp\n",n,v);
if (v & f10)    // See if there is a next level.    ??????????
                                                         {
y = (N *)((u)z & M4); qy;      ccy;       x = y;
e = &y->e1;      cop = y->B & f01;  v = *e;   xe = e;
rf = f10; //  Signal that the arc (y,z) is a right arc.
qrf;
qe;           qeop;             qv;

/*----------------------------------------------------
   Do the initialization to trace the insert path in
   the little tree, trace the path, and either find
   the current word n in the little tree or insert it.
----------------------------------------------------*/
r = y;   nl = y->k ^ n;   qr;   qnl;
z = (N *)((u)y + v);    qz;
/*----------------------------------------------------
   See if the current word n is already in the current
```

```
        little tree.  If it is, then compute the sink arc (y,z)
        for it.  If it is not, then insert it in the current
        little tree, set nn to the new node, e to the arc at
        the new node pointing to the new sink.
----------------------------------------------------------*/ for ( ; !eop ; )                    {
/*---------------------------------------------------------
    It is not yet the END OF PATH. Continue the forward path
    trace to find the insertion point.
----------------------------------------------------------*/
    z = (N *)((u)z & M4);    //   Kill the flag bits.
    qz;         qq_z;
    nh = z->k ^ n;      lh = nl ^ nh;      qnh;      qlh;
    if ( nh < lh )              {
        if (nl < nh )   {
/*---------------------------------------------------------
        Go down into the left subtree via the left arc, e0, at z.
----------------------------------------------------------*/
            eop = v & f10;    qeop;  xe = e;     rf = f00;
            e = &z->e0;  v = *e;  x = y;  y = z;  z = (N *)((u)x + v);
            qe;  qv;       qy;  qz;
                        }
        else            {
/*---------------------------------------------------------
        Go down into the right subtree via the right arc, e1.
----------------------------------------------------------*/
            eop = v & f01;    qeop;     rf = f10;
```

```
r = z;      xe = e;     e = &z->e1;     nl = nh;
v = *e; x = y;    y = z;    z = (N *)((u)x + v);
qr; qe; qnl; qv; qx; qy; qz;
                    }         }
else                        {
      if (nl < lh )         {
/*--------------------------------------------------------------
  Go down into the left subtree via the left arc, e0, at z.
----------------------------------------------------------*/
eop = v & f10; qeop; xe = e;       rf = f00;
e = &z->e0;  v = *e;  x = y;  y = z;  z = (N *)((u)x + v);
qe; qv;       qy; qz;
                    }
else                {
/*--------------------------------------------------------------
  Found the MOP insertion point. z is the displaced node.
----------------------------------------------------------*/
nn = (N *)farmalloc(sn); qnn;

nodedb     nn->node = NODE;     // For debugging and error checking.

b = (u)nn;      nl = nl ^ n;
qb; qnl;
if (n < nl)         {
/*--------------------------------------------------------------
   n < nl, so insert a new left sink into a MOP arc.
----------------------------------------------------------*/
r->k = n;       qr;
```

```
nn->k = n1;
nn->e1 = (u)z - (u)y + (f11 & v);    nn->e0 = d - (u)y;
*e = (v & M4) - (u)z + (u)nn + f10;
qq_nn;          qq_z;
b = (u)y-b;    z->e0 = z->e0 + b ;   z->e1 = z->e1 + b;
e = &nn->e0;    rf = f00;       i = i + 4;
qb;       qe;       qrf; qi;
qq_z;
goto catenate;
                      }
else               {
/* ---------------------------------------------------------
   n > n1, so insert a new right sink into a MOP arc.
---------------------------------------------------------*/
nn->k = n;        nn->e0 = (u)z - (u)y + (f11 & v) ;
nn->e1 = d - (u)y ;
qq_nn;
*e = (v & M4) - (u)z + (u)nn + f01;
b = (u)y - b;   z->e0 = z->e0 + b;         z->e1 = z->e1 + b;
qq_z;
e = &nn->e1;    rf = f10;  i = i + 4;
qb;       qe;       qrf; qi;       qq_y;
goto catenate;
                      }   }   }   }
/*----------------------------------------------------------
It is the END OF PATH, so see if the new word n is
already in the tree. If it is, then set e to the EOP
sink as the result of the loop.
```

```
----------------------------------------------------*/
q1("EOP in little tree.");
q4("y = %Fp, z = %Fp, nl = %Fp\n",y,z,nl);
q5("eop = %Fp, i = %d, v = %Fp, rf = %ld",eop,i,v,rf);
if (nl != 0)                            {
/*-----------------------------------------------
    It is the end of the path, and the new word n is not
    already in the tree, so allocate a place to hold the
    new inner node.
-----------------------------------------------------*/
qnl:
b = (u)farmalloc(sn);   nn = (N *)b;
*e = v - (u)z + b + fl1; //  Make the arc at y end in fl1, beca
use
                         //  it will point at a node with two s
inks.
nodedb    nn->node = NODE;   qnn:     qe:   qq_y;
q2("z = %Fp\n",z);

nl = nl ^ n;    qnl;
if ( n < nl )               {
    /*-----------------------------------------
        Insert a new left sink into an EOP arc.
    ------------------------------------------*/
    //              o x
    //              ¦
    //              o y
    //              ¦
    //              o nn
```

```
//                    / \
//           a  o    o  z
nn->e1 = (u)z - (u)y;    nn->e0 = d - (u)y ;
nn->k = n1;    qq_nn;    qr;    r->k = n;       qq_r;
e = &nn->e0;             qe;    rf = f00;       qrf;
if (f10 & v)    {
    z = (N *)( (u)z & M4);
    qi;  qz;  qq_z;
    z->B = (z->B & cf10) + (u)y - (u)nn + f10;
    qq_z_B;
              }    }
else                     {
/*------------------------------------------
    Insert a new right sink into an EOP arc.
------------------------------------------*/
qnn;
nn->e0 = (u)z - (u)y;    nn->e1 = d - (u)y;
nn->k = n;
e = &nn->e1;        rf = f10;
qq_nn;    qe;       qrf;
if (f10 & v)    {
    z = (N *)( (u)z & M4);
    z->B = (z->B & cf10) + (u)y - (u)nn;
    qq_z;
              }    }
//  ------------------------------------------
//  Now fix up the flag bit at the arc at x that
//  goes to y.
```

```
//      ---------------------------------------
if (x == y)     {           //   y is the top node.
     y->B = y->B - f01:     //   Turn off the f01 flag bit,
                            //   because y now goes to nn,
                            //   which has two successors.
              }
else            {           //   y is not the top node.
       if (y->k < nn->k)    *xe = *xe - f01;    // so turn off the
flag bit
       else                 *xe = *xe - f10;    // for nn.
              }

/*---------------------------------------------------
    It was inserted.  Construct the chain of nodes
    to store the tail of the key, if there is any.
    The inputs to the catenate section are nn, e,
    i, rf, and a_n.
-------------------------------------------------*/
i = i + 4;     //   Step up to the next word in the key.
catenate:
q1("\nbeginning catenate in ainsert.\n");

//      for ( y = nn ; i < ct ; y = nn, i = i + 4 )

//      ---------------------------------------
//      The "for" loop has been replaced by the actual
//      statements comprising its parts, in order that
//      the insert of a new key that contains a key
//      already in the tree as a prefix can jump into
```

```
//    this sequence at the point just after nn has
//    been allocated.
//    ----------------------------------------
      y = nn;   if (i >= ct)   goto finish_up;
      catenate_loop:

nn = (N *)(farmalloc(sn));
catenate_innards:
      nodedb    nn->node = NODE;
      q4("y = %Fp, nn = %Fp, i = %d",y,nn,i);
      *e = *e + (u)nn + f10;   // Flag it as a next level.
      qe;       qq_y;
      key = *((u *)(&K[i]));
      n = c2w( key, i, ct ) ;
      q2("n = %Fp\n",n);
      q4("nn = %Fp, y = %Fp, rf = %d\n",nn,y,rf);

nn->B = rf + (u)nn - (u)y + f01;   // Flag the top node as
                                         // having a right arc
                                         // going to a sink.
      e = &nn->e1;   *e = - (u)nn;
      nn->k = n;     rf = f10;
      qe;       qrf;      qq_nn;

//    ----------------------------------------
//    This is the end-of-loop code.
//    ----------------------------------------
      y = nn;   i = i + 4;
      if (i < ct )   goto     catenate_loop;
```

```
finish_up:
    *e = *e + (M4 & a_n) + f01;
    qa_n;      qq_nn;
    q1("end catenate.\n");

indexx->total++;//  Eke the number of entries.;
    return(ljw_ok);
                                                    }
q1("EOP in little tree, and the key is found.");
q4("y = %Fp, z = %Fp, n1 = %Fp\n",y,z,n1);
q4("eop = %Fp, i = %d, v = %Fp",eop.i,v);

}
else                                                {
//  ----------------------------------------
//  A key already in the tree is a prefix of the
//  new key.  Create a new node, nn, containing both
//  another level and a record address.
//  Fill in the record address, and subtract the
//  record address out of the arc field at e.
//  Then set up to enter the catenate section
//  at the label catenate_innards.
//  ----------------------------------------
q1("A key in the tree is a prefix of the new key.");
s = (u)farmalloc(sn4);
if (s == NUL)      return(ljw_nospace);
nn = (N *)(s + SESIZE);
(*(u *)s) = ((u)z - (s + SESIZE));  //   f01 is already on in z.
```

```
            s = ( (u)z & M4 );        *e = v - s;
            //    i = i + 4;        //   Step up to the next word in the key.
            goto catenate_innards;
                                                            }
                                                    }
/*-----------------------------------------------------------
        It got to the end of the new key. and the
        new key is equal to a key already in the tree.
        Decode the arc field pointing to z, which is
        addressed by e and is stored in the variable v.
-------------------------------------------------------------*/
z = (N *)((u)z & M4);       // Get rid of the flag bits.
qz;
/*  First see if the arc points to a node containing
    a next level tree.                                  */
if (v & f10)                        {   /* Yes.   */
    /*   See if the arc also points to a record
         and/or a subtree of equals, or if
         it only points to a next level little tree.  */
    if (v & f01)                {
    /*  It points to both a next level and either
        a record or a subtree of equals.            */
        qq_z;
        y = (N *)((u)z - SESIZE);// Get the address of the rec
ord
                                // or the origin of the subtr
ee
                                // of equals.
        ccy;
```

```
              if (y->RO & f01)      {
//    printf("In ainsert, an attempt was made to insert a duplica
te key.\n");
//    printf("It is ignored.\n");
      return(ljw_found);
      /*   ------------------------------------------------------
            // It is just a single record, so create a subtree
            // of equals with two entries in it.
            y = (N *)((u)y - SESIZE);// Make the arc from y a righ
t arc.
            rf = f10; v = y->e1;    z = (N *)((u)y + (v & M4));
      qrf; qv; qz;
            goto create_subtree;    // Then go make the subtree.
           ------------------------------------------------------*/
                                 }
            else                 {
            if (y->B & f10){     // See if the record pointer field
                                 // is EMPTY.
            y->B = a_n - ((u)y + SESIZE) + f01;       // If so,
just use it.
                                 }
            else                 {
printf("In ainsert the flag bit at %Fp suggests duplicates.\n",y
);
return(ljw_failure);
            // There is already a subtree of equals,
            // so insert into it.

}     }     }
```

```
        else                        {
//      ----------------------------------------------
//      It only points to a next level little tree,
//      therefore create a larger node to contain
//      both a next level little tree and a
//      single record.
//      ----------------------------------------------
s = (u)farmalloc(sn4);
*c = v - (u)z + s + SESIZE + f01;// Fix the predecessor arc.
qe;   qs;    qv;   qz;    qs;
*((u *)s) = a_n - (s + SESIZE) + f01;   // Store the arc to the
record.
nn = (N *)(s + SESIZE);       // Get the new node address.
nodedb    nn->node = NODE;
//      ----------------------------------------------
//      Move the fields from z to nn, and
//      adjust the right arc field.
//      ----------------------------------------------
nn->k = z->k;  nn->B = z->B - (d = ((u)z - (u)nn));
nn->e1 = z->e1 + d;
qd;       ccnn;     qq_nn;
// If the tree at z contains more than one entry,
// then adjust the arcs of the right successor
// of the top node z.
if (!(z->B & f01))  {
// There are at least two entries,
// so adjust the inner node's arcs.
y = (N *)(((u)z + z->e1) & M4);
```

```
        ccy;       qy;    qq_y;      qd;

y->e0 = y->e0 + d;    y->e1 = y->e1 + d;

qq_y;

} ffree(z); // Now free up the space for z.
            indexx->total++;//  Eke the number of entries.;
                return(ljw_ok);
                    }

} else                              {   /* No.    */
//      ----------------------------------------------
//      It does not point to a next level little tree.
//      See if it points to a record.
//      ---------------------------------------------- if (v & f01)                  {

/*  It points only to a record, and not to a next level little tree.    */

//      printf("In ainsert, an attempt was made to insert a duplica
te key.\n");

//      printf("It is ignored.\n");

return(ljw_found);

} else                          { if (v == NULL)         {

//      ----------------------------------------------
//      The record address field is NULL, so there
//      is no record.  Therefore insert the new one.
```

```
//    -------------------------------------------
s = (u)z; qs;
z = (N *)(s - SESIZE);    z->RO = a_n + f01 - s;
    indexx->total++;//   Eke the number of entries.;
return(ljw_ok);
                              }
    else                  {
printf("Invalid RO field at %Fp\n",z);
return(ljw_failure);
                              }
                                           }    }
q1("It shouldn't get here!\n");
return(ljw_failure);
                                                        }
```

APPENDIX I -- ADELETE

```
/*-----------------------------------------------------------

The Delete program for character keys,

Copyright (c) 1989 by Luther J. Woodrum

All rights reserved.

April 29, 1989.

-------------------------------------------------------------*/
#include "ljwsys.h"
define deldb int     adelete(ljw_index *index,char *K,int ct)                {
// Declare variables.

N  *t;      // Address of the next little tree.
int i;      // The index into the new key.
N  *nn;     // New node for insert.
N  *x;      // y's predecessor.
N  *y;      // Starting node of current arc.
N  *z;      // Ending node of current arc.
N  *r;      // Last starting node of a right arc.
N  *alt;    // The node paired with the delete node.
u  *e;      // Address of arc selected.
u  *xe;     // The address of the selected arc at the node x
            // that goes to node y.
u  v;       // The value of *e, the arc from y to z.
```

```
u eop;          // The flag bit to signal the end of the path.
u n;            // The key for the delete.
u key;          // The reversed form of the key.
u l;            // The low key of the current pair.
u h;            // The high key of the current pair.
u nl;           // The difference of n and l.
u nh;           // The difference of n and h.
u lh;           // The difference of l and h.
u b;            // A temporary for computing arcs.
u f;            // To hold the f11 flag bits for an arc.
u s;            // A temporary for computing arcs.
u d;            // A dummy variable, just to see it.
int rt;         // A one if the arc to the little
                // tree to delete is a right arc,
                // otherwise a zero.
u af;           // One for a right arc, zero for left.
u left;         // A temporary to display left succs.
u right;        // Just a temporary for displaying
                // right successors.
u dif;          // To hold the difference for adjusting arcs.
ljw_indexx *indexx; //   The structure containing the pointer
                //              to the TOT origin word.
// End of variable declarations.
get_indexx;     //   Get the indexx variable, and perform full
                //   validity checking.
v = indexx->org;  //   Get the origin field.
qadelete; qindexx; qv;
if (v == NUL)   { return(ljw_not_found); }
```

```
else       { t = (N *)(((u)indexx + v) & M4);      qt;  } for (i = 0; i < ct ; i = i+4 )      {
qt;       qv;
if (!(v & f10))          return(ljw_not_found);    // Check for E
OP in the big tree,
                                                   // and return NOT FOUND if so
key = *((u *)(&K[i]));
n =c2w( key, i, ct );    qn;
y = t;     x = y;     qx;   e = &y->e1;    v = *e;    qv;
l = y->k; r = y;      ql;   qr;
z = (N *) ((u)x + (v & M4));   qz;   qq_z;

/*------------------------------------------------------------
   Trace the path to the end in the current little
   tree, using the word n to control the path trace.
   ---------------------------------------------------------*/
for ( eop = y->B & f01; !eop ; z = (N *) (((u)x + v) & M4) )

{
    qz;   qq_z;
    h = z->k; x = y;          xe = e;    qh;   qx;   qeop;
    if (n < h)     {
        e = &z->e0;   eop = v & f10; qe;   qeop;
                   }
    else           {
        e = &z->e1;   l = h;     r = z;    eop = v & f01;
        qe;           ql;        qr;       qeop;
                   }
    y = z;        v = *e;         qy;        qv;
```

```
                              } q3("n = %Fp, l = %Fp\n",n,l);

/*    ------------------------------------------------

See if the word n was in the current little tree.

If not, then return ljw_not_found, because the key to delete is not in the index.
                                                    -*/
if (n != l)    return(ljw_not_found);

t = (N *) (M4 & (u)z);    qt;

}

/*----------------------------------------------------

It got to the end of the path in the last level little tree. Now the real work begins.

Cases:          Action:
------          ------- flags = 00      The arc points to a data B field.

flags = 01:     See if there is only one entry in the last
                level little tree. If there is, then delete
                said tree entirely, and position the cursor
                to the arc in its predecessor little tree.
                Then repeat the test for only one entry, etc.
                until either it gets to a predecessor tree
                with more than one entry, or it gets to the
                top arc, in which case the entire index is empty.

flags = 10:     This is the NOT FOUND case. Return -1.
```

```
flags = 11:     There are both a next level and either
                a record arc or an arc to a data B field.
                If there is a record arc, see if the a_n
                is equal to it. If not, return ljw_not_found.
                If so, delete it and replace the node with
                a next level only node, and set the arc type
                pointing to it to 10.
                If there is a subtree of equals, then proceed
                as above in the 00 case.
----------------------------------------------------------*/
b = v & f11;    qb;    // Get the flag bits.
if (b < f10)                                            { if (b == f00)                                       {

//      ----------------------------------------
    //      b = f00, therefore the arc goes to a
    //      data B field.
    //      This means delete the key and
    //      data pointer association from the
    //      index, just like f01.
    //      ----------------------------------------

} else                                                {

//      ----------------------------------------
    // The arc goes to a record.
    //      ----------------------------------------
if (y != x)                                             {

//      ----------------------------------------
    // There is more than one entry in the current little tree.
```

```
//      ------------------------------------------------------
// Check the assumption that n = r->k, i.e. that n = 1.
deldb      if (n != r->k)                {
deldb      printf("The assumption that n = r->k in delete is not true.\n");
deldb                                    }
if ( (u)e == (u)(&y->e0) )     {
           //          \              \
           //          r o            r o
           //          / \            / \
           //           .              .
           //           .              .
           //            o x    OR     o x
           //            ;             ;
           //            o y           o y
           //           / \            / \
           //        z o   o alt    z o   o alt
           //             / \
           //            o   o
    alt = (N *) ((u)x + y->e1);
    q2("alt = (N *) ((u)x + y->e1); Now alt = %Fp\n",alt);
    s = f01;        qq_r;          qs;
                                  }
else                              {
           //          \
           //          r o
           //          / \
```

```
//            .
//            .
//              o x
//              |
//              o y
//             / \
//        alt o   o z
//           / \
//          o   o
alt = (N *) ((u)x + y->e0);    s = f10;
q2("alt = (N *) ((u)x + y->e0); Now alt = %Fp\n",alt);
    qs;
                    }
q3("s = %Fp, xe = %Fp",s,xe);
if ( s & *xe)                       {
    // ------------------------------------------------
    //             alt is a sink.
    // ------------------------------------------------
    t = (N *)((u)y - *xe + f11);
    qt;     cct;
    f = ((u)alt & f11);  //  Get the eop flag bits for
                         //  the eop arc to node alt.
    alt = (N *)((u)alt - f);//  Get alt without the flag bits
// ------------------------------------------------
// See if alt goes to another level or goes to a
// data B field.
// ------------------------------------------------
    if (f != f01)                      {
```

```
        if (r == x)          {   //    See if xy is a right arc.
            if (s == f10)  b = f10;// And if yz is a left arc
            else           b = f00;// Or if they are both right.
        }
        else               {
            if (s == f01)  b = f10;// Here xy is a left arc.
                                   // and yz is a right arc.
            else           b = f00;// And yz is a left arc.
        }
    dif = (u)y - (u)x;      qdif;
    q2("b = %Fp\n",b);
    alt->B = (alt->B ^ b) + dif ;
    qalt;
                                }
    if (t == x)             {
                //         x is the top node.
                //
                //                 o x, t
                //                  \
                //                   o y
                //                  / \
                //                 o   o
        x->B = x->B + f01;
        x->e1 = ((u)alt - (u)x) + f; qx;
                            }
    else                    {
```

```
//          x is not the top node.
//
//              o t
//              ¦
//              o x
//               \
//                o y
//               / \
//              o   o

*xe = *xe - (u)y - f11 + (u)alt + f;
        dif = ((n < x->k) ? f10 : f01 );    qdif;
        if (n < t->k) {
                t->e0 = t->e0 + dif;    qq_t;
                        }
        else        {
                t->e1 = t->e1 + dif;    qq_t;
                        }
                                }
    qt;
                                        }
else                                    {
//  ---------------------------------------------------
//          alt is an inner node.
//  ---------------------------------------------------
    v = ((*xe) & M4);
    *xe = v - (u)y + (u)alt ;
    qe;     qeop;
    alt = (N *)((u)alt & M4);
```

```
        dif = (u)y - (u)x:        qdif;
        alt->e0 = alt->e0 + dif ;
        alt->e1 = alt->e1 + dif ;   qq_alt;
                                }
//  ------------------------------------------------
//  Now see whether to store the key for alt at r,
//  which we do if the deleted arc was a left arc.
//
//  We do this here instead of in the beginning,
//  because the old value of r->k is needed for
//  decision making in the above logic.
//
//  ------------------------------------------------
        if (s == f01)       {
        r->k = h;
                            }
        q2("ffree(%Fp)\n",y);

ffree(y);
indexx->total--;    //  Subtract one from the number of entries
.
return(ljw_ok);
                                }
//  ------------------------------------------------
//  There is only one entry in the current little
//  tree, and the arc goes to a record.
//
//  Trace the back arc at the top node in the
//  little tree to the arc in the predecessor
```

```
//    tree.
//    --------------------------------------------------
rt = f10;                    //   Begin with a right pointing arc,
qrt;             //   if indeed yz is the top arc.
while      ( y == x )                          {
if (rt == f00)       {    //   See if this is the ORIGIN arc.
      x->B = NUL;            //   If so everything has been deleted.

indexx->total--;     //   Subtract one from the number of entries
.
      return(ljw_ok);
                             }
v = y->B; z = (N *) ((u)y + f10 ); // Get the backward arc v,
qy;    qv;    qz;// and set y to the inner node.
if    (v & f10)      {    //   See if the arc pointing to this tree
ee
                             //   is a right arc.
   y = (N *) ( (u)y + f11 - v ); // The arc yz is now the arc e = &y->e1;                    // from the predecessor tree
                                     // or origin.
   rt = f10;         qrt; qe;
                   }
else                 {  // No, the arc pointing to this tree
                        // from above is a left arc.
   y = (N *) ( (u)y + f01 - v );
   qy;
      e = &y->e0;       // Get the address of the arc field for
 the
      rt = 0;           // inner node y and remember the arc.
      qe;       qrt;
```

```
                    }
//      ------------------------------------------
//      Now decide whether x is a node containing
//      only a next level, or if it also has a
//      record and/or an equal subtree arc.
//      ------------------------------------------
        b = *e;    // Get the arc field from node y.
        if (f01 & b)                 {
        qb;
                alt = (N *)((u)y - SESIZE);// Compute the address of the q2("alt = %Fp\n",alt);// record or equal subtree arc.
                if ( ! (alt->B & f10) )    {
//              ------------------------------------------
//              There is a record arc or arc to subtree
//              of equals.  See which one it is.
//              (At this point, we know that the flags in b = 11)
//              ------------------------------------------
                *e = b + alt->B - SESIZE - f11;// Replace z in the arc by
                                             // the record arc or arc
                                             // to a subtree of equals.
                qe;
                if ( !(alt->B & f01)){
//              ------------------------------------------
//              It is a subtree of equals, so fix the
//              top node to point back to y instead of alt.
//              ------------------------------------------
```

```
                    t = (N *)((u)alt +alt->B);// Get address of top n
ode.
                    t->B = t->B + (u)alt -(u)y + rt;// Adjust the top
arc.
                        }
                    }
    else                {
    //  -------------------------------------------
    //  The record arc was EMPTY. Therefore get x
    //  ready to delete the large node.
    //  -------------------------------------------
        x = alt;  // The actual node starts at alt.
ffree(x); x = (N *)(((u)z - b) & M4);    qx;
                        }   }
    else                    {
        //      o x (to be computed)
        //      :
        //      o y
        //      :
        //      o z
        s = (u)z;         //  Copy z.
        x = (N *)(s - b); //  Compute the starting point fo
r the arc.

qx; qy; qz;
        s = ((u)s & M4);  //  Remove the flag bits to free
it up.
        ffree(s);         //  Free up the node.
                        }   }
```

```
/*-------------------------------------------------------
    All of the levels on the path to the original sink
    have been deleted that had a tree containing one
    entry and either no record arc or an EMPTY
    record arc.
    Now delete the sink arc that is pointing to the
    last top node that was deleted
---------------------------------------------------------*/
n = y->k;      qn;
if ( n < x->k )              {   // See if xy is a left arc.
      if (!rt)               {   // See if yz is a left arc.
         if (x->e0 & f01)    {   //  See if alt is a sink.
//                       y left, z left, alt is a sink.
//                       --------------------------------
//         x o           F(xe) = 11, since both z and alt are sinks.
//           /
//         y o
//         / \
//       z o  o alt
//
x->e0 = x->e0 - f11 - (u)y + (u)x + y->e1;   // Replace x's left arc qx;       qq_x;                              // by the the arc to alt.

alt = (N *)((u)x + (y->e1 & M4));   // Compute alt without the flag bits.

qalt;

// The arc from y to alt was a right arc, but is now a left
```

```
            arc.
   if ( (y->e1 & f11) != f01 )    { qq_alt;    alt->B = alt->B + (u)y - (u)x - f10;    qq_alt;
   qalt;
   //          t o
   //            :
   //          x o
   //           /
   //        y o
   //         / \
   //      z o   o alt
   //

} t = (N *)((u)alt - (x->e0 & M4));    // Compute x's predecessor.

qt;      cct;      qq_t;

if (x->k < t->k)    t->e0 = t->e0 + f10; // x's left successor w
   as inner else                t->e1 = t->e1 + f10; // but is now a sink.

qq_t;

} else                 {

//--------------------------------------------------------------
------

/*             y left, z left, alt is an inner node.
                  ------------------------------------
          x o     F(xe) = 10, since z is a sink
           /      and alt is an inner node.
         y o
          / \
```

```
           z o   o alt
              / \
             o   o
*/
x->e0 = x->e0 - f10 - (u)y + (u)x + y->e1;    // Make x's left ar
c
qq_x;                                          // go to alt.
alt = (N *)(((u)x + y->e1) & M4);   // Compute alt.
qalt;    ccalt;    qq_alt;
alt->e0 = alt->e0 + (u)y - (u)x;    // Adjust alt's left arc fiel
d.
alt->e1 = alt->e1 + (u)y - (u)x;    // Adjust alt's right arc fie
ld.
     qq_alt;
            // x's left successor was an inner node, and stil
l is.
            // so no change is needed for the flag bit at t.
                    }
//----------------------------------------------------
// Find the last right arc (r,nn) on the path to alt,
// and store the key n from node y at r->k.
//----------------------------------------------------
r = x;    qr;    n = y->k; qn;
for ( nn = alt ;    n < r->k; )
                    {
     qr;    qnn;
     t = (N *)( (u)nn - (r->e0 & M4));   qt;   cct;   qq_t;
     nn = r;    r = t;    qr;
                    }
     qr;    qnn;   r->k = n;   qn;   qq_r;
```

```
                                         }
//----------------------------------------------------
            else           {   // yz is a right arc.
//----------------------------------------------------
if (x->e0 & f10)                 {
//                 y left,  z right,  alt is a sink.
//                 ----------------------------------
//        x o       F(xe) = 11, since both z and alt are sinks.
//         /
//      y o
//       / \
//   alt o   o z
// x->e0 = x->e0 - f11 - (u)y + (u)x + y->e0;    // Replace x's left arc qq_x;                                         // by the the arc t
o alt.
alt = (N *)(((u)x + y->e0) & M4);// Compute alt without the flag bits.

// Alt's backward arc was a left arc, and still is.
if ( (y->e0 & f11) != f01 )    { alt->B = alt->B + (u)y - (u)x;

q2("alt is a sink and = %Fp\n",alt);

}
t = (N *)((u)alt - (x->e0 & M4));   // Compute x's predecessor.
qt;       cct;       qq_t;
//           t o
//             |
//           x o
```

```
//            /
//         y o
//          / \
//     alt o   o z
//
if (x->k < t->k)      t->e0 = t->e0 + f10;// x's left successor was an
else                  t->e1 = t->e1 + f10;//inner node but is now a sink.
qq_t;

}
else                                  {
//-----------------------------------------------------------------
-----
/*              y left, z right, alt is an inner node.
         -------------------------------------------
           x o      F(xe) = 01, since z is a sink
            /       and alt is an inner node.
         y o
          / \
     alt o   o z
        / \
       o   o
*/
qq_x;

x->e0 = x->e0 - f01 - (u)y + (u)x + y->e0;// Set x's left arc to alt.

alt = (N *)(((u)x + y->e0) & M4);    // Compute alt.

qalt;     ccalt;    qq_alt;

alt->e0 = alt->e0 + (u)y - (u)x;     // Adjust alt's left arc fiel
``` d.

alt->e1 = alt->e1 + (u)y - (u)x;   // Adjust alt's right arc field.

qq_alt;

// x's left successor was an inner node, and still is,

// so no change is needed for the flag bit at 1.
                        }     }         }
else                           {    // xy is a right arc.

if (!rt)               {   //See if yz is a left arc.

if (f01 & x->e1)    // See if alt is a sink.
            {

//-----------------------------------------------------------------

/*          y right, z left, alt is a sink.
            -----------------------------------
    x o         F(xe) = 11, since both z and alt are sinks.
     \
      y o
      / \
    z o   o alt
*/ x->k = n;    //  Move the key from y to y's predecessor x.

qq_x;

x->e1 = x->e1 - f11 - (u)y + (u)x + y->e1;    // Replace x's right arc qq_x;                                          // by the the arc to alt alt = (N *)(((u)x + y->e1) & M4);// Compute alt without the flag bits.

```
                // Alt's backward arc was a right arc, and still is.
        if ( (y->e1 & f11) != f01 )   {
                qalt;       ccalt;    qq_alt;
                alt->B = alt->B + (u)y - (u)x;
                qq_alt;
                                      }
        t = (N *)((u)alt - (x->e1 & M4));   // Compute x's predecessor.
        qt;  cct;     qq_t;
        if (t == x)    t->B = t->B + f01;   // t and x are the top arc, and
                                            // now there is only a right
arc.
        else                  {
        if (x->k < t->k)   t->e0 = t->e0 + f01;// x's right successor was an
        else               t->e1 = t->e1 + f01;// inner node, but is now a sink.
                              }
           qq_t;
                              }
           else               {   // alt is an iner node.
//-----------------------------------------------------------------
/*              y right, z left, alt is an inner node.
                ----------------------------------------
     x o        F(xe) = 10, since z is a sink
        \       and alt is an inner node.
       y o
        / \
       z o  o alt
```

```
                  / \
                o   o
*/
        x->k = n;         //   Move the key from y to y's predecessor
x.

x->e1 = x->e1 - f10 - (u)y + (u)x + y->e1;   // Make x's right a
rc qq_x;                                         // go to alt.

alt = (N *)(((u)x + y->e1) & M4);   // Compute alt.

qalt;     ccalt;

alt->e0 = alt->e0 + (u)y - (u)x;   // Adjust alt's left arc fiel
d.

alt->e1 = alt->e1 + (u)y - (u)x;   // Adjust alt's right arc fie
ld.

qq_alt;

// x's right successor was an inner node, and sti
ll is,

// so no change is needed for the flag bit at t.
                          }    }
          else                    {    // yz is a right arc.
//-----------------------------------------------------
          if (f10 & x->e1)     // See if alt is a sink.
                          {
//-----------------------------------------------------
/*              y right, z right, alt is a sink.
                ------------------------------------
      x o       F(xe) = 11, since both z and alt are sinks.
         \
         y o
         / \
     alt o   o z
```

```
    */ x->e1 = x->e1 - f11 - (u)y + (u)x + y->e0;      // Replace x's righ
t arc qq_x;                                            //by the the arc to
    alt.

alt = (N *)(((u)x + y->e0) & M4);// Compute alt without the flag
    bits.

// Alt's backward arc was a left arc, and is now a right ar
c.
    if ( (y->e0 & f11) != f01 )   { qalt;       ccalt;      qq_alt;

alt->B = alt->B + (u)y - (u)x + f10;

qq_alt;

} t = (N *)((u)alt - (x->e1 & M4));    // Compute x's predecessor.

qt;

if (t == x)         { t->B = t->B + f01;    // t and x are the top arc, and qq_t;                  // now there is only a right arc.

} else                    { if (x->k < t->k)    t->e0 = t->e0 + f01;        // x's right succes
sor was an else                t->e1 = t->e1 + f01;        // inner node, but is no
w a sink.

qq_t;

}  } else             {    // alt is an inner node.
//------------------------------------------------------------
    /*              y right, z right,  alt is an inner node.
                    ------------------------------------------
```

```
       x o            F(xe) = 01, since z is a sink
          \           and alt is an inner node.
         y o
          / \
    alt o   o z
       / \
      o   o
*/
x->e1 = x->e1 - f01 - (u)y + (u)x + y->e0;   // Make x's right a
rc qq_x;                                         // go to alt.

alt = (N *)(((u)x + y->e0) & M4);   // Compute alt.

qalt;      ccalt;      qq_alt;

alt->e0 = alt->e0 + (u)y - (u)x;    // Adjust alt's left arc fiel
d.

alt->e1 = alt->e1 + (u)y - (u)x;    // Adjust alt's right arc fie
ld.

qq_alt;

// x's right successor was an inner node, and sti
ll is,

// so no change is needed for the flag bit at t.
//----------------------------------------------------------------
------
                           }   }   } ffree(y);

q2("ffree(%Fp)\n",y);

indexx->total--;    //  Subtract one from the number of entries
.

return(ljw_ok);

}   }
```

```
                // There is a next level tree pointed to by the yz arc.
                // Therefore if there is no record arc in addition,
                // then it is NOT FOUND.
        else if (b == f10)                      {
                // See if it is NOT FOUND.
                return(ljw_not_found);          // NOT FOUND.
                                                }
            else                                {
//      ---------------------------------------------------------
//      b = f11, therefore there is both a next level and
//      a record arc.
//      If it is just a next record, then delete it
//      and remake the node into just a next level node,
//      but if there is a subtree of equals, then delete
//      the a_n from it.
//      In addition, the record arc may be EMPTY,
//      as described below.
//      In order to avoid having to allocate another
//      node to hold only the next level information,
//      I decided not to free up the current node,
//      but to just mark the record arc as EMPTY.
//      Since the record arc is an origin, and
//      the origin arc flag bits are sink arc
//      flag bits, only the combinations 00 and 01
//      are valid, because the arc either goes to
//      a record or to a subtree of equals.
//      Therefore I use the combination 10 of flag bits
//      in the record arc to represent the EMPTY arc.
```

```
//    By setting the arc to f10, I will know that
//    this special case exists.
//    First I have to see whether the arc is
//    already EMPTY.  If it is, then it is the
//    NOT FOUND case.  LJW, September 1, 1991 04:32.
//    ------------------------------------------------- alt = (N *)((u)z - SESIZE);// Get the address of the record
(s) arc.
      qalt;
            v = alt->B;       // Get the arc field value.
            qv;
            if (v & f01)           {
                  // There is only a single record, so
                  // delete it by setting the arc to EMPTY.
                                   }
            else                   {
                  if (v == f10)  {
                  return(ljw_not_found);    // The record arc is EMPTY.
                                  }
                  else           {
                  // There is a subtree of equals.
                  // Delete the a_n from it.
                  return(ljw_ok);
                                  }
                                   }
                                    }
indexx->total--;     //    Subtract one from the number of entries.
```

```
        return(ljw_ok):
                                                  }

//23456789 123456789 123456789 123456789 123456789 123456789 123
4
```

APPENDIX J -- SIG_BIT

```
//   The sig_bit.c global variable.
//   Copyright (c) LJW March 1992
unsigned char   sig_bit[256] =
{
0, 1, 2, 2, 3, 3, 3, 3, 4, 4, 4, 4, 4, 4, 4, 4,
5, 5, 5, 5, 5, 5, 5, 5, 5, 5, 5, 5, 5, 5, 5, 5,
6, 6, 6, 6, 6, 6, 6, 6, 6, 6, 6, 6, 6, 6, 6, 6,
6, 6, 6, 6, 6, 6, 6, 6, 6, 6, 6, 6, 6, 6, 6, 6,
7, 7, 7, 7, 7, 7, 7, 7, 7, 7, 7, 7, 7, 7, 7, 7,
7, 7, 7, 7, 7, 7, 7, 7, 7, 7, 7, 7, 7, 7, 7, 7,
7, 7, 7, 7, 7, 7, 7, 7, 7, 7, 7, 7, 7, 7, 7, 7,
7, 7, 7, 7, 7, 7, 7, 7, 7, 7, 7, 7, 7, 7, 7, 7,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8,
8, 8, 8, 8, 8, 8, 8, 8, 8, 8, 8, 8, 8, 8, 8, 8
};
```

APPENDIX K -- AFIND

```
/*          The afind program.

Copyright (c) 1989 by Luther J. Woodrum

All rights reserved.

April 29, 1989
---------------------------------------------------------------*/
#include "ljwsys.h"
int     afind( ljw_index *index,   /* Address of top arc
                    of table.         */ char *K,   /* Address of char key. */ int ct,         /* #bytes in the key.   */ u    *data_pointer  /* The result. */
            )
                                                {
// Declare variables.
N *x;   N *y;   N *z;   N *r;
u *e;   u n;    u lb;   u v;        u   f;
u s;    N *t;   u w;    int i:      u eop;     u key;
u    *table;   //   The pointer to the origin word for the TOT.
// End of variable declarations.
q1("Beginning afind.\n");

table = (u *)(*index);
```

```
v = *table;
if  (v == NUL)
     { return(ljw_not_found); }
else                              {
     t = (N *)((u)table + (v & M4));
     qtable;  qv;qt;
                                   }
for (i = 0; i<ct ; i = i + 4 )                          {
qi;
key = *((u *)(&K[i]));          //   Get the key from the
                                //   character string.
w = c2w(key,i,ct);   qw;   //   Get the numeric value
                                //   of the first four bytes
                                //   of the key.
//----------------------------------------------------------
//   See if there is another level tree.  If not, then
//   the key is not found.
//----------------------------------------------------------
if ((f11 & v) < f10)     {    return(ljw_not_found);    }

//----------------------------------------------------------
//   Get ready to search the next level little tree.
//----------------------------------------------------------
y = t;    e = &y->e1;     v = *e;    eop = f01 & y->B;
qy;       qe;         qv;       qeop;

lb = y->k;     qlb;
//----------------------------------------------------------
```

```
//    Search the next level little tree.
//--------------------------------------------------------
for ( z = (N *) ((u)y + (v & M4))  ; !eop ; )

{
    qy;   qz;   qq_z;      n = z->k;  qn;
    if (w < n)      {
          e = &z->e0;      eop = v & f10;  qe;   qeop;
                         }
    else              {
          e = &z->e1;      lb = n;    eop = v & f01;
          qe;   qlb;  qeop;
                         }
x = y;         y = z;    qx;
v = *e;        qv;       z = (N *) (M4 & ((u)x + v));
                              } if (w != lb)      return(ljw_not_found);
t = (N *) (M4 & (u)z);    qt;
if (v & f10)                                   {
eet;
if (((u)e) == ((u)(&y->e0)))         {
     if (t->B & f10)       {
     printf("In afind, the node at t = %Fp is a left node.\n",t)
;
     printf("and is a top node of another tree, but the\n");
     printf("B field at t says it is a right node.\n");
     #ifdef    DEBUG
```

```
        printf("The counter = %ld\n",ljw_ctr);
        #endif
        return(ljw_failure);
                            }
                                    }
else                        {
        if (!(t->B & f10))  {
printf("In afind, the node at t = %Fp is a right node,\n",t);
printf("    and is a top node of another level, but the\n");
printf("    B field at t says it is a left node.\n");
        #ifdef   DEBUG
printf("The counter = %ld\n",ljw_ctr);
        #endif
return(ljw_failure);
                            }
                                    }
                                            }

}
f = f11 & v;    //   Get the flag bits at EOP.
//  ---------------------------------------------------
//   The key is found. Now let's see what the arc
//   at EOP goes to. If it does not go to a record,
//   nor to another level and a record, then the key
//   is not found.
//
//   If it goes to another level, but the equal-subtree
//   arc in front of the node is NULL, then the key is
```

```
//    not found.
//    ---------------------------------------------------
if (f01 & f)                        {
    if (f10 & f)            {
//    There is another level, and also a record address
//    or addresses.  Let's see if there really is any
//    record address there.
z = (N *)((u)z & M4);    //    Eliminate the flag bits.
ccz; //    Check to see that this is really a node.
x = (N *)((u)z - 4);     //    Get the pointer to the
                         //    record(s) origin field.
v = x->RO;     //    Get the origin field for records.
if (v == NULL)           {
//    No records here, not found.
    return(ljw_not_found);
                         }
else                     {
//    There is at least one record.
    if ( v & f10 ) {
//    There is more than one record.
//    Since we are not ready to deal with this yet,
//    I'm returning FAILURE, since there aren't supposed to
//    be any dupicates yet.
printf("FAILURE in afindc, duplicate keys encountered.\n");
return(ljw_failure);
                         }
    else            {
//    There is exactly one record, so we done found it.
```

```
            s = (u)z + (v & M4);    //  Compute the record address.
            *data_pointer = s;  //  Store the data pointer.
            return(ljw_found);
                    }
                }
            }
        else            {
//  There is no next level, just a record address.
v = ( (u)z & M4 );
            *data_pointer = v;  //  Store the data pointer.
            return(ljw_found);
                }   }
    else            {
//  The key is not found.
return(ljw_not_found);
                }
                        }
//23456789 123456789 123456789 123456789 123456789 123456789 123
456789
```

APPENDIX L -- AFINDC

```c
/*              The afindc program.
                Copyright (c) 1989
                by Luther J. Woodrum
                All rights reserved.
                April 29, 1989
      Given a pointer to a character string key, and
      a number of bytes in the key, ct, set the cursor
      by doing a search for the key in the index.
------------------------------------------------------------*/
#include "ljwsys.h"
int     afindc(
        ljw_cursor *cursor_ptr,
        ljw_index *index,
        char *K,        /* Address of char key. */
        int ct,         /* #bytes in the key.   */
        u *data_pointer /* The result. */
        )
                                                            {
// Declare variables.
N *x;   N *y;   N *z;   N *r;
u *e;   u n;    u lb;   u v;        u f;
u s;    N *t;   u w;    int i;      u eop;  u key;
ljw_indexx      *indexx;
ljw_cursorr     *cursor;
```

```
ifdef    DEBUG
int  z_right;   //   A one if z is a right successor.
                //   Only used in debugging.
#endif
// End of variable declarations.
get_indexx;
q1("Beginning afindc.\n");
     i_cursor(cursor_ptr, index);   //   Initialize the cursor.
//   printf("ljw_cursor is initialized.\n");
if(0L == *cursor_ptr)     return(ljw_not_found);
cursor = (ljw_cursorr *)(*cursor_ptr);

v = indexx->org;
q3("The origin field, at %Fp, = %Fp.\n",indexx,v);
if   (v == NUL)                {
     cursor->state = zorigin;  //   Set the state to
     cursor->yy = cursor->zz = (u *)indexx;
     cursor->i = 0;
          //   reflect that the cursor is set at
          //   the pointer to the origin.
     return(ljw_not_found);   }
else                           {
     t = (N *)((u)indexx + (v & M4));
                               }
for (i = 0; i < ct ; i = i + 4 )                   {
     qi;
//-----------------------------------------------------
//   See if there is another level tree. If not, then
```

```
//    the key is not found.
//---------------------------------------------------------------
if ((f11 & v) < f10)          {
      cursor->yy = (u *)y;       cursor->zz = (u *)z;
      cursor->i = i - 4;
      cursor->lb = lb;
      cursor->state = ((eop & f01) ? zright : 0) +
                ((lb < w) ? LT : GT);
      q_ljw_cursor(cursor_ptr);      return(ljw_not_found);
                              }
key = *((u *)(&K[i]));         //   Get the key from the
                               //   character string.
w = c2w(key,i,ct);  qw;   //   Get the numeric value
                          //   of the first four bytes
                          //   of the key.
      qw;

//---------------------------------------------------------------
//    Get ready to search the next level little tree.
//---------------------------------------------------------------
y = t;     e = &y->e1;    v = *e;     eop = f01 & y->B;
qy;        qe;        qv;        qeop;

lb = y->k;      qlb;
z = (N *) ((u)y + (v & M4));
cn(y,z,1);     //   Generates a call to see_node.
//---------------------------------------------------------------
//    Search the next level little tree.
```

```
//---------------------------------------------------------
for ( ; !eop ; )              { n = z->k; qn;
    if (w < n)        {
        e = &z->e0;      eop = v & f10;
                    }
    else              {
        e = &z->e1;      lb = n;   eop = v & f01;
                    }
x = y;         y = z;
v = *e;        qv;  z = (N *) (M4 & ((u)x + v));
#ifdef   DEBUG
z_right = ( w < n ? 0 : 1);
cn(y,z,z_right);
#endif
                                }
    qw; qlb; qv; qeop;
if (w != lb)              {
    cursor->yy = (u *)y;    cursor->zz = (u *)z;
    cursor->i = i;
    cursor->lb = lb;
    cursor->state = ((eop & f01) ? zright : 0) +
            ((lb < w) ? LT : GT);
    q_ljw_cursor(cursor_ptr);    return(ljw_not_found);
                                }
    q2("The key, %Fp, is found.\n",w);
t = (N *) (M4 & (u)z);
```

```
     if (v & f10)                        {
     if (eop & f10)                     {
         if (t->B & f10)       {
         printf("In afindc, the node at t = %Fp is a left node,\n",t
);
         printf("and is a top node of another tree, but the\n");
         printf("B field at t says it is a right node.\n");
         #ifdef    DEBUG
         printf("The counter = %ld\n",ljw_ctr);
         #endif
         return(ljw_failure);
                                 }
                                              }
     else                   {
         if (!(t->B & f10))   {
     printf(" In afindc, the node at t = %Fp is a right node,\n",t);
     printf("    and is a top node of another level, but the\n");
     printf("    B field at t says it is a left node.\n");
         #ifdef    DEBUG
     printf("The counter = %ld\n",ljw_ctr);
         #endif
     return(ljw_failure);
                              }
                                  }
                                                }
                                                         }
     f = f11 & v;    //   Get the flag bits at EOP.
//   ----------------------------------------------
//   The key is found. Now let's see what the arc
```

```
//    at EOP goes to.  If it does not go to a record,
//    nor to another level and a record, then the key
//    is not found.
//
//    If it goes to another level, but the equal-subtree
//    arc in front of the node is NULL, then the key is
//    not found.
//    ------------------------------------------------
if (f01 & f)                    {
    if (f10 & f)            {
//    There is another level, and also a record address
//    or addresses.  Let's see if there really is any
//    record address there.
z = (N *)((u)z & M4);    //  Eliminate the flag bits.
x = (N *)((u)z - 4);     //  Get the pointer to the
                         //  record(s) origin field.
v = x->RO;       //  Get the origin field for records.
if (v == NULL)          {
    //   No records here, not found.
    cursor->yy = (u *)y;     cursor->zz = (u *)z;
    cursor->i = i;
    cursor->lb = lb;
    cursor->state = ((eop & f01) ? zright : 0) + EQ;
    q_ljw_cursor(cursor_ptr);    return(ljw_not_found);
                         }
else                    {
//   There is at least one record.
    if ( v & f10 ) {
```

```
//      There is more than one record.
//      Since we are not ready to deal with this yet,
//      I'm returning FAILURE, since there aren't supposed to
//      be any dupicates yet.
printf("FAILURE in afindc, duplicate keys encountered.\n");
return(ljw_failure);
                        }
        else            {
//      There is exactly one record, so we done found it.
        s = (u)z + (v & M4);        //   Compute the record address.
        cursor->yy = (u *)y;    cursor->zz = (u *)z;
        cursor->i = i;
        cursor->lb = lb;
        cursor->state = ((eop & f01) ? zright : 0) + EQ;
q_ljw_cursor(cursor_ptr);
*data_pointer = s;  //   Store the answer.
return(ljw_found);
                        }
                    }
                }
        else            {
//      There is no next level, just a record address.
v = ( (u)z & M4 );
#ifdef    DEBUG
if (ctr)        {
printf("search found %Fp\n",v);
                }
endif
```

```
        cursor->yy = (u *)y;      cursor->zz = (u *)z;
        cursor->i = i;
        cursor->lb = lb;
        cursor->state = ((cop & f01) ? zright : 0) + EQ;
q_ljw_cursor(cursor_ptr);
*data_pointer = v;   //   Store the answer.
return(ljw_found);
                                  }      }
else                                     {
//   The key is not found.
return(ljw_not_found);
                                              }
                                                       }
//23456789 123456789 123456789 123456789 123456789 12345678
```

APPENDIX M -- LOADBITS

```
//    The LOAD_BITS program, to load a variable length bit substring
//    into a register.

//    Copyright (c) LJW October 11, 1991
//    All rights reserved.

define u unsigned long unsigned long   load_bits(unsigned long m[], u start, u n)
    { unsigned long  i,    mask,      after,    z;
    int    s;

if(n == 0)      return(0);

i = start >> 5;

after = (s = (start & 31)) + n;

if (after <= 32)          { mask = (( 1L << n ) - 1);
        z = (m[i] >> (32 - after)) & mask;
        return(z);
                              }
```

```
    else                    {
        z = m[i] & (( 1L << (32 - s) ) - 1);
        z = z << (after - 32);
        z = z + (m[i] >> (64 - after));
        return(z);
                            }
    }
```

```
//    The STORE_BITS program, to store a variable length bit substring
//    into a bit string.

//    Copyright (c) LJW October 11, 1991.
//    All rights reserved.

void store_bits(u *m, u start, u n, u value)

{ unsigned long  t, after, mask, w, i;
    int   s;

if ( n == 0 )  return;
    i = start >> 5;
    // printf("start = %Fp\n",start);
```

```
        after = (s = (start & 31)) + n;

//      printf("after = %Fp, s = %d\n",after,s);
        if (after <= 32)                                {
//          printf("after <= 32\n");

mask =( ( 1L << n) -1);
//          printf("mask =( ( 1L << n) -1);\n");
//          printf("mask = %Fp\n",mask);
            mask = ((( 1L << n) - 1) << (32 - after));
//          printf("mask = %Fp\n",mask);
//          printf("value = %Fp\n",value);
            t = (value << (32 - after)) + (( mask ^ -1L) & m[i]);
//          w = (32 - after);
//          printf("w = (32 - after);");
//          printf("w = %Fp\n",w);
//          w = (value << (32 - after));
//          printf("w = (value << (32 - after);");
//          printf("w = %Fp\n",w);
//          printf("t = %Fp\n",t);
            m[i] = t;
            return;

}
        else                                            {
            mask = ( 1L << (32 - s)) - 1;
//          printf("mask = ( 1L << (32 - s)) - 1;\n");
//          printf("mask = %Fp\n",mask);
//          w = (mask ^ -1L);
```

```
//      printf("w = (mask ^ -1L):\n");
//      printf("w = %Fp\n",w);
//      w = ((mask ^ -1L) & m[i]);
//      printf("w = ((mask ^ -1L) & m[i]);\n");
//      printf("w = %Fp\n",w);
//      printf("value = %Fp\n",value);
//      w = ((value >> (after - 32)) & mask);
//      printf("w = ((value >> (after - 32)) & mask);\n");
//      printf("w = %Fp\n",w);
//      w = ((mask ^ -1L) & m[i]) + ((value >> (after - 32)) & mask) ;
//      printf("w = ((mask ^ -1L) & m[i]) + ((value >> (after - 32)) & mask) ;\n");
//      printf("w = %Fp\n",w);
        t = ((mask ^ -1L) & m[i]) + ((value >> (after - 32)) & mask) ;
//      printf("t = ((mask ^ -1L) & m[i]) + ((value >> (after - 32)) & mask);\n");
//      printf("t = %Fp\n",t);
        m[i] = t;

// Now do the second word:

//      printf("\ndoing the second word.\n");
        mask = (1L << (after - 31)) - 1;
//      printf("mask = (1L << (after - 31)) - 1;\n");
//      printf("mask = %Fp\n",mask);
        t = value & mask;
//      printf("t = value & mask:\n");
//      printf("t = %Fp\n",t);
```

```
        t = t << (64 - after);
        mask = mask << (64 - after);
//      printf("mask = %Fp\n",mask);
//      w = (mask ^ -1L);
//      printf("w = (mask ^ -1L);\n");
//      printf("w = %Fp\n",w);
        t = t + ((mask ^ -1L) & m[i+1]);
//      printf("t = t + ((mask ^ -1L) & m[i+1]);\n");
//      printf("t = %Fp\n",t);
        m[i+1] = t;
        return;
                                                }

}
```

APPENDIX N -- LJW_QCTR

```c
/*
The LJW_QCTR program, to read a trace file and
build the trace table.
Copyright (c) 1988, 1991, by Luther J. Woodrum.
All rights reserved.
October 15, 1991
This work may not be copied in any
form without the permission of LJW.
*/
#undef DEBUG
#include  <errno.h>
#include "ljwsys.h"
#define key_buf_size    256
#define data_buf_size    256
#define TRANS_BUFFER_SIZE 29696
#define INPUT_BUFFER_SIZE 29696
#define OUTPUT_BUFFER_SIZE 28672
#define   max_word_size  128
/*
#define TRANS_BUFFER_SIZE 96
#define INPUT_BUFFER_SIZE 24
#define OUTPUT_BUFFER_SIZE 16
#define   max_word_size  8
*/
```

```
#define     ZZ
#ifndef     NIL
#define     NIL    0L
#endif
#define SLD(a) ((*argv[a] == '/') || (*argv[a] == '-'))
#ifndef     IOVARS
#define     IOVARS                                              \
                                                                \
struct stat statbuf;/* The buffer for the file statistics. */\
int     trace_handle, in_handle, out_handle;                    \
char    *tbuf, *ibuf, *obuf;                                    \
long    file_size; /* The number of bytes in the file.    */    \
int     num_to_read; /* The number of bytes to read. */         \
int     num_read; /* The number of bytes actually read.   */    \
int     cur, outi;/* The input and output buffer indices.*/     \
int     tmp0,    tmp1;       /* Just temporary indices.*/       \
int     end; /* The actual number of bytes in the input buffer.*/\
int     c, d;    /* The next input or output byte.        */    \
int     last     /* The last byte put into the output.    */
#endif
#ifndef     nil_free
#define     nil_free(x)    if (x != NIL)  free(x);
#endif
u       tfind(u * table,char *name, int key_length);
u       tinsert(u *, char *, int, u);
extern     int _fmode:
#ifndef     ljw_ctr
extern     long ljw_ctr;   //   The counter.
```

```
endif
#ifndef  ljw_ctr_start
extern   long ljw_ctr_start;
#endif
#ifndef  ljw_ctr_end
extern   long ljw_ctr_end;
#endif
extern   long modulus;    //  The modulus for printing out the
                          //  trace line every once in a while.
extern   long cumulative_modulus;
typedef  struct           {
    int  line_limit;      //  The number of lines provided for
                          //  by the entries in this
                          //  trace_table_recod.
    u    *bit_map;        //  The pointer to the bit map that
                          //  defines the ranges of line
                          //  numbers to trace.
    long *frequency;      //  The pointer to the frequency vector
                          //  of the count of the number of
                          //  times each line has been executed,
                          //  (used in profiler mode.)
                          }   trace_table_record;
extern   ljw_index ljwtrace;
long ljw_qctr(char *name, int line_number)          {
IOVARS;  //  Define the IO variables.
ljw_index index;//  The pointer to the index origin.
int  state;   //  Set to 2 while collecting a quoted string.
```

```
            //   Set to 1 while collecting a C++ style comment.
            //   Set to 0 when not inside a quoted string
            //   nor inside of C++ style comments.
int   counter_spec;//   A one if the numbers we are collecting
            //   define a range of counter values.
int   line_num; //   The current line number.
int   line_size;//   The size of the current line (thus far.)
int   cur_dlm;  //   One if the current byte is a delimiter.
int   prev_dlm; //   One if the previous byte is a delimiter.
int   byte;     /*   The next byte from the data string.    */
int   i, j, k;  //   Variables for inserting the substitutions
int   ii;       //   into the table.
int   eof;      //   A one after the end of file is reached.
int   key_length;  //   The number of bytes in the key.
int   num_left;    //   The number of bytes left in
                   //   the buffer.
long  data_length; //   The number of bytes in the data.
u     *data_ptr;   //   The pointer to the data.
u     rc;          //   The return code.
long  line;        //   The line number from the calling function.
long  num;         //   Used to collect numbers.
long  first;       //   The first line # of a range.
long  last_num;    //   The last line # of a range.
int   mod_spec;    //   A one if it finds a MOD command in the
                   //   trace input file.
u     from_table;
trace_table_record *trace_record; //   The pointer to the
```

```
rc = i_index(&ljwtrace,1,0);  //   Initialize the index.
eof = 0;          //   Set the end of file flag.
num_to_read = OUTPUT_BUFFER_SIZE;  // Pick a reasonable size.
tbuf = (char *) farmalloc(INPUT_BUFFER_SIZE);
if (tbuf == NUL)                {
    printf("Not enough space for the trace buffer.");
    return(0);                  }
/*-------------------------------------------------
Open the trace file, and complain if it isn't specified.
----------------------------------------------------*/
if ( (trace_handle = open ( "ljwtrace", O_RDONLY ) ) == -1)
                    {
    printf("Cannot open trace file ljwtrace.\n");
    nil_free(tbuf);
        return(ljw_ok);       }

//    -----------------------------------------------
//    Read the trace file and insert the programs names
//    and line numbers to trace into the trace table.
//    -----------------------------------------------
i = 0;
//    -----------------------------------------------
//    Get the name of the program or "ctr#" in key_buf.
//    -----------------------------------------------
loop:
//printf("Reading the trace file, %s\n",tracefile_ptr);
num_read = read( trace_handle, &tbuf[0], num_to_read);
//printf("num_read = %d\n",num_read);
```

```
                                             //   trace_table_record.
int   trace_limits_are_set= 0;
u     *the_bit_map;    //   The pointer to the bit map for this
                       //   function.
int   number_matched;  //   The number of bytes of prefix
                       //   that matched.
u     num2alloc;       //   The number of bytes to allocate.
long  num_words;       //   The number of words in the bit_map.
u     *xp_bit_map;     //   The extended bit map.
char  *NULL_POINTER;
char  *string;
char  key_buf[key_buf_size];    //   The buffer for building
                                //   the keys to trace.
char  data_buf[data_buf_size];  //   The buffer for building
                                //   the traced strings.
line = line_number + 0;
//ZZ      printf("file = %s, line = %ld\n",name,line);
//   ---------------------------------------------
//   See if the trace table has been read in and
//   initialized.
//   ---------------------------------------------
if (ljwtrace == NUL)                                 {
//   ---------------------------------------------
//   It has not been done, so read in the trace file
//   and initialize the trace table.
//   ---------------------------------------------
rc = sizeof(trace_table_record);
//ZZ printf("size of trace table record = %ld\n",rc);
```

```
    if (num_read == 0)              {
        if (i == 0)     goto end_of_inserting;
        else                    {
            key_buf[i] = '\0';
            printf("End of file before end of key %s.\n",key_buf);
            return(0L);
//          return(ljw_failure);
                            }
                                    }
    j = 0;
get_next_key_byte:
//ZZ printf("At get_next_key_byte:");
        c = tbuf[j];
        d = tbuf[j + 1];
//ZZ printf("i = %d, j = %d\n",i,j);
//ZZ        printf("Next key byte = %c\n",c);
        ///     -----------------------------------
        //      Skip blank lines, and blanks or tabs
        //      at the front of lines.
        ///     -----------------------------------
        if ( i == 0 )                           {
//          if (c == '\t') goto eke_j;
//          if (c == ' ')  goto eke_j;
            if (c == '\n') goto eke_j;

}
        if (c == '\n')                  {
            key_buf[i] = '\0';
printf("The file %s has no lines specified.\n",key_buf);
```

```
                return(0L);
//              return(ljw_failure);
                                        }
        if ( ( c == ' ')        ||
             (c == '\t'))       goto    got_the_key;
        if (i > key_buf_size)           {
        key_buf[i] = '\0';
        printf("This file name, %s, is too long.\n",key_buf);
                return(0L);
//              return(ljw_failure);
                                        }
        key_buf[i++] = c;
        eke_j:
                j++;
                if (j < num_read)       goto get_next_key_byte;
                else            goto loop;
got_the_key:
//ZZ    printf("Got the key.\n");
key_buf[i] = '\0';
key_length = i;         //      Keep the key length.
//ZZ    printf("The key is %s, and is %d long\n",key_buf,key_length);
counter_spec = 0;       //      Assume this is not a counter range.
//      ----------------------------------------------------
//      See if the word collected is equal to "ctr#".
//      If so, then the following numbers define a range
//      of counter values.
//      ----------------------------------------------------
```

```
        if (key_length == 4)                      {
            if ( ((key_buf[0] == 'c') || (key_buf[0] == 'C')) &&
                 ((key_buf[1] == 't') || (key_buf[1] == 'T')) &&
                 ((key_buf[2] == 'r') || (key_buf[2] == 'R')) &&
                 ((key_buf[3] == '#') || (key_buf[3] == '=')))
                                                  {
                counter_spec = 1;
                goto collect_numbers;             }
            else                                  {
            if ( ((key_buf[0] == 'm') || (key_buf[0] == 'M')) &&
                 ((key_buf[1] == 'o') || (key_buf[1] == 'O')) &&
                 ((key_buf[2] == 'd') || (key_buf[2] == 'D')) &&
                 ((key_buf[3] == '#') || (key_buf[3] == '=')))
                                                  {
                mod_spec = 1;
                goto collect_numbers;     }       }
                                                  }
//      -------------------------------------------------
//      See if the program name is already in the table.
//      If not, then insert it.
//      -------------------------------------------------
//ZZ printf("Looking for file %s in the trace table.\n",key_buf);
        rc = tfind(&ljwtrace, key_buf, key_length);
        trace_record = (trace_table_record *)(rc);
//ZZ printf("The pointer from the table is %Fp\n",trace_table_record);
        if (rc == ljw_not_found)                  {
            rc = sizeof(trace_table_record);
```

```
//ZZ  printf("size of trace table record = %ld\n",rc);
      rc = (u)farmalloc(sizeof(trace_table_record));
      trace_record = (trace_table_record *)rc;
//ZZ       printf("trace_record = %Fp\n",trace_record);
      if (trace_record == NUL)      {
not_enough_memory:
      printf("Not enough memory to hold the trace table.\n");
          return(0L);
//          return(ljw_failure);
                                    }
   trace_record->line_limit = 0; //   Initialize the line limit.
   trace_record->bit_map = (u *)0L; // Initialize the bit map
                                 //   pointer.
   trace_record->frequency = (long *)0L;// Initialize the
                                 //   frequency vector.
      rc = tinsert(&ljwtrace, key_buf, key_length, rc);
      if (rc == ljw_failure)   {
          printf("ljw_failure trying tinsert.\n");
                               }
      printf("Inserting file %s\n",key_buf);
      if ((rc == ljw_no_space) || (rc == ljw_failure))
               goto not_enough_memory;
                                                 }
collect_numbers:
//ZZ     printf("At collect_numbers, counter_spec = %d\n",counter_spec);
//ZZ     printf("mod_spec = %d\n",mod_spec);
   i = 0;    first = -1L;    last_num = -1L;
```

```
state = 0;      //   Initialize for collecting the line numbers.
eof = 0;
goto eke_j1;
//    ----------------------------------------------------
//    Get the line numbers in the interval to trace.
//
//      state:
//          0:  Looking for the first non-blank (or tab, etc.)
//              after the name field.
//          1:  Found the next field after the name field,
//              now looking for the end of the first line #.
//          2:  Found the first line #, now looking for the
//              start of the next line #, if there is one.
//          3:  Found the start of the second line #,
//              now looking for the end of the second line #.
//          4:  Finished getting the second line #, now
//              looking for the end of the line.
//    ----------------------------------------------------
loop1:
num_read = read( trace_handle, &tbuf[0], num_to_read);
if (num_read == 0)              {
    if (i == 0)         {
        key_buf[i] = '\0';
        printf("No line number found for file %s.\n",key_buf);
        return(0L);
//      return(ljw_trace_error);
                        }
    else                {
```

```
            eof = 1;//    Signal end of file.
            goto got_the_data;
                }
                        }
j = 0;
get_next_data_byte:
    c = tbuf[j];
    d = tbuf[j + 1];
    tbuf[j + 1] = '\0';
//  printf("Next data byte = %s\n",&tbuf[j]);
    tbuf[j + 1] = d;
decode:
    if ((state == 0) || (state == 2))   {
//  ----------------------------------------------
//  Skip blanks and tabs up to the next field.
//  ----------------------------------------------
        if ((c == ' ') || (c == '\t'))    goto eke_j1;
//  ----------------------------------------------
//  Got past the blanks and tabs to the next field,
//  if there is one, or to the end of the line.
//  ----------------------------------------------
        if (c == '\n') goto     got_the_data;
        num = 0;  //   Get ready for the next number.
        state = state + 1;
        goto decode;
                                    }
    if ((state == 1) || (state == 3))   {
//  ----------------------------------------------
```

```
//      state 1 or 3, collecting a number.
//      ------------------------------------------
if ((c >= '0') && (c <= '9'))     {
num = num + num;     num = num + (num << 2) + c -'0';
goto eke_j1;

} if (state == 1)     first = num;     //   Got the first #.
    else                last_num = num;  //   Got the 2nd #.
    num = 0L;           state = state + 1;
    goto      decode;

}
//      ------------------------------------------
//      state 4, getting to the end of the current line.
//      ------------------------------------------
    if (c == '\n') goto got_the_data;
eke_j1:
        j++;
        if (j < num_read)   goto get_next_data_byte;
        else        goto loop1;
got_the_data:
//ZZ     printf("Got the data.\n");
//ZZ     printf("first = %ld, last_num = %ld\n",first,last_num)
;
//      ---------------------------------------------
i = 0;
//      ---------------------------------------------
//      See if we have collected a range of counter values.
//      ---------------------------------------------
```

```
if (counter_spec)            {
    if (first == -1L)    {
    printf("Missing the numbers for the counter range.\n");
    goto go_get_the_next_one;
                    }
    ljw_ctr_start = first;
    if (last_num == -1L){
    ljw_ctr_end = 2147483647L;
                    }
    else ljw_ctr_end = last_num;
//printf("first = %ld, last_num = %ld\n",first,last_num);
//printf("ljw_ctr_start = %ld, and ljw_ctr_end = %ld\n",ljw_ctr_start,ljw_ctr_end);
    counter_spec = 0;
    trace_limits_are_set = 1;
    goto go_get_the_next_one;
                    }
if (mod_spec)            {
if (first == -1L)        {
    printf("Missing the number for the mod command.\n");
    goto go_get_the_next_one;
                    }
if (first != 0)    modulus = first;
    cumulative_modulus = modulus;
    mod_spec = 0;
    goto go_get_the_next_one;
                    }
if (last_num == -1L)    last_num = first;
//ZZ printf("%s, line %d, first = %ld, last_num = %ld\n",__FILE__
```

```
_,__LINE__,first,last_num);
//    ---------------------------------------------
//    Set the trace bits on in the trace vector for
//    this program, as determined by the range of
//    line numbers.
//    ---------------------------------------------
if (last_num > 2047)                            {
      printf("Program %s range goes beyond 2047.\n",name);
      printf("Only 2047 lines are supported.\n");
      printf("The rest of them are ignored.\n");
      last_num = 2047;
                                                }
//    printf("The trace record is at %Fp\n",trace_record);
//    printf("line_limit = %d\n",trace_record->line_limit);
//    printf("bit_map = %Fp\n",trace_record->bit_map);
if (trace_record->line_limit <= last_num)     {
the_bit_map = trace_record->bit_map;   //   Get bit map pointer
.
num2alloc = (((last_num + 32L) & -32L) >> 3);
//ZZ printf("num2alloc = %ld\n",num2alloc);
xp_bit_map = (u *)farmalloc(num2alloc); //   Allocate some more
space.
      if (xp_bit_map == NUL)           {
      printf("Not enough space to hold the trace table.\n");
      return(0);
                                        }
      num_words = num2alloc >> 2;   //   Get the number of words
                                    //   in the bit map.
//ZZ      printf("num_words = %ld\n",num2alloc);
```

```
//      See if the bit map is empty, or if there already is one.
        if (the_bit_map == NUL)   {
        for(ii = 0; ii < num_words; ii++)
            xp_bit_map[ii] = 0L;
                            }
        else                    {
//      There already is one, so copy it over to the new one.
        for(ii = 0; ii < num_words; ii++)
            xp_bit_map[ii] = the_bit_map[ii];
        ffree(the_bit_map);
                            }
        trace_record->bit_map = xp_bit_map;
                                                            }
the_bit_map = trace_record->bit_map;     //   Get bit map pointer //ZZ printf("Storing the range %ld to %ld\n",first,last_num);
for (num = first; num <= last_num; num++)     {
store_bits(the_bit_map, num, 1L, 1L);
                                                            }
go_get_the_next_one:
if (eof)   goto end_of_inserting;
if (num_read != 0)   goto get_next_key_byte;
//      ----------------------------------------------------
//      The entries are all inserted now.
//      ----------------------------------------------------
end_of_inserting:
close (trace_handle);
nil_free(tbuf);
if (!trace_limits_are_set)              {
```

```
            ljw_ctr_end = 2147483647L;
                                       }
printf("All done building the trace table.\n");
                                                       }

//    ------------------------------------------------
//    Now use the table to signal tracing.
//    ------------------------------------------------ ljw_ctr = ljw_ctr + 1;

//printf("ljw_ctr_start = %ld, ljw_ctr_end = %ld, and ljw_ctr = %ld\n",ljw_ctr_start,ljw_ctr_end,ljw_ctr);

if (ljw_ctr == cumulative_modulus)       {

//    printf("ljw_ctr == cumulative_modulus\n");

cumulative_modulus = cumulative_modulus + modulus;

return(1L);
                                                       } if ((ljw_ctr < ljw_ctr_start) || (ljw_ctr > ljw_ctr_end))
      return(0L);

for(key_length = 0; name[key_length] != '\0'; key_length++){} from_table = tfind(&ljwtrace, name, key_length);

trace_record = (trace_table_record *)from_table;

data_ptr = trace_record->bit_map;   //   Get the bit map pointer.

//printf("Now using the table .. from_table = %Fp\n",data_ptr);

if (from_table == ljw_not_found)    return(0L);

//    printf("Displaying the bit mask table..\n");
//    for (ii = 0; ii <64; ii++)              {
//    printf("data_ptr[%d] = %Fp\n",ii,data_ptr[ii]);
```

```
//                               }
rc = load_bits(data_ptr, line, 1L);      //   Get the bit.
//    printf("rc from load_bits = %Fp\n",rc);
return(rc);

}
//23456789 123456789 123456789 123456789 123456789 123456789
```

APPENDIX O -- LJW_Q

```c
//    The ljw_q.c file.
//    Copyright (c), LJW September, 1992.
#undef DEBUG
include "ljwsys.h"
#include <stdarg.h>
#ifndef   ljw_ctr
    extern    long ljw_ctr;  //   This program needs to have ljw_ctr.
endif // ------------------------------------------------
//    Select the following functions if the PC_ENV
//    environment is not on.
// ------------------------------------------------ ifndef   PC_ENV
// ------------------------------------------------
//    The ljw_q0 function, to display the file name
//    and line number from a q0 macro.
// ------------------------------------------------
#ifndef   ljw_q0
void ljw_q0(char    *program, int   line)    {
long rc;
rc = ljw_qctr(program, line);
if (rc == 0L)   return;
printf("%s, %d, #%ld, \n",program, line, ljw_ctr);
```

```
    return;                                              }
#endif
//   ----------------------------------------
//   The ljw_q1 function, to display the file name,
//   line number, and a message from a q1 macro.
//   ----------------------------------------
#ifndef   ljw_q1
void ljw_q1(char    *program, int  line, char *msg)    {
long rc;   int   i;
rc = ljw_qctr(program, line);
if (rc == 0L)   return;
printf("%s, %d, #%ld, ",program, line, ljw_ctr);
printf(msg);
for (i = 0; msg[i] != '\0'; i++)    {}
if  (i != 0)                       {
    if (msg[i - 1] != '\n')   printf("\n");
                                   }
return;                                                }
#endif
//   ----------------------------------------
//   The ljw_q2 function, to display the file name,
//   line number, and a message from a q2 macro.
//   ----------------------------------------
#ifndef   ljw_q2
void ljw_q2(char    *program, int  line, char *msg, void *a1)
                                                       {
long rc;   int   i;
rc = ljw_qctr(program, line);
```

```
    if (rc == 0L)   return;
    printf("%s, %d, #%ld, ",program, line, ljw_ctr);
    printf(msg,a1);
    for (i = 0; msg[i] != '\0'; i++)    {}
    if   (i != 0)                       {
        if (msg[i - 1] != '\n')   printf("\n");
                                        }
    return;                                         }
#endif
//   ---------------------------------------------
//   The ljw_q3 function, to display the file name,
//   line number, and a message from a q3 macro.
//   ---------------------------------------------
#ifndef    ljw_q3
void ljw_q3(char    *program, int  line, char *msg, void *a1, void *a2)
                                                {
    long rc;   int   i;
    rc = ljw_qctr(program, line);
    if (rc == 0L)   return;
    printf("%s, %d, #%ld, ",program, line, ljw_ctr);
    printf(msg, a1, a2);
    for (i = 0; msg[i] != '\0'; i++)    {}
    if   (i != 0)                       {
        if (msg[i - 1] != '\n')   printf("\n");
                                        }
    return;                                         }
#endif
```

```
//   -----------------------------------------
//   The ljw_q4 function, to display the file name,
//   line number, and a message from a q4 macro.
//   -----------------------------------------
#ifndef   ljw_q4
void ljw_q4(char   *program, int  line, char *msg,
            void *a1, void *a2, void *a3)
                                                                {
long rc;  int  i;
rc = ljw_qctr(program, line);
if (rc == 0L)   return;
printf("%s, %d, #%ld, ",program, line, ljw_ctr);
printf(msg, a1, a2, a3);
for (i = 0; msg[i] != '\0'; i++)    {}
if  (i != 0)                    {
    if (msg[i - 1] != '\n')  printf("\n");
                                }
return;                                                         }
#endif
//   -----------------------------------------
//   The ljw_q5 function, to display the file name,
//   line number, and a message from a q5 macro.
//   -----------------------------------------
#ifndef   ljw_q5
void ljw_q5(char   *program, int  line, char *msg,
            void *a1, void *a2, void *a3, void *a4)
                                                                {
long rc;  int  i;
```

```
rc = ljw_qctr(program, line);
if (rc == 0L)   return;
printf("%s, %d, #%ld, ",program, line, ljw_ctr);
printf(msg, a1, a2, a3, a4);
for (i = 0; msg[i] != '\0'; i++)    {}
if  (i != 0)                        {
    if (msg[i - 1] != '\n')  printf("\n");
                                    }
return;                                                    }
#endif
//   ---------------------------------------------
//   The ljw_q6 function, to display the file name,
//   line number, and a message from a q6 macro.
//   ---------------------------------------------
#ifndef   ljw_q6
void ljw_q6(char    *program, int   line, char *msg,
          void *a1, void *a2, void *a3, void *a4, void *a5)
                                                           {
long rc;   int   i;
rc = ljw_qctr(program, line);
if (rc == 0L)   return;
printf("%s, %d, #%ld, ",program, line, ljw_ctr);
printf(msg, a1, a2, a3, a4, a5);
for (i = 0; msg[i] != '\0'; i++)    {}
if  (i != 0)                        {
    if (msg[i - 1] != '\n')  printf("\n");
                                    }
return;                                                    }
```

```
endif
// ------------------------------------------------
//    The ljw_q7 function, to display the file name,
//    line number, and a message from a q7 macro.
// ------------------------------------------------
#ifndef    ljw_q7
void ljw_q7(char    *program, int  line, char *msg,
            void *a1, void *a2, void *a3, void *a4,
            void *a5, void *a6)
                                                            {
long rc;  int  i;
rc = ljw_qctr(program, line);
if (rc == 0L)   return;
printf("%s, %d, #%ld, ",program, line, ljw_ctr);
printf(msg, a1, a2, a3, a4, a5, a6);
for (i = 0; msg[i] != '\0'; i++)    {}
if  (i != 0)                        {
     if (msg[i - 1] != '\n')  printf("\n");
                                    }
return;                                                     }
#endif
// ------------------------------------------------
//    The ljw_q8 function, to display the file name,
//    line number, and a message from a q8 macro.
// ------------------------------------------------
#ifndef    ljw_q8
void ljw_q8(char    *program, int  line, char *msg,
            void *a1, void *a2, void *a3, void *a4,
```

```
if  (i != 0)                    {
    if (msg[i - 1] != '\n')  printf("\n");
                                }
return;                                                         }
    #endif
#endif    //   This ends the selection for the non PC_ENV.

//   ---------------------------------------------
//   Select the following functions if the PC_ENV
//   environment is on.
//   --------------------------------------------- ifdef    PC_ENV

//   ---------------------------------------------
//   The ljw_q0 function, to display the file name
//   and line number from a q0 macro.
//   ---------------------------------------------
#ifndef    ljw_q0
void ljw_q0(char    *program, int   line)    {
long rc;
rc = ljw_qctr(program, line);
if (rc == 0L)   return;
printf("%s, %d, #%ld, \n",program, line, ljw_ctr);
return;                                                         }
#endif
//   ---------------------------------------------
//   The ljw_q1 function, to display the file name,
//   line number, and a message from a q1 macro.
```

```
                void *a5, void *a6, void *a7)
                                                                {
long rc;   int   i;
rc = ljw_qctr(program, line);
if (rc == 0L)   return;
printf("%s, %d, #%ld, ",program, line, ljw_ctr);
printf(msg, a1, a2, a3, a4, a5, a6, a7);
for (i = 0; msg[i] != '\0'; i++)    {}
if  (i != 0)                    {
    if (msg[i - 1] != '\n')  printf("\n");
                                }
return;                                                         }
#endif
//      ------------------------------------------
//      The ljw_q9 function, to display the file name,
//      line number, and a message from a q9 macro.
//      ------------------------------------------
        #ifndef    ljw_q9
void ljw_q9(char     *program, int  line, char *msg,
            void *a1, void *a2, void *a3, void *a4,
            void *a5, void *a6, void *a7, void *a8)
                                                                {
long rc;   int   i;
rc = ljw_qctr(program, line);
if (rc == 0L)   return;
printf("%s, %d, #%ld, ",program, line, ljw_ctr);
printf(msg, a1, a2, a3, a4, a5, a6, a7, a8);
for (i = 0; msg[i] != '\0'; i++)    {}
```

```
// ------------------------------------------
#ifndef   ljw_q1
void ljw_q1(char    *program, int  line, char *msg)    {
long rc;   int   i;
rc = ljw_qctr(program, line);
if (rc == 0L)   return;
printf("%s, %d, #%ld, ",program, line, ljw_ctr);
printf(msg);
for (i = 0; msg[i] != '\0'; i++)    {}
if   (i != 0)                       {
    if (msg[i - 1] != '\n')   printf("\n");
                                    }
return;                                                }
#endif
// ------------------------------------------
//   The ljw_q9 function, to display the file name,
//   line number, and a message from a q macro,
//   where a variable number of variables are also
//   displayed.
// ------------------------------------------
#ifndef   ljw_q9
#include  <stdarg.h>
void ljw_q9(char    *program, int  line, char *msg, ...)
                                                       {
va_list    ap;   //   Points to each unnamed argument in turn.
char *p, *sval, *pval;
int   ival;
long  lval;
```

```
long rc;  int  i;

rc = ljw_qctr(program, line);

if (rc == 0L)   return;

printf("%s, %d, #%ld, ",program, line, ljw_ctr);

//   ---------------------------------------------------
//   Process the variable list...
//   --------------------------------------------------- va_start(ap, msg);   //   Start with msg.
for (p = msg; *p; p++)              {
    if (*p != '%')          {
        putchar(*p);
        continue;
                                    }
switch (*++p)               {
case 'd':
    ival = va_arg(ap, int);
    printf("%d",ival);
    break;
case 'l':
    p++; //   Skip the d in "ld".
    lval = va_arg(ap, long);
    printf("%ld", lval);
    break;
case 's':
    for (sval = va_arg(ap, char *); *sval; sval++)
                            {
        putchar(*sval);
                            }
```

```
        break;
case 'F':
        p++;   //   Skip the "p" in "Fp".
        pval = va_arg(ap, char *);
        printf("%Fp",pval);
        break;
default:
        putchar(*p);
        break;
                                }
                                        }
        va_end(ap);
for (i = 0; msg[i] != '\0'; i++)    {}
if  (i != 0)                        {
    if (msg[i - 1] != '\n')  printf("\n");
                                        }
return;                                                              }
#endif
#endif    //   This ends the selection for the PC_ENV.
```

APPENDIX P -- NEXT

```
/*----------------------------------------------------
The next program.
Copyright (c) 1988, 1992 by Luther J. Woodrum.
All rights reserved.
September 4, 1992.
----------------------------------------------------

This work may not be copied in any form without the
permission of Luther J. Woodrum Given a cursor, which may be pointing at an entry
or between entries:

If the cursor is pointing at an entry, the next program
finds the next key that is greater than the key of the
current key.
If the cursor is pointing between entries, then the
next program finds the next entry.
-------------------------------------------------------*/
#include  "ljwsys.h"
#define   K(hmm)    (hmm->k)
int       next(ljw_cursor *cursor_ptr, u *data_pointer)    {
// Declare variables.
u *table; //   The address of the TOP EDGE.
N *nn;    //   New node for insert.
```

```
N *x;           //    The predecessor of y.
N *y;           //    Starting node of current arc.
N *z;           /*    Ending node of current arc, and         */
                /*    also the address of the next little table.*/
N *r;           /*    Last starting node of a right arc. */
u *e;           /*    Address of arc selected.          */
u v;            /*    The value of *e.                  */
u n;            /*    The new key for the insert.       */
u l;            /*    The lower bound for the current interval.*/
u nl;           /*    The difference of n and nl.       */
u nh;           /*    The difference of n and nh.       */
u lh;           /*    The difference of nl and nh.      */
u eop;          /*    The end-of-path flag.             */
u b;            /*    A temporary for computing arcs.   */
u s;            /*    A temporary for computing arcs.   */
N    *t;  /*    A temporary for getting the value. */
ljw_cursorr     *cursor;  //   The pointer to the cursor.
int   state;    //    The state variable.
int   i;        //    The index to the key byte.
int   scope;    //    The scope of the defined set.
// End of variable declarations.
/*----------------------------------------------------------
    The following are the possible starting conditions.
o   yz is at the top of a little tree.
    This is true if the y = z.
    Otherwise,
o   yz is a left arc, or
o   yz is a right arc, somewhere in the tree.
```

```
                                                                    ----*/
     q1("Beginning next.\n");
q1("get_cursor(cursor_ptr);");
get_cursor(cursor_ptr);
//   ------------------------------------------
//   See if the cursor is set at the TOT origin.
//   ------------------------------------------
if (y == z)                       {
x = y;    z = (N *)((u)x + (x->e0 & M4));
v = x->e0 ;
q3("Starting from indexx->org, %Fp at %Fp",v,x);
i = 0;         //   Set the level index.
//   ------------------------------------------
//   See if the EOP node z goes to another level.
//   ------------------------------------------
q1("See if the EOP node z goes to another level.");
if (v & f10)              {   //   See if there are levels.

//   ------------------------------------------
//   There is another level, so now let's see if
//   the empty string is in the index.
//   ------------------------------------------
q1("There is another level.");
if (v & f01)              {
//   ------------------------------------------
//   The f01 flag bit says there is a record pointer,
//   so let's see if it is the NULL arc, or if it is
//   a real record pointer.
//   ------------------------------------------
```

232

```
q1("The flag bit f01 indicates a record pointer.");
q1("Checking for the NULL data pointer arc.");
//   The empty string might be in there, so let's get its data_p
tr.
t = (N *)((u)z - SESIZE);//   Get the pointer to the
                        //   prefix data_ptr.
s = t->e0;              //   Get the arc field.
q3("The record pointer at location %Fp is %Fp.",t,s);
//   ----------------------------------------------
//   Check for the NULL arc field.
//   ----------------------------------------------
if (s == NUL) goto gimme_a_break;//   See if it really is in t
here!
else                   {
//   ----------------------------------------------
//   There really is a record pointer arc, so use it.
//   ----------------------------------------------
s = s + (M4 & ((u)(t->e0)));  //   Get the data pointer,
                              //   since there is one.
     state = EQ;     //   yz is the TOT arc, and there is an empt
y
                     //   string in the index.
     save_cursor(cursor_ptr);
q1("save_cursor(cursor_ptr);");
q_ljw_cursor(cursor_ptr);
q2("Returning the data pointer %Fp.",s);
     *data_pointer = s;
     return(ljw_found);
                     }
```

```
                                }
//      ----------------------------------------------
//      There is either no record pointer flag bit f01 on,
//      or the record pointer arc is NULL, but there is a
//      next level.  So let's go on down to the next level.
//      ----------------------------------------------
gimme_a_break:
q1("At gimme_a_break:");
//              y o
//               /
//              z o
yz_left_eop_go_down_level:
q1("yz left at eop go down a level:");
cn(y,z,0);
y = z;     v = y->B;      z = (N *)((u)y + (y->e1 & M4));
q1("We are down to the next level now.");
//      Since it is not equal, we only have to see if there is
//      another level to process.
cn(y,z,1);
goto yz_right_start_going_left;
                                }
else                            {
//      ----------------------------------------------
//      There are no levels, so see if the empty string is the
//      only key in the index.
//      ----------------------------------------------
if (v & f01)                    {
//      The empty string is in there, so let's get its data_ptr.
```

```
       q1("The empty string is in there, so let's get its data_ptr.");
       s = ((u)z);          //   Get the data pointer.

state = EQ;     //   yz is the TOT arc, and there is an empt
y
                            //   string in the index.
            save_cursor(cursor_ptr);
       q1("save_cursor(cursor_ptr);");
       q_ljw_cursor(cursor_ptr);
       q2("Returning the data pointer %Fp.",s);
            *data_pointer = s;
            return(ljw_found);
                                }
else                            {
//   ------------------------------------------------
//   The flag bits are f00, so there is no next level
//   and not a record pointer.  Therefore the origin
//   field should be NULL, or this is an error.
//   ------------------------------------------------
if (v == NULL)          {
       save_cursor(cursor_ptr); //   Empty index.
       return(ljw_not_found);
                                }
printf("Failure in %s, line %d.\n",__FILE__,__LINE__);
printf("The ljw_index pointer at %Fp is invalid.\n",__FILE__,y);

printf("The flag bits f11 are 00.\n");
#ifdef   DEBUG
printf("ljw_ctr = %ld\n",ljw_ctr);
```

```
endif
       return(ljw_failure);
                                  }
                                      }
                                          }
//   ------------------------------------------------------
//   See whether the key n is less than the lower bound l,
//   or if it is greater than the lower bound l.
//
//   If n is lower, then l is the next key that is
//   greater than n.
//
//   If n is greater than l, then we have to find the next
//   key greater than or equal to n by looking to the right
//   of the arc yz.
//
//   Symbolically, the two cases can be summarized in the
//   following diagrams (remember that l = y->k):
//
//                    n < l                n > l
//                    -----                -----
//                                     o        next is
//   next is                           !        over here
//   equal to l       o y              o y      somewhere
//                     \                \
//   GT,  l > k        o <--cat's node---> o----o n
//                    / \                   \
//                   n o  o z                o z
```

237

```
//                    / \
//               o  o              LT, l < k
//                ...
//                 l          The cat's node is the node
//                            that would be in the tree
//                            if the key n were inserted.
//
//   Now we consider the case where yz is a left arc, and
//   l is not equal to n (recall that l = x->k.)
//
//                  y o                    y o
//                   /                      / \
//        n o----o <-- cat's node --> o   o    next is
//              /                     / \      down
//             z o                   z o   o   here
//                                         n   somewhere
//   ----------------------------------------------------
again:
ql("At again: See if yz is a left arc.");
//   ------------------------------------------
//   See if yz is a left arc.
//   ------------------------------------------
if (state & zright)                             {
//   ------------------------------------------
//   yz is a right arc.
//   ------------------------------------------
//                  o y
//                   \
```

```
//                    o z
q1("yz is a right arc.\n");
cn(y,z,1);
q1("Doing yz_right_get_x(x,y,z);");
yz_right_get_x(x,y,z);
q2("x = %Fp.\n",x);
// ------------------------------------
//   Get the eop flag for the right node z.
// ------------------------------------
q1("Get the eop flag for the right node z.");
if ( K(x) <= K(y) )                     {
     q1("xy is a right arc.\n");
     if (x == y)                {
                    v = x->B ;
               #ifdef    DEBUG
                    if (v & f01)    {
                    cn3("=<.",x,y,z);
                                    }
                         else       {
                    cn3("=<",x,y,z);
                                    }
               #endif
                                    }
          else                       {
                    v = x->e1 ;
               #ifdef    DEBUG
                    if (v & f10)    {
                    cn3("<<.",x,y,z);
```

```
                                }
                    else        {
            cn3("<<",x,y,z);
                                }
                #endif
                                }
qv;
                                } else                            {
    q1("xy is a left arc.\n");
    v = x->e0 ;
qv;        cn3("><.",x,y,z);
                                }

//    -----------------------------
//    Now see if l is <, =, or > n.
//    -----------------------------
q1("Checking to see if state contains EQ.");
if (state & EQ)                 {
//    -----------------------------------------------------
//    It is equal, so first get to the end of the path.
//    -----------------------------------------------------
eop = v & f01;
q1("The state indicates EQ.\n");
qeop;
q1("if (eop)   goto going_up_right_arcs;");
if (eop) goto going_up_right_arcs;
v = y->e1;      //   Get ready to go on down.
q1("v = y->e1; Now v = %Fp.");
```

```
keep_going_down_left:
    q1("At keep_going_down_left.\n");
    gdl;
cn(y,z,0);
if (!eop)     goto keep_going_down_left;
//  ----------------------------------------------
//  Now that we have got to the end of the path, we can
//  execute the normal "get next" logic.
//  ----------------------------------------------
q1("goto     yz_left_go_up_and_over;");
goto     yz_left_go_up_and_over;
                                            }
q1("Seeing if (state & GT)");
    if (state & GT)                         {
//  ----------------------------------------
//  Trace to the end of the path from yz,
//  going left all the way.
//  ----------------------------------------
//              o y
//               \
//                o z
q1("state contains GT.");
yz_right_start_going_left:
q1("At yz_right_start_going_left: (from a right yz)\n");
cn(y,z,1);
eop = v & f01;      qeop;
v = y->e1;    // Get ready to go on down.
q2("v = y->e1; Now v = %Fp.",v);
```

```
q1("if (eop)    goto the_end_with_yz_right;");
if (eop)    goto the_end_with_yz_right;
state = 0;
q1("state = 0;");
keep_going_left:
q1("At keep_going_left:\n");
    gdl;
q1("if (!eop)       goto keep_going_left;");
cn(y,z,0);
if (!eop)      goto keep_going_left;
qx;   qy;   qz;
q1("goto  the_end_with_yz_left;");
goto the_end_with_yz_left;
                                              }
    else                                      {
//   1 < n.
q1("state contains LT.");
//   ----------------------------------
     going_up_right_arcs:
//   ----------------------------------
q1("At going_up_right_arcs:");
//   ----------------------------------
//   See if yz is the top arc.
//   ----------------------------------
q1("See if yz is the top arc.");
cn(y,z,1);
if (x == y)                          {
//   ----------------------------------------------
```

```
//   Got to the top right arc, so now we need to see
//   if there is another prior level.
//   ----------------------------------------------
q1("Got to the top right arc.\n");
if (i == 0)                    {
//      ----------------------------------
//   It got to the origin of the TOT.
//      ----------------------------------
q1("Got to the TOT top.\n");
     state = zright + LT;     //   Set the state to the top arc
                              //   and LT, signifying that next
                              //   has completed.
     save_cursor(cursor_ptr)
q1("save_cursor(cursor_ptr);");
q_ljw_cursor(cursor_ptr);
     return(ljw_not_found);
                               }
i = i - 4;      //   Step the key index to the prior level.
q2("i = i - 4; Now i = %d",i);
q1("Going up_level");
q3("y = %Fp, z = %Fp",y,z);
if_up_level(y,z)               {
//   ----------------------------------------------
//   yz is a right arc on the prior level.
//   ----------------------------------------------
q1("yz is a right arc on the prior level.\n");

cn(y,z,1);
```

```
yz_right_get_x(x,y,z);      //   Get the x node.
q1("yz_right_get_x(x,y,z);");
q2("x = %Fp",x);
goto going_up_right_arcs;//   Then keep on going up.
                               }
else                          {
//      ----------------------------------------------
//    yz is a left arc on the prior level.
//      ----------------------------------------------
q1("yz is a left arc on the prior level.\n");
cn(y,z,0);
goto     yz_left_go_up_and_over;
                               }
                                      }
//      ----------------------------------------------
//    yz is a right arc.
//      ----------------------------------------------
//                  x'  o
//                      :
//                  y'  x  o
//                      / \
//                  z'  y  o    o
//                      / \
//                  o   o  z
step_up(x,y,z);      //   Go up one arc.
q1("step_up(x,y,z);");
cn(y,z,1);
yz_right_get_x(x,y,z);
```

```
q1("yz_right_get_x(x,y,z);");
q2("x = %Fp",x);
q1("if (K(y) <= K(z))    goto going_up_right_arcs;");
if (K(y) <= K(z))    goto going_up_right_arcs;
//  ----------------------------------------
//  Ah, finally got to a left arc xy.
//  ----------------------------------------
got_up_to_a_left_arc:
q1("At got_up_to_a_left_arc:\n");
//              x o
//                !
//              y o
//               / \
//              z o   o
//             / \
//            o   o
//  ------------------------------
    yz_left_go_up_and_over:
//  ------------------------------
    q1("At yz_left_go_up_and_over:\n");
cn(y,z,0);
yz_left_get_x(x,y,z);
q1("yz_left_get_x(x,y,z);");
q2("x = %Fp",x);
z = (N *)((u)x + (y->e1 & M4));
q1("z = (N *)((u)x + (y->e1 & M4));");
q4("x = %Fp, y = %Fp, z = %Fp",x,y,z);
cn(y,z,1);
```

```
l = y->k; //    Get the lower limit.
q2("l = y->k; Now l = %Fp",l);
//                      o x
//                      :
//                      o y
//                     / \
//                    o   o z
//                       / \
//                      o   o
// ------------------------------
//   Get the eop flag for z.
// ------------------------------
q1("Get the eop flag for z.");
if ( K(x) <= K(y) )             {
        v = x->e1 ;
                                }
else    v = x->e0 ;
q2("v = %Fp",v);
cn(y,z,1);
q1("goto    yz_right_start_going_left;");
goto    yz_right_start_going_left;
                                        }
                                }
else                            {
// ----------------------------------------------------
//   yz is a left arc.  See whether the state is LT, EQ, or GT.
//
//   Now we consider the case where yz is a left arc, and
```

```
//    l is not equal to n (recall that l = x->k.)
//
//                      y o              y o      LT, l < n.
//                       /                / \
//    GT, l > n.  n o----o <-- cat's node --> o   o  next is
//                     /                / \      down
//                  z o              z o   o   here
//                                         n   somewhere
//    ---------------------------------------------------------
q1("yz is a left arc.\n");
yz_left_get_x(x,y,z);
q2("yz_left_get_x(x,y,z); Now x = %Fp",x);
cn(y,z,0);
//    ------------------------------
//    Get the eop flag for z.
//    ------------------------------
q1("Get the eop flag for z.");
if ( K(x) <= K(y) )              {
    q1("xy is a right arc.\n");
    if (x == y)         v = x->B ;
    else                v = x->e1 ;
                                 }
else                             {
    q1("xy is a right arc.\n");
    v = x->e0 ;
                                 }
q2("v = %Fp",v);

//    ------------------------------
```

```
//      Now see if 1 is <, =, or > n.
//      -------------------------------
if (state & EQ)                         {
//      ----------------------------------------------------
//      It is equal, so first get to the end of the path.
//      ----------------------------------------------------
eop = v & f10;          //      Get the left EOP flag bit for z.
q1("The state indicates EQ.\n");
qeop;
q1("if (eop)     goto yz_left_go_up_and_over;");
if (eop)    goto yz_left_go_up_and_over;
v = y->e0;      //      Get ready to go on down.
q2("v = y->e0; Now v = %Fp",v);
keep_on_going_down_left:
q1("At keep_going_down_left.\n");
qeop;
     gdl;
cn(y,z,0);
q1("if (!eop)    goto keep_on_going_down_left;");
if (!eop)       goto keep_on_going_down_left;
//      ----------------------------------------------------
//      Now that we have got to the end of the path, we can
//      execute the normal "get next" logic.
//      ----------------------------------------------------
q1("It is eop, so goto    yz_left_go_up_and_over;");
goto    yz_left_go_up_and_over;
                                        }
        if (state & GT)                 {
```

```
//   ----------------------------------------------------------
//                    y  o
//                      /
//   GT, 1 > n.  n  o----o  <-- cat's node
//                      /
//                    z  o
//
//   Trace to the end of the path from yz,
//   going left all the way.
//   ----------------------------------------------------------
start_going_left_from_a_left_node_z:
q1("At start_going_left_from_a_left_node_z:\n");
cn(y,z,0);
eop = v & f10;
q1("state contains GT.");
v = y->e0;      //  Get ready to go on down.
q2("v = y->e0; Now v = %Fp",v);
q1("if (eop)   goto the_end_with_yz_left;");
if (eop)  goto the_end_with_yz_left;
state = 0;
q1("state = 0;");
q1("goto   keep_going_left;");
goto     keep_going_left;
                                          }
//   ----------------------------------------------------------
//
//                    y  o      LT, 1 < n.
//                      / \
```

```
//      cat's node --> o    o  next is
//                    / \      down
//                   z o   o   here
//                       n     somewhere
// ----------------------------------------------------
//
// yz is a left arc, but it could be the TOT arc going to
// a single data pointer for the empty string.
// ---------------------------------------------------- q1("goto  yz_left_go_up_and_over;");
goto yz_left_go_up_and_over;
                                                    } the_end_with_yz_right:
q1("the_end_with_yz_right:");
q2("v = y->e1; Now v = %Fp",v);
v = y->e1;
q1("state = zright;");
state = zright;
cn(y,z,1);
q1("goto  check_the_eop_flag_bits;");
goto check_the_eop_flag_bits;
the_end_with_yz_left:
q1("At the_end_with_yz_left:");
cn(y,z,0);
v = y->e0;
q2("v = y->e0; Now v = %Fp",v);
state = 0;
```

```
q1("state = 0;");
check_the_eop_flag_bits:
q1("check_the_eop_flag_bits:");
//  ----------------------------------------
//   See if the EOP node z goes to another level.
//  ----------------------------------------
q1("See if the EOP node z goes to another level.");
if (v & f10)              {    //   See if there are levels.

//  ----------------------------------------
//   There is another level, so now let's see if
//   there is a record in the index with a key
//   that ends with this level.
//  ----------------------------------------
q1("There is another level.");
if (v & f01)              {
//  ----------------------------------------
//   The f01 flag bit says there is a record pointer,
//   so let's see if it is the NULL arc, or if it is
//   a real record pointer.
//  ----------------------------------------
q1("The flag bit f01 indicates a record pointer.");
q1("Checking for the NULL data pointer arc.");

//   The record pointer might be in there, so let's find out.
t = (N *)((u)z - SESIZE);//   Get the pointer to the
                         //   prefix data_ptr.

s = t->e0;               //   Get the arc field.
q3("The record pointer at location %Fp is %Fp.",t,s);
```

```
//   ----------------------------------------------
//   Check for the NULL arc field.
//   ----------------------------------------------
if (s == NUL)  goto get_me_a_break;//   See if it really is in t
here!
else             {
//   ----------------------------------------------
//   There really is a record pointer arc, so use it.
//   ----------------------------------------------
s = s + (M4 & ((u)(t->e0)));   //   Get the data pointer,
                               //   since there is one.
    state = state + EQ; //   yz is the EOP arc, and there is
                        //   a record pointer there.
    save_cursor(cursor_ptr);
q1("save_cursor(cursor_ptr);");
q_ljw_cursor(cursor_ptr);
q2("Returning the data pointer %Fp.",s);
    *data_pointer = s;
    return(ljw_found);
            }
                    }
//   ----------------------------------------------
//   There is either no record pointer flag bit f01 on,
//   or the record pointer arc is NULL, but there is a
//   next level. So let's go on down to the next level.
//   ----------------------------------------------
get_me_a_break:
q1("At get_me_a_break:");
```

```
//            y o
//             /
//            z o
q1("Go down a level.\n");
y = z;     v = y->B;     z = (N *)((u)y + (y->e1 & M4));
i = i + 4;    //   Eke the word level index.
qv;
cn(y,z,1);
//   ----------------------------------------
//   There is another level to process, so go do it.
//   ----------------------------------------
q1("goto  yz_right_start_going_left;");
goto yz_right_start_going_left;
                           }
else                       {
//   ----------------------------------------
//   There are no more levels, so see if the record pointer
//   is in the index.
//   ----------------------------------------
if (v & f01)               {
//   The record pointer is in there, so let's get its data_ptr.
q1("The record pointer is in there, so let's get its data_ptr.")
;
s = ((u)z);       //   Get the data pointer.

state = EQ + state; //   yz is the arc, and there is a
                    //   data_ptr in the index.
    save_cursor(cursor_ptr);
```

```
q1("save_cursor(cursor_ptr);");
q_ljw_cursor(cursor_ptr);
q2("Returning the data pointer %Fp.",s);
    *data_pointer = s;
    return(ljw_found);
                    }
else                {
//  ------------------------------------------------
//  The flag bits are f00, so there is no next level
//  and not a record pointer.  This is an error.
//  ------------------------------------------------
printf("Failure in %s.\n",__FILE__);
printf("The ljw_index pointer at %Fp is invalid.\n",__FILE__,y);

printf("The flag bits f11 are 00.\n");
#ifdef   DEBUG
printf("ljw_ctr = %ld\n",ljw_ctr);
#endif
return(ljw_failure);
                    }
                }
                                                }
//23456789 123456789 123456789 123456789 123456789 123456789 123
456789
```

APPENDIX Q -- FWPREFIX

```
/*          The fwprefix program.
            Copyright (c) LJW 1989, 1992
            All rights reserved.
-----------------------------------------------------------*/
/*
```
The fwprefix function is used to look for a key
in a table that is a prefix of a key string.
The prefix may include the whole key string,
or it may be just a leading portion of the
string.
The fwprefix function will match to a table key
that ends with a delimiter or it will match if
the table key is equal to a prefix of the argument
key and the byte after the matched prefix in the
input key is a delimiter, or if the table key is
equal to the input key.
One application of the fwprefix function is to
translate a set of words, phrases, and abbreviations
(WPAs) in text to another set of words, phrases, or
abbreviations.
The fwprefix function is especially useful when
translating a set of words, phrases, or abbreviations
to another set of words, phrases, or abbreviations,
where some of the words, phrases, or abbreviations may be prefixes of some of the other words, phrases, or abbreviations in either the "from" set or the "to" set. If a translation of WPAs is executed one at a time, then a problem can arise when some of the WPAs are prefixes of other WPAs in the target set. The order of execution must be to look for the longest WPA first, in order to preferentially find the longer one rather than a prefix of it.

The fwprefix function searches the whole table of WPAs as a unit, rather than one at a time. This solves the problem of the proper treatment of WPAs that are prefixes of other WPAs.

Operation:
----------

First, fwprefix executes the normal search logic, tracing a path in the multilevel tree until either (a) it fails to find an equal word in a current little tree, or (b) it comes to an end-of-path in a current little tree and is equal to the associated word, so there is a string in the table that matches to a prefix of the key, but there is no continuing next level little tree, or (c) it is equal to a word in the current little tree and simultaneously reaches the end of the search string.

If case (c) applies, then there is a match, and fwprefix
returns the number of bytes that were equal, ct, and
the associated pointer.

If case (b) applies, then if byte i of the key is a delimiter,
or if byte (i - 1) of the key is a delimiter, then there is a
match, and fwprefix returns the associated pointer.
If both bytes i and (i - 1) of the key are not delimiters,
then there is no match, and the backtrack search follows.
If case (a) applies, then there is no match, and the backtrack
search follows.

The Backtrack Search
----------------------

The backtrack search begins with some current arc, yz.
The backtrack search begins with the assumption that the
path ending in the arc yz does not match on the end of
a word in the input key, as described above.
In particular, it does not match to a prefix ending with
i equal bytes.
Therefore, we examine the bytes in the last word tried, w,
to see if there might be a match ending in some byte not the
last byte in w.
We select bytes in the last word, w, formed from the key,
starting with the last byte of the word, w, and we set it to zero,
to indicate a string that is one byte shorter than the substring that was tried for a match.
If said selected byte was already zero, then we go on to select the previous byte in the word w.

Otherwise, we examine the selected byte before it was replaced, and see if it is a delimiter. If it is a delimiter, then we try to match using the modified word w.

If it is not a delimiter, then we examine the byte before the selected byte, if there is one. If there is none, then we could match to the empty string, if there is one in the table. If there is one, then we see if it is a delimiter.

If it is a delimiter, then we try to match using the modified word w.

If all of the bytes in the word w have been selected, and no match was found, then we go back up the backpath in the current little tree, until we get to the predecessor little tree, if there is one. If there is none, then the match fails. If there is one, then we repeat the byte selection process for the word in the key at (i - 4), etc., but with one difference. First we subtract 4 from i, so that we examine the previous word in the key.

In doing the delimiter check, we also check byte (i + 4) for being a delimiter when the entire word at the previous level is tried for the first time, i.e. when all the bytes in the word are selected.

Try to Match
------------

In this step, we search the little tree on the current level to see if the current word w is present.

If it is present, and the path ends with an arc that goes to an associated pointer (or pointers), then we have a match, since we did the delimiter check before searching for the word w.

The number of bytes matched is equal to the current value of i, plus the number of matched bytes at the front of the current word w, and the associated pointer is the one obtained from the end arc of the path.

```
*/
#include   "ljwsys.h"
int        fwprefix(
           ljw_index *index,        //   Pointer to table.

char *KEY,               //   Address of character string.
           int ct,                  //   #bytes in the character string.
           int  *num_equal,
           u    *data_pointer
           )
                                                                {
// Declare variables.
N *x;    N *y;   N *z;     N *r;
u *e;    u n;    u l;       u v;
u f;        u kj;      int  ij;
u last_s;   u s;    N *t;  u w;
int i;       int j;    u eop;    u key;
u      rc;  //  The return code.
u      byte_mask;    //   A temporary variable.
ljw_cursor       cursor;
```

```
u       nl;

int     c;

int     state;      //  The state.

u       not_there;

u       *table;

u       dummy_data_pointer;

// End of variable declarations.

table = (u *)(*index);

q1("Beginning fwprefix.\n");

q2("table = %Fp\n",table);

q2("ct = %d\n",ct);

//  First we have to see if there are any
//  entries in the table.

if (*table == NUL)       return(ljw_not_found);

//  We have to get a cursor.

rc = i_cursor(&cursor,index);

//  We will assume that the search argument
//  string starts on a word boundary in the text.
//  Execute the afindc cursor search function,
//  to set the cursor with the search string
//  as its argument.

rc = afindc( &cursor, index, KEY, ct, &dummy_data_pointer);

q2("Return from afindc. rc = %ld\n",rc);

if (rc == ljw_failure)    return(ljw_failure);

q_ljw_cursor(&cursor);

get_cursor(&cursor);

//  ------------------------------------------
```

```
//    Now iterate backwards through the key,
//       looking for each part of the key that ends on
//       a word boundary, and seeing if any of the
//       prefixes of the key that end on word
//       boundaries are in the table.
//    Find the longest such prefix, if there is one.
//    ---------------------------------------------
ij = i + 4;          //   Get the index of the byte just after
                     //      the current byte.
//    ---------------------------------------------
//    See if the byte just after the word indexed by i
//       in the key is part of the string.
//       If it is, then use that byte to determine the
//       initial setting of s.
//
//       If it is not, then set s to 1, and begin with a
//       value for j that causes i + j to = ct - 1.
//    ---------------------------------------------
if (ij < ct)         {
c = KEY[ij];         //   The byte after the i-word is there.
s = DLM(c);          //   Compute s from it.
last_s = s;          //   Compute last_s from s.
j = 3;               //   And start with the last byte of the word.
                     }
else                 {
j = ct - i - 1;      last_s = s = 1;
                     }
q2("s = %d",s);
```

```
for ( ; i >= 0; i = i - 4)                              {
save_cursor(&cursor);    q_ljw_cursor(&cursor);
key = *((u *)(&KEY[i]));
w = c2w(key, i, ct);
nl = (w ^ l);
q5("i = %d, j = %d, nl = %Fp, w = %Fp\n",i,j,nl,w);
         for ( ; ((!s || nl) && (j >= 0)) ; j--)
    {
q5("i = %d, j = %d, nl = %Fp, l = %Fp\n",i,j,nl,l);
kj = (w >> ((3 - j) <<3)) & 255L;
q3("kj = %ld, s = %d\n",kj,s);
     if ( ( s != 0 ) || ( DLM ( kj )))
                                         {
//   See if the key that is exactly (i + j + 1)
//   bytes long is in the table.
//   If so, let z be the associated EOP node.
//   Chop off the low order bytes in w.
byte_mask = (-1L << ((3 - j) << 3));
q2("byte_mask = %Fp\n",byte_mask);
w = w & byte_mask;
q6("i = %d, j = %d, nl = %Fp, w = %Fp, kj = %ld\n",i,j,nl,w,kj);

rc = findc(&cursor, w);
if (rc == ljw_failure)    {
    printf("ljw_failure from findc.\n");
    return(ljw_failure);
                }
    q_ljw_cursor(&cursor);
get_cursor(&cursor);     //   Get the cursor variables.
```

```
nl = w ^ 1;       //  Get the exclusive-or.
q5("i = %d, j = %d, nl = %Fp, w = %Fp\n",i,j,nl,w);
if (rc != ljw_not_found)                              {
//   ----------------------------------------
//   The key is found.
//   ----------------------------------------
if (j < 0)      q1("j is < 0 and nl = 0.  Error.");
     if (state & zright)                              {
q5("y = %Fp:  %Fp  %Fp  %Fp",y,y->e0,y->e1,y->k);
q5("z = %Fp:  %Fp  %Fp  %Fp",z,z->e0,z->e1,z->k);
          yz_right_get_x(x,y,z);      //   Get y's predecessor q5("x = %Fp:  %Fp  %Fp  %Fp",x,x->e0,x->e1,x->k);
          yz_right_get_eop(x,y,z);    //   Compute eop.
          yz_right_get_f(y,z);        //   Get the EOP flag bi
ts.
                                                      }
     else                                             {
          yz_left_get_x(x,y,z);       //   Get x.
          yz_left_get_eop(x,y,z);     //   Compute eop.
          yz_left_get_f(y,z);         //   Get EOP flag bits.
                                                      }
     q5("x = %Fp:  %Fp  %Fp  %Fp",x,x->e0,x->e1,x->k);
     q5("y = %Fp:  %Fp  %Fp  %Fp",y,y->e0,y->e1,y->k);
     q4("z = %Fp  eop = %Fp, f = %Fp",z,eop,f);
//   ----------------------------------------
//   See if yz is an EOP arc.  If not, then this
//   is an error, because eindc should have left
//   the yz arc positioned at the end of a path.
```

```
//      ----------------------------------
        if (!eop)                               {
            q0; printf("In fwprefix the search word w is\n");
                printf("is equal to the key left by findc,\n");
                printf("but the yz arc is not at end of path.\n")
;
                #ifdef      DEBUG
                printf("#%ld\n",ljw_ctr);
                #endif
                return(ljw_failure);

}
        else                                    {
        //      ----------------------------------
        //      See if it goes only to a record,
        //      or only to another level, or
        //      both, or neither.
        //      ----------------------------------
            if (f & f01)                        {
                if (f == f01)       {
                //      ----------------------------------
                //      It only goes to a record.
                //      ----------------------------------
                //      Store the # of equal bytes.
                    *num_equal = (i + j + 1);
                q3("rc = %Fp, num_equal = %d",rc,*num_equal);
                *data_pointer = ((u)z);
                    q0; return(ljw_found);
                                    }
                else                {
```

```
//      --------------------------
//      It goes to another level and
//      to a record(s).
//      --------------------------
x = (N *)((u)z - SESIZE);//   Get record arc.
rc = x->RO;              //   Get record offset.
if (rc <= f11) goto this_is_not_it;
rc = rc & M4;
rc = rc + (u)z;
//      Store the # of equal bytes.
    *num_equal = (i + j + 1);
*data_pointer = rc;
q0;  return(ljw_found);
                    }
                }
        else     goto     this_is_not_it;
                            }
                        }
//   ------------------------------------------------
//   The key is either not found or the arc does not go to
//   a record, but onlly to another level.
//   ------------------------------------------------
this_is_not_it:
q5("i = %d, j = %d, nl = %Fp, w = %Fp\n",i,j,nl,w);
last_s = s;   //  Save s before it is changed for the next time.
s = DLM( kj ); //  Calculate whether KEY[j] is a
              //  delimiter for the next iteration.
```

```
q6("i = %d, j = %d, nl = %Fp, w = %Fp, s = %d\n",i,j,nl,w,s);
q2("kj = %ld",kj);
                                                    }              }

//      ----------------------------------------
//      Here is where we have processed a 4-byte
//      number and either found it in the table
//      or tried all four bytes and none of them
//      resulted in a match.
//      If a match occurs, and nl = 0, then in order
//      for a match to be acceptable, it has to end
//      in a byte that is either a delimiter, or is
//      followed by a delimiter.
//      The last_s keeps track of whether the byte
//      after the last byte of the matched portion
//      is a delimiter (or past the end of the input.)
//
//      The variable s keeps track of the current
//      byte of the matched portion.
//      Therefore there is only an acceptable match
//      if last_s is not zero, or if s not zero, i.e.
//      one or the other of the the last two bytes
//      processed must be a delimiter.
//      ----------------------------------------
if ( !nl && (last_s || s) )                         {
//      ----------------------------------------
//      The key is found.
//      ----------------------------------------
        if (state & zright)                         {
```

```
                yz_right_get_x(x,y,z);       //   Get y's predecessor yz_right_get_eop(x,y,z);     //   Compute eop.

yz_right_get_f(y,z);         //   Get the EOP flag bi
ts.
                                             }
        else                                 {
                yz_left_get_x(x,y,z);        //   Get x.

yz_left_get_eop(x,y,z);      //   Compute eop.

yz_left_get_f(y,z);          //   Get EOP flag bits.
                                             }
//      ---------------------------------------
//      See if yz is an EOP arc.  If not, then this
//      is an error, because findc should have left
//      the yz arc positioned at the end of a path.
//      ---------------------------------------
        if (!eop)                            {
            q0; printf("In fwprefix the search word w is\n");
                printf("is equal to the key left by findc,\n");
                printf("but the yz arc is not at end of path.\n")
;
                return(ljw_failure);

}
        else                                 {
                //      ---------------------------------
                //      See if it goes only to a record,
                //      or only to another level, or
                //      both, or neither.
                //      ---------------------------------
```

```
if (f & f01)           {
    if (f == f01) {
//      ----------------------------
//      It only goes to a record.
//      ----------------------------
        rc = (u)z;
//      Store the # of equal bytes.
        *num_equal = (i + j + 1);
        *data_pointer = rc;
        q0; return( ljw_found);
                }
    else           {
//      ----------------------------
//      It goes to another level and
//      to a record(s).
//      ----------------------------
        z = (N *)((u)z - SESIZE);       //   Get record arc
        rc = z->e0;                     //   Get record offset.
        if (rc <= f11) goto not_this_one;
        rc = rc & M4;
        rc = rc + (u)z;
//      Store the # of equal bytes.
        *num_equal = (i + j + 1);
    *data_pointer = rc;
    q0;  return(ljw_found);
                }
                }
else     goto    not_this_one;
```

```
                                            }
                                        }
not_this_one:
if ( i > 0 )                            {
    if ( y != z )                       {
    if (state & zright)     right_z_get_top(x,y,z)
    else                    left_z_get_top(x,y,z)
                                        }
//        y == z.
//        --------
state = state & (M1 - zright);
if ( up_level(y,z) )    state = state + zright;
                                        }
j = 3;     //   Get ready for next time.

}

//  ----------------------------------------------------
//  Compute the number of bytes to get to the next word.
//  ----------------------------------------------------
#ifndef  num_to_dlm
#define  num_to_dlm(key, i, ct)                 \
                                        {       \
int   jauk,      jaup;                          \
for (jauk = i; jauk < ct; jauk++) {             \
    jaup = key[jauk];                           \
    if DLM(jaup)    break;                      \
                                    }           \
*num_equal      =     jauk - i;                 \
                                        }
```

```
endif num_to_dlm(KEY, i, ct);

rc = ui_cursor(&cursor); //   Uninstantiate the cursor.

q0;  return(ljw_not_found);
                                                                    }

//23456789 123456789 123456789 123456789 123456789 123456789 123
456789
```

APPENDIX R -- FINDC

```
/*---------------------------------------------
The findc program.
Copyright (c) 1988, 1992 by Luther J. Woodrum.
All rights reserved.
May 10, 1992.

This work may not be copied in any form without the
permission of Luther J. Woodrum Given the a cursor, and
the key (an unsigned long word).

The findc program finds the key in the tree, or   else
finds where the key would be if it was in the table.
------------------------------------------------------*/
#include "ljwsys.h"
#define    K(hmm)    (hmm->k)
int        findc(ljw_cursor *cursor_ptr, u key)
  {
// Declare variables.
u *table; //   The address of the TOP EDGE.
N *nn;    //   New node for insert.
N *x;     //   The predecessor of y.
N *y;     //   Starting node of current arc.
N *z;     /*   Ending node of current arc, and        */
```

```
                /*      also the address of the next little table.*/
N  *r;          /*      Last starting node of a right arc.  */
u  *e;          /*      Address of arc selected.        */
u  v;           /*      The value of *e.                */
u  n;           /*      The new key for the insert.         */
u  l;           /*      The lower bound for the current interval.*/
u  nl;          /*      The difference of n and nl.         */
u  nh;          /*      The difference of n and nh.         */
u  lh;          /*      The difference of nl and nh.        */
u  eop;         /*      The end-of-path flag.               */
u  b;           /*      A temporary for computing arcs.     */
u  s;           /*      A temporary for computing arcs.     */
N      *t;      /*      A temporary for getting the value. */
int    state;   //      The state variable.
int    i;       //      The index to the key byte.
// End of variable declarations.
/*-----------------------------------------------------------

The following are the possible starting conditions.
o   yz is at the top of a little tree.
    This is true if the y = z.
    Otherwise,
o   yz is a left arc, or
o   yz is a right arc, somewhere in the tree.
-----------------------------------------------------------*/
n = key;
    q1("Beginning findc.\n");
    q2("key = %Fp\n",key);
q_ljw_cursor(cursor_ptr);
```

```
get_cursor(cursor_ptr);

if (y == z)     goto      start_at_the_little_top;

//  ----------------------------------------
//  See if yz is a left arc.
//  ---------------------------------------- if (state & zright) goto yz_right_period;

//  --------------------------
        yz_left_period:

q3("yz_left_period:\ny = %Fp, z = %Fp\n",y,z);

//  -------------------------- q5("y = %Fp: %Fp  %Fp  %Fp\n",y,y->e0,y->e1,y->k);
                        //      x o
                        //        !
                        //      y o
                        //       / \
                        //      z o  o yz_left_get_x(x,y,z);

q9("\nx = %Fp:  %Fp  %Fp  %Fp\ny = %Fp:  %Fp  %Fp  %Fp\n",x,x->e
0,x->e1,x->k,y,y->e0,y->e1,y->k);

q2("x->node = %Fp\n",x->node);

ccx;

//  --------------------------
//  See if xy is a left or a
//  right arc.
//  -------------------------- if ( K(x) > K(y) )  goto xy_left_yz_left_period;
        //     x o  r       x is not equal to y,
        //        \         because yz is a left arc.
```

```
//          y o
//           / \
//          z o
xy_right_yz_left_period:
q1("xy_right_yz_left_period:\n");
r = x;
choose ( K(r), K(y), xy_right_yz_left_in_ls_y,
                     xy_right_yz_left_in_rs_y,
                     xy_right_at_xy_or_above);
// ------------------------
    xy_right_in_ls_y:
q1("xy_right_in_ls_y:\n");
// ------------------------
    z = (N *)((u)x + (y->e0 & M4));
// ------------------------
    xy_right_yz_left_in_ls_y:
q1("xy_right_yz_left_in_ls_y:\n");
// ------------------------
    //          x o r
    //             \
    //          y o
    //           / \
    //          z o  o p
    // ---------------------------
    //  See if yz is at EOP.
    // ---------------------------
    r = x;       l = r->k; nl = n ^ l;
    eop = (x->e1 & f10) ;
```

```
        if ( eop ) goto    yz_left_at_yz_r_known;
        e = &y->e0;   v = *e;   goto    get_down;
//      ------------------------
        xy_right_yz_left_in_rs_y:
q9("xyright_yz_left_in_rs_y:\nx = %Fp:  %Fp  %Fp  %Fp\ny = %Fp:
    %Fp  %Fp  %Fp\n",x,x->e0,x->e1,x->k,y,y->e0,y->e1,y->k);
//      ------------------------
xy_right_get_right_z(x,y,z);
//      ------------------------
        xy_right_at_xy_or_above:
q3("xy_right_at_xy_or_above:\nx = %Fp, y = %Fp\n",x,y);
//              o
//              !
//              o x
//             / \
//            o   o y
//      ------------------------
step_up(x,y,z);
//      ------------------------
        yz_right_at_yz_or_above:
q3("yz_right_at_yz_or_above:\ny = %Fp, z = %Fp\n",y,z);
//      ------------------------
q9("\nx = %Fp:  %Fp  %Fp  %Fp\ny = %Fp:  %Fp  %Fp  %Fp\n",x,x->e
0,x->e1,x->k,y,y->e0,y->e1,y->k);

yz_right_get_x(x,y,z);

q9("\nx = %Fp:  %Fp  %Fp  %Fp\ny = %Fp:  %Fp  %Fp  %Fp\n",x,x->e
0,x->e1,x->k,y,y->e0,y->e1,y->k);

if ( K(x) > K(y) )  goto xy_left_yz_right_at_yz_or_above;

if (x != y)    goto xy_right_yz_right_at_yz_or_above;

//      ------------------------------
```

```
//   Found the right delta arc yz.

yz_right_at_yz:

q1("yz_right_at_yz:\n");

//   ------------------------------ l = y->k; //   Get the lower bound.

yz_right_get_state;

save_cursor(cursor_ptr);

q_ljw_cursor(cursor_ptr);      signal_if_found;

//   ------------------------------ xy_left_yz_right_at_yz_or_above:

q4("xy_left_yz_right_at_yz_or_above:\nx = %Fp, y = %Fp, z = %Fp\
n",x,y,z);

//   ------------------------------
    //          r o
    //             \
    //              o
    //              .
    //              .
    //          x o
    //             /
    //          y o
    //           / \
    //          o   z get_r(x,y);

choose ( K(r), K(y),    xy_left_in_ls_y_r_known,
                            yz_right_at_yz,
                            xy_left_at_xy_or_above)

//   ------------------------------
```

```
        xy_left_in_ls_y_r_known:
q4("xy_left_in_ls_y_r_known:\nx = %Fp, y = %Fp, r = %Fp",x,y,r);

//      ----------------------------------
        xy_left_get_left_z(x,y,z);
//      ----------------------------------
        yz_right_period:
//      ----------------------------------
//              o y
//               \
//                o z
        yz_right_get_x(x,y,z);
q3("yz_right_period:, x = %Fp, y = %Fp\n",x,y);
        if (top_arc(x,y))   goto xy_top_at_yz_or_below;
        if (right_arc(x,y)) goto xy_right_yz_right_period;
//      ----------------------------------
        xy_left_yz_right_period:
q4("xy_left_yz_right_period:\nx = %Fp, y = %Fp, z = %Fp",x,y,z);

//      ----------------------------------
//              x o
//                 / \
//              y o
//                 / \
//              z o
        choose ( K(y), K(x),    xy_left_yz_right_in_ls_x,
                                xy_left_in_rs_x,
                                xy_left_at_x_or_above)
//      ----------------------------------
```

```
    xy_right_yz_right_at_yz_or_above:

q4("xy_right_yz_right_at_yz_or_above:\nx = %Fp, y = %Fp, z = %Fp
\n",x,y,z);

//    ---------------------------------- step_up(x,y,z);

goto yz_right_at_yz_or_above;

//    ---------------------------------- xy_left_yz_left_period:

q4("xy_left_yz_left_period:\nx = %Fp, y = %Fp, z = %Fp",x,y,z);

q9("\nx = %Fp:    %Fp    %Fp    %Fp\ny = %Fp:    %Fp    %Fp    %Fp\n",x,x->e
0,x->e1,x->k,y,y->e0,y->e1,y->k);

ccx;

//    ----------------------------------
//              x o
//               /
//              y o
//               / \
//              z o
choose( K(y), K(x), xy_left_yz_left_in_ls_x,
                    xy_left_in_rs_x,
                    xy_left_at_x_or_above)

//    ---------------------------------- xy_left_yz_left_in_ls_x:

q1("xy_left_yz_left_in_ls_x:\n");

q9("\nx = %Fp:    %Fp    %Fp    %Fp\ny = %Fp:    %Fp    %Fp    %Fp\n",x,x->e
0,x->e1,x->k,y,y->e0,y->e1,y->k);

//    ----------------------------------
//              x o
//               /
//              y o
```

```
          //          / \
          //         z   o
    get_r(x,y);
    choose( K(r), K(y), xy_left_yz_left_in_ls_y,
                        xy_left_yz_left_in_rs_y,
                        xy_left_at_xy_r_known);
//  ----------------------------------
        xy_left_in_rs_x:
    q1("xy_left_in_rs_x:\n");
//  ----------------------------------
          //          x   o
          //         /
          //        y   o
          //          / \
          //         z   o
        step_up(x,y,z);      yz_left_get_x(x,y,z);
          //          x   o
          //              ¦
          //          y   o
          //            / \
          //           z   o
        if ( K(x) > K(y) )  goto xy_left_yz_left_in_rs_y;
        else                goto xy_right_yz_left_in_rs_y;
//  ----------------------------------
        xy_left_at_x_or_above:
    q3("xy_left_at_x_or_above:\nx = %Fp, y = %Fp\n",x,y);
//  ----------------------------------
        step_up(x,y,z);      yz_left_get_x(x,y,z);
```

```
        if ( K(x) > K(y) )  goto xy_left_at_xy_or_above;
        else                goto xy_right_at_xy_or_above;
//      ----------------------------------
        xy_left_yz_left_in_ls_y:
q1("xy_left_yz_left_in_ls_y:\n");
//      ----------------------------------
        v = y->e0;      eop = x->e0 & f10;
        goto get_down;
//      ----------------------------------
        xy_left_yz_left_in_rs_y:
q1("xy_left_yz_left_in_rs_y:\n");
//      ----------------------------------
        v = y->e1;      eop = x->e0 & f01;
        r = y;    nl = ( n ^ K(y) );
goto go_down;
//      ----------------------------------
        xy_left_at_xy_r_unknown:
q1("xy_left_at_xy_r_unknown:\n");
//      ----------------------------------
        step_up(x,y,z);
//      ----------------------------------
        yz_left_at_yz_r_unknown:
q1("yz_left_at_yz_r_unknown:\n");
//      ----------------------------------
        get_r(y,z);
        goto yz_left_at_yz_r_known;
//      ----------------------------------
        xy_left_at_xy_r_known:
```

```
        q1("xy_left_at_xy_r_known:\n");
//      -----------------------------------
        step_up(x,y,z);
//      -----------------------------------
        yz_left_at_yz_r_known:
        q1("yz_left_at_yz_r_known:\n");
//      -----------------------------------
        n1 = n ^ K(r);
        yz_left_get_state;
        save_cursor(cursor_ptr); signal_if_found;
//      -----------------------------------
        xy_left_at_xy_or_above:
        q9("xy_left_at_xy_or_above:\nx = %Fp:    %Fp    %Fp    %Fp\ny = %Fp:
%Fp    %Fp    %Fp",x,x->e0,x->e1,x->k,y,y->e0,y->e1,y->k);
//      -----------------------------------
//                  x o
//                   /
//                  y o
        step_up(x,y,z);
        yz_left_get_x(x,y,z);
//      -----------------------------------
        yz_left_at_yz_or_above:
        q1("yz_left_at_yz_or_above:\n");
//      -----------------------------------
//                  x o
//                    ;
//                  y o
//                   / \
```

```
//            z o
if ( K(x) <= K(y) ) goto xy_right_yz_left_at_yz_or_above;
//      ----------------------------------
     xy_left_yz_left_at_yz_or_above:
q1("xy_left_yz_left_at_yz_or_above:\n");
//      ----------------------------------
     //           x o
     //            /
     //          y o
     //           / \
     //          z o
get_r(x,y);
choose ( K(r), K(x),     yz_left_at_yz_r_known,
                         xy_left_yz_left_in_rs_y,
                         xy_left_at_xy_or_above)
//      ----------------------------------
     xy_right_yz_left_at_yz_or_above:
q1("xy_right_yz_left_at_yz_or_above:\n");
//      ----------------------------------
     //          x o r
     //             \
     //          y o
     //           / \
     //          z o
r = x;
choose ( K(r), K(y),     yz_left_at_yz_r_known,
                         xy_right_yz_left_in_rs_y,
                         xy_right_at_xy_or_above)
```

```
//    ---------------------------------
        xy_top_at_yz_or_below:
q1("xy_top_at_yz_or_below:\n");
//    ---------------------------------
r = y;      nl = n ^ r->k;
eop = x->B & f01;     v = y->e1;
goto get_down;
//    ---------------------------------
        xy_right_yz_right_period:
q4("xy_right_yz_right_period:\nx = %Fp, y = %Fp, z = %Fp\n",x,y,
z);
//    ---------------------------------
        //         x o r
        //            \
        //           y o
        //            / \
        //           o z
r = x;
choose ( K(r), K(y),     xy_right_yz_right_in_ls_y,
                         xy_right_yz_right_at_yz_or_below,
                         xy_right_at_xy_or_above)
//    ---------------------------------
        xy_right_yz_right_in_ls_y:
q9("xy_right_yz_right_in_ls_y:\nx = %Fp:  %Fp  %Fp  %Fp\ny = %Fp
:  %Fp  %Fp  %Fp",x,x->e0,x->e1,x->k,y,y->e0,y->e1,y->k);
//    ---------------------------------
xy_right_get_left_z(x,y,z)
//    ---------------------------------
        xy_right_yz_right_at_yz_or_below:
```

```
q4("xy_right_yz_right_at_yz_or_below:\nx = %Fp, y = %Fp, z = %Fp
\n",x,y,z);
//    ----------------------------------
      r = y;    nl = n ^ r->k;
      eop = x->e1 & f01;   v = y->e1;q2("eop = %ld\n",eop);
      goto get_down;
//    ----------------------------------
      xy_left_yz_right_in_ls_y:
//    ----------------------------------
      nl = n ^ r->k;
      eop = x->e0 & f10;   v = y->e0;
      goto go_down;
//    ----------------------------------
      xy_left_yz_right_in_rs_y:
//    ----------------------------------
      r = y;    nl = n ^ r->k;
      eop = x->e0 & f01;   v = y->e1;
      goto get_down;
//    ----------------------------------
      xy_left_yz_right_in_ls_x:
q1("xy_left_yz_right_in_ls_x:\n");
      xy_left_yz_right_at_xy_or_below:
q1("xy_left_yz_right_at_xy_or_below:\n");
//    ----------------------------------
get_r(x,y);
choose ( K(r), K(y),      xy_left_yz_right_in_ls_y,
                          xy_left_yz_right_in_rs_y,
                          xy_left_at_xy_r_known)
//    ----------------------------------
```

```
    xy_left_at_xy_or_below:
q1("xy_left_at_xy_or_below:\n");
//   ------------------------------
//       r o
//          \
//           ...
//        x o
//         / \
//        y o
//        / \
//       o   o
get_r(x,y);
choose ( K(r), K(y),    xy_left_in_ls_y_r_known,
                        xy_left_in_rs_y,
                        xy_left_at_xy_r_known)
//   ------------------------------
    xy_left_in_rs_y:
q3("xy_left_in_rs_y:\nx = %Fp, y = %Fp",x,y);
//   ------------------------------
    xy_left_get_right_z(x,y,z);
/*----------------------------------------------
yz is the top arc in the tree.
----------------------------------------------*/
start_at_the_little_top:
q1("start_at_the_little_top:\n");
x = y;
//   ---------------------------
    go_right_from_xy:
```

```
q3("go_right_from_xy:\nx = %Fp, y = %Fp",x,y);

//      ------------------------- e = &x->e1;     eop = x->B & f01;   v = *e;

/*-----------------------------------------------
Trace the path in the little tree, starting with
the arc yz, and either find the current word n in
the little tree or find the delta arc where it
would be.
-----------------------------------------------*/

//      -------------------------
    xy_to_yz:
//      ------------------------- r = y;   n1 = y->k ^ n;   q3("r = %ld, n1 = %Fp.",r,n1);

//      -------------------------
go_down:
//      ------------------------- z = (N *)((u)x + v);    q2("z = %Fp",z);

/*-----------------------------------------------
    Trace the forward path, looking for the delta arc.
-----------------------------------------------*/ get_down:

q7("get_down:\nr = %Fp, x = %Fp, y = %Fp, z = %Fp, eop = %Fp, v = %Fp",r,x,y,z,eop,v);

cc_node("r",r);

for ( ; !eop ; )                    {

/*-----------------------------------------------
It is not yet the END OF PATH. Continue the forward path
trace to find the delta arc.
```

```
------------------------------------------------------------*/
    qz;         qq_z;
nh = z->k ^ n;      lh = nl ^ nh;
    //  qnh("31");      qlh("32");
if ( nh < lh )              {
    if (nl < nh ) {
        goto go_down_into_the_left_subtree;
            }
    else            {
/*------------------------------------------------------------
Go down into the right subtree via the right arc, el.
------------------------------------------------------------*/
gdr;
                }       }
else                    {
    if (nl < lh )       {
//      ------------------------------------------
    go_down_into_the_left_subtree:
//      ------------------------------------------
gdl;
                }
    else            {
/*------------------------------------------------------------
    Found the MOP delta arc yz.
------------------------------------------------------------*/
l = nl ^ n;
q5("l = %Fp, r = %Fp, y = %Fp, z = %Fp",l,r,y,z);
//      ------------------------------------------
```

```
//    Set the state.
//    r = y if z is a right successor.
//    ----------------------------------------------------
state = ((l > n) ? GT : LT) + ((r == y) ? zright : 0);
save_cursor(cursor_ptr);
q1("Not found.\n");
return(ljw_not_found);
                              }    }    }
/*---------------------------------------------------------
    It is the END OF PATH, so see if the new word n is
    already in the tree. If it is, then store the yz arc
    in the cursor, and return a NUL to indicate that
    the key was found.
----------------------------------------------------------*/
z = (N *)((u)z & M4);
if (nl != 0)                      {
/*---------------------------------------------------------
    It is the end of the path, and the new word n is not
    already in the tree.
----------------------------------------------------------*/
l = nl ^ n;    q4("l = %Fp   n = %Fp   nl = %Fp",l,n,nl);
q4("r = %Fp   y = %Fp   z = %Fp",r,y,z);
state =    ((l > n) ? GT : LT) + ((r == y) ? zright : 0);
save_cursor(cursor_ptr);
      return(ljw_not_found);
                                  }
else                              {
/*---------------------------------------------------------
```

```
                    It got to the end of the path, and the
                    new key is equal to a key already in the tree.
                    Store the stuff in the cursor and return the
                    found pointer to signal that the key was found.
---------------------------------------------------------------*/
l = nl ^ n;
q1("The key is found.");
q5("x = %Fp:   %Fp   %Fp   %Fp",x,x->e0,x->e1,x->k);
q5("y = %Fp:   %Fp   %Fp   %Fp",y,y->e0,y->e1,y->k);
q4("z = %Fp,   eop = %Fp, l = %Fp",z,eop,l);
state =  ((eop == f01) ? zright : 0) + EQ;
save_cursor(cursor_ptr); q_ljw_cursor(cursor_ptr);
       return(ljw_found);   //   Return.
                                       }                         }
//23456789 123456789 123456789 123456789 123456789 123456789 123
456789
```

APPENDIX S -- LJWGLOBL

```
//   -----------------------------------------
//   The global variables needed for tracing.
//   -----------------------------------------
#include "ljwsys.h"

long ljw_ctr     = 0L;      //   The global counter of how many
                            //   times a "q" macro has been done.
long ljw_ctr_start = 0L;//   The first number of the defined
                            //   range of values of ljw_ctr.
                            //   Tracing is only active for values
                            //   of ljw_ctr in the defined range.
long ljw_ctr_end   = 0L;//   The last number of the defined
                            //   range of values of ljw_ctr.
ljw_index ljwtrace = 0L;  // The index of file names for
                            //   tracing.
long modulus = 0L;//    The modulus for printing out the
                  //    trace line every once in a while.
long cumulative_modulus = -1L;
```

APPENDIX T -- SEE_NODE

```c
//   --------------------------------------------------
//   The see_node function, to display nodes in a binary
//   tree, given only the arc yz, and whether yz is a
//   left or a right arc.
//   --------------------------------------------------
#include   "ljwsys.h"
#ifdef     PC_ENV
    #define    ljw_qf3    ljw_q9
#else
    #define    ljw_qf3    ljw_q3
#endif
#define    pn0(len,node,x)                          \
    for (i = 0; i < len; ts[ i++ ] = ' ')  {}   \
    ts[i] = '\0';                                \
    ljw_qf3(pgm, line_num," %s %Fp\n",node,x);   \
    ljw_qf3(pgm, line_num, " %s %Fp\n",ts,x->e0);   \
    ljw_qf3(pgm, line_num, " %s %Fp\n",ts,x->e1);   \
    ljw_qf3(pgm, line_num, " %s %Fp\n",ts,x->k);
#define    pn1(len,node,x)                                  \
    for (i = 0; i < len; ts[ i++ ] = ' ')  {}   \
    ts[i] = '\0';                                \
    ljw_qf3(pgm, line_num, "              %s %Fp\n",node,x);  \
    ljw_qf3(pgm, line_num, "              %s %Fp\n",ts,x->e0); \
```

```
        ljw_qf3(pgm, line_num, "              %s %Fp\n",ts,x->e1);
    \
        ljw_qf3(pgm, line_num, "              %s %Fp\n",ts,x->k);
#define   pn2(len,node,x)                                      \
        for (i = 0; i < len; ts[ i++ ] = ' ')   {}             \
        ts[i] = '\0';                                          \
        ljw_qf3(pgm, line_num, "              %s %Fp
\n",node,x);\
        ljw_qf3(pgm, line_num, "              %s %Fp
\n",ts,x->e0);\
        ljw_qf3(pgm, line_num, "              %s %Fp
\n",ts,x->e1);\
        ljw_qf3(pgm, line_num, "              %s %Fp
\n",ts,x->k);
// ------------------------------------------------
#define   pnz0(len,ep)              {                          \
        for (i = 0; i < len; zstring[ i++ ] = ' ')   {}        \
        zstring[i] = '\0';      i--; zstring[i-1] = 'z'; \
            if ( ep )            {                             \
                yarc = (z_right ? y->e1 : y->e0) & f11;  \
                if ( yarc & f10 )                              \
                    {                                          \
                    if ( yarc & f01 )   {  \
/*    There is both another level and a record.     */  \
/*    Display the record pointer.                   */  \
before = (u *)((u)z - SESIZE);                          \
if ((*before) == NULL)    s = NULL;                     \
else s = ((u)before + *before);                         \
    ljw_qf3(pgm, line_num, " %s %Fp\n",zstring,s);      \
                    }                                          \
                    zstring[i] = '|';                          \
```

```
                    pn0(len,zstring,z);                    \
                }                                          \
        else    {                                          \
    ljw_qf3(pgm, line_num, " %s: %Fp\n",zstring,z);   \
                }                                          \
                    }                                      \
            else {                                         \
                zstring[i] = ':';                          \
                pn0(len,zstring,z);                        \
                }                                          \
                                            }
//      ----------------------------------------------------
#define   pnz1(len,ep)                  {                  \
    for (i = 0; i < len; zstring[ i++ ] = ' ')   {}   \
    zstring[i] = '\0';       i--; zstring[i-1] = 'z'; \
        if ( ep )           {                              \
            yarc = (z_right ? y->e1 : y->e0) & f11; \
            if ( yarc & f10 )                              \
                {                                          \
                if ( yarc & f01 )   {                      \
/*    There is both another level and a record.    */ \
/*    Display the record pointer.                  */ \
before = (u *)((u)z - SESIZE);                             \
if ((*before) == NULL)   s = NULL;                         \
else s = ((u)before + *before);                            \
    ljw_qf3(pgm, line_num, "              %s %Fp\n",zstring,s)
;   \
                }                                          \
```

```
                        zstring[i] = '|';                           \
                        pn1(len,zstring,z);                         \
                    }                                               \
                else    {                                           \
    ljw_qf3(pgm, line_num, "              %s: %Fp\n",zstring,z
);\
                    }                                               \
                }                                                   \
            else {                                                  \
                zstring[i] = ':';                                   \
                pn1(len,zstring,z);                                 \
            }                                                       \
                            }
// ----------------------------------------------------
#define    pnz2(len,ep)              {                              \
    for (i = 0; i < len; zstring[ i++ ] = ' ')   {}                 \
    zstring[i] = '\0';       i--; zstring[i-1] = 'z';               \
        if ( ep )            {                                      \
            yarc = (z_right ? y->e1 : y->e0) & f11;                 \
            if ( yarc & f10 ).                                      \
                {                                                   \
                if ( yarc & f01 )   {                               \
/*   There is both another level and a record.      */              \
/*   Display the record pointer.                    */              \
before = (u *)((u)z - SESIZE);                                      \
if ((*before) == NULL)    s = NULL;                                 \
else s = ((u)before + *before);                                     \
ljw_qf3(pgm, line_num, "              %s %Fp\n",z
string,s); \
```

```
                    }                           \
            zstring[i] = '|';                   \
            pn2(len,zstring,z);                 \
                }                               \
        else    {                               \
ljw_qf3(pgm, line_num, "              %s: %Fp\n",
zstring,z);\
                }                               \
            }                                   \
        else {                                  \
            zstring[i] = ':';                   \
            pn2(len,zstring,z);                 \
            }                                   \
        }
//  ---------------------------------------------------
long see_node(char *pgm, int line_num, N *y, N *z, int z_right)
                                        {
    int   lim;        //  The total number of lines in the display.
    int   i;          //  Just a temporary index.
    N     *py;        //  y's predecessor.
    N     *x;         //  y's predecessor.
    u     eop;        //  The end of path flag for z.
    char  leg[4];     //  The two indicators for the left/right status
                      //  of the xy and yz arcs.
    u     v;          //  The arc field.
    char  ts[16];     //  A temporary work area for strings.
    char  zstring[16]; // The string to hold the "z" description.
    u     *before;    //  The pointer to the data pointer arc,
```

```
                    //   if there is one.
u   s;              //   The data pointer arc.
u   yarc;           //   The y-arc that goes to z.
//  The leg argument contains two bytes, which are
//  "<" or ">" symbols.
//  The first symbol is "<" is the arc xy is a right arc,
//  or is a ">" if the arc xy is a left arc.
//  Similarly, the second symbol is a "<" if the arc yz is a
//  right arc, or is a ">" if yz is a left arc.
ljw_q0(pgm, line_num);
//  printf("z_right = %d\n",z_right);
leg[1] = (z_right ? '<' : '>');
    x = (N *)(((u)z) - ((leg[1] == '>') ?
            (y->e0 & M4) : (y->e1 & M4)));
    v = ((x->k > y->k) ?((leg[0] = '>'), x->e0)
                :    ((x == y) ?    ((leg[0] = '='), x->B)
                                :((leg[0] = '<'), x->e1)));
    eop = (v & ((leg[1] == '>') ? f10 : f01));
if (leg[0] == '<')                              {
    if (leg[1] == '<')                          {
        pn0(2,"x:",x); pn1(2,"y:",y); pnz2(2,eop);
                                                }
    else                                        {
        pn0(2,"x:",x); pn1(2,"y:",y); pnz0(2,eop);
                                                }   }
else if (leg[0] == '>')                         {
    if (leg[1] == '<')                          {
        pn1(2,"x:",x); pn0(2,"y:",y); pnz1(2,eop);
```

```
                                          }
        else                              {
            pn2(2,"x:",x);  pn1(2,"y:",y);  pnz2(2,eop);
                                          }   }
//      -------------
//      leg[0] = '='
//      -------------
    else if (leg[1] == '>')               {
            pn1(6,"x = y!",x);   pnz0(6,eop);
                                          }
        else /*   leg[1] == '<'   */      {
            pn0(6,"x = y!",x);   pnz1(6,eop);
                                          }
    if (y->node != NODE)        {
        printf("The node y is invalid.\n");
        printf("Returning ljw_failure.\n");
#ifdef   DEBUG
printf("ljw_ctr = %ld\n",ljw_ctr);
#endif
        return(ljw_failure);
                                }
    return(ljw_ok);
                                                              }

//      --------------------------------------------------------
//      The see_node3 function, to display nodes in a binary
//      tree.
//      --------------------------------------------------------
```

```
#undef    pn0
#undef    pn1
#undef    pn2
#undef    pnz0
#undef    pnz1
#undef    pnz2
#define   pn0(len,node,x)                                        \
    for (i = 0; i < len; ts[ i++ ] = ' ')    {}    \
    ts[i] = '\0';                                  \
    ljw_qf3(pgm, line_num," %s: %Fp\n",node,x);    \
    ljw_qf3(pgm, line_num, " %s %Fp\n",ts,x->e0);  \
    ljw_qf3(pgm, line_num, " %s %Fp\n",ts,x->e1);  \
    ljw_qf3(pgm, line_num, " %s %Fp\n",ts,x->k);
#define   pn1(len,node,x)                                        \
    for (i = 0; i < len; ts[ i++ ] = ' ')    {}    \
    ts[i] = '\0';                                  \
    ljw_qf3(pgm, line_num, "                      %s: %Fp\n",node,x);  \
    ljw_qf3(pgm, line_num, "                      %s %Fp\n",ts,x->e0); \
    ljw_qf3(pgm, line_num, "                      %s %Fp\n",ts,x->e1); \
    ljw_qf3(pgm, line_num, "                      %s %Fp\n",ts,x->k);
#define   pn2(len,node,x)                                        \
    for (i = 0; i < len; ts[ i++ ] = ' ')    {}    \
    ts[i] = '\0';                                  \
    ljw_qf3(pgm, line_num, "                                          %s: %Fp\n",node,x);\
    ljw_qf3(pgm, line_num, "                                          %s %Fp\n",ts,x->e0);\
    ljw_qf3(pgm, line_num, "                                          %s %Fp
```

```
\n",ts,x->e1);\
        ljw_qf3(pgm, line_num, "                              %s %Fp
\n",ts,x->k);
#define    pnz0(len,str)                  {               \
        py = (N *)(((u)z) - ((leg[1] == '>') ?  \
                  (y->e0 & M4) : (y->e1 & M4)));\
        v = ((py->k > y->k) ?     (py->e0)           \
                            :     ((py == y)    ?    (py->B)
  \
                                              :    (py->e1))
);    \
        if (v & ((leg[1] == '>') ? f10 : f01))   \
                            {                          \
    ljw_qf3(pgm, line_num, " %s: %Fp\n",str,z);   \
                            }                          \
                    else    {                          \
                       pn0(len,str,z);                 \
                            }                          \
                                        }
#define    pnz1(len,str)                  {               \
        py = (N *)(((u)z) - ((leg[1] == '>') ?  \
                  (y->e0 & M4) : (y->e1 & M4)));      \
        v = ((py->k > y->k) ?     (py->e0)           \
                            :     ((py == y)    ?    (py->B)
  \
                                              :    (py->e1))
);    \
        if (v & ((leg[1] == '>') ? f10 : f01))   \
                            {                          \
    ljw_qf3(pgm, line_num, "                   %s: %Fp\n",str,z);
  \
```

```
                        }                       \
            else        {                       \
                pn1(len,str,z);                 \
                        }                       \
                                }
#define    pnz2(len,str)                {       \
        py = (N *)(((u)z) - ((leg[1] == '>') ?  \
                (y->e0 & M4) : (y->e1 & M4)));  \
        v = ((py->k > y->k) ?    (py->e0)       \
                            :   ((py == y)  ?   (py->B)
 \
                                            :   (py->e1))
);  \
        if (v & ((leg[1] == '>') ? f10 : f01))  \
                        {                       \
    ljw_qf3(pgm, line_num, "                            %s: %F
p\n",str,z);\
                        }                       \
            else        {                       \
                pn2(len,str,z);                 \
                        }                       \
                                }
void see_node3(char *pgm, int line_num, char *leg, N *x, N *y, N
*z)
                                                    {
int    lim;        //  The total number of lines in the display.
int    i;          //  Just a temporary index.
N      *py;        //  y's predecessor.
u      v;          //  The arc field.
char   ts[64];     //  A temporary work area for strings.
```

```
//    The leg argument contains two bytes, which are
//    "<" or ">" symbols.
//    The first symbol is "<" is the arc xy is a right arc,
//    or is a ">" if the arc xy is a left arc.
//    Similarly, the second symbol is a "<" if the arc yz is a
//    right arc, or is a ">" if yz is a left arc.
ljw_q0(pgm, line_num);
if (leg[0] == '<')                                   {
    if (leg[1] == '<')                               {
        pn0(5,"x",x);   pn1(5,"y",y);   pnz2(5,"z");
                                                     }
    else                                             {
        pn0(5,"x",x);   pn1(5,"y",y);   pnz0(5,"z");
                                                     }   }
else if (leg[0] == '>')                              {
    if (leg[1] == '<')                               {
        pn1(5,"x",x);   pn0(5,"y",y);   pnz1(5,"z");
                                                     }
    else                                             {
        pn2(5,"x",x);   pn1(5,"y",y);   pnz2(5,"z");
                                                     }   }
//    --------------
//    leg[0] = '='
//    --------------
else if (leg[1] == '>')                              {
        pn1(7,"x = y",x);   pnz0(7,"    z");
                                                     }
    else /*   leg[1] == '<'   */                     {
```

```
                    pn0(7,"x = y",x);    pnz1(7,"    z");
                                                        } return;

}
```

APPENDIX U -- SIG_BITS

```
//    The sig_bits.h file.
//    Copyright (c) LJW March 1992.
#ifndef    SIG_BITS_H
#define    SIG_BITS_H
    #ifndef   sig_bits
    //   The sig_bits function, to find the number of significant bits
    //   in a long unsigned number.
    //   sig_bits(n) is equal to the ceiling of the log2(n).
    //   The type of the result is unsigned char.
         extern    unsigned char  sig_bit[];
    #define   sig_bits(n)                                                 \
    ( n > 65535 ? ((n > 16777215) ? (sig_bit[n >> 24] + 24 )               \
                                  : (sig_bit[(n >> 16) & 255] + 16))      \
                : ((n > 255)      ? (sig_bit[(n >> 8) & 255] +8           \
                                  : (sig_bit[n & 255] )))
    #endif ifndef   sig_bytes
    //   The sig_bytes function, to find the number of significant bytes
    //   in a long unsigned number.
    //   sig_bytes(n) is equal to the ceiling of the log256(n).
```

```
//    The type of the result is unsigned char.
#define   sig_bytes(n)                                    \
( n > 65535 ? ((n > 16777215) ? 4  :     3)               \
          : ((n > 255)       ? 2  :    (n != 0L)))
#endif
```
endif

//23456789 123456789 123456789 123456789 123456789 12345678

APPENDIX V -- C2W

```
        #ifndef    c2w define    c2w(key, i, ct )
        \

\

/*      Copyright (c) 1989,       */
        \

/*      by Luther J. Woodrum      */
        \

/*      All rights reserved.      */
        \

/*      April 29, 1989.           */
        \

\

/*      Given the pointer key to a character string,
        */   \

/*      an index i to a byte in the character string,
        */   \

/*      and a number of bytes, ct, in the character string,
        */   \

/*      C2W computes a 32-bit unsigned numbr.
        */   \

/*      The number is formed by taking the ytes starting at k[i]
        */   \

/*      and continuing with k[i+1], etc., until either 4 bytes have
        */   \

/*      been accessed or until i=ct-1 and byte k[ct-1] has been acc
essed.*/   \

/*      The accessed bytes are then used as the bytes of the unsign
ed      */   \
```

305

```
/*    32-bit number, where the first byte accessed is the high order    */  \

/*    byte of the number, the second byte accessed is the next to       */  \

/*    high order byte of the number, etc., and the last byte accessed   */  \

/*    is the low order byte of the number.                              */  \

/*                                                                      */  \

/*    This function is not needed except on machines that store numbers */  \

/*    in memory with the low order bytes in lower memory addresses      */  \

/*    than the high order bytes. The INTEL architecture is a prime      */  \

/*    example of this sort of rot.                                      */  \

\

\

\

\

\

(i+4 <= ct    ?    (key << 24) + ((key & 65280L) << 8)              \

+ ((key >> 8) & 65280L) +   (key >> 24)  :\

\

(i+3 <= ct    ?    (key << 24) + ((key & 65280L) << 8)              \

+ ((key >> 8) & 65280L)               :\
```

```
         \
         (i+2 <= ct    ?    (key << 24) + ((key & 65280L) << 8)
    :    \

\
         (i+1 <= ct    ?    (key << 24)    :    0L   )
         \
                                                                          )
         \
)    \

)

#endif
```

What is claimed is:

1. A method for sorting three keys into two sets, comprising the steps of
computing the three exclusive-OR differences or similarities in values between each of three pairs of keys,
comparing for value the differences or similarities to each other, outputs of said comparing steps thereby determining according to a prescribed rule
a partition of the three keys into said two sets in which every key in one set is lexicographically greater than every key in the other set.

2. A method for sorting a set of three keys into two sets according to claim 1 wherein said prescribed rule comprises the steps of
selecting the minimum of said differences or the maximum of said similarities,
thereby grouping two of said keys having said smallest difference or maximum similarity in a first set and the third said key in a second set.

3. A method for sorting three character-string keys into a first set and a second set in which every key in one set is lexicographically either less or greater as the choice may be than every key in the other set,
said first set containing two of the keys and said second set containing the third remaining key,
comprising the steps of
computing the three exclusive-OR differences between each pair of keys,
comparing the three differences to each other to determine the pair of said keys having the smallest difference,
whereupon said pair of said keys having said smallest difference are assigned to said first set and the remaining key is assigned to said second set.

4. A system for computing three output signals from a new key, a low key, and a high key, said keys being character-strings, said three output signals forming part of a control logic controlling a locating step in a binary tree containing keys in lexicographical order, said system comprising a mask for determining the highest order bit position where the corresponding bits in the three keys or key words are not all equal, and means for mask determined key bits then determining the relationship between the new key and the other two keys.

5. In a system for sorting a new and two lexicographically-ordered character-string keys into two sets in which every key in one set is lexicographically greater than every key in the other set; means for simultaneously generating signals representative of the exclusive-or difference or similarity of the value of each key with respect to the other, and means for grouping according to its value the new key with the low or the high key or by itself.

6. In a system for sorting a new key and lexicographically-ordered character two, into two sets; first, second and third means for exclusive-ORing the new and the low keys, the new and the high keys, and the low and the high keys, respectively; and first, second and third means for comparing the outputs of the first and second exclusive-ORing means, of the first and third exclusive-ORing means, and of the second and third exclusive-ORing means, respectively, to develop output signals determining the partitioning the three keys into two sets.

7. In a system for sorting a new key and lexicographically-ordered character two keys, into two sets: first, second and third means for NANDING the new and the low and the high keys, for exclusive-ORing the new and the low and the high keys, and for ANDing the output of the first and second means; and first, second and third means for ANDing the output of the third means, with the respective of the new, low and high keys, to develop output signals determining the partitioning the three keys into two sets.

8. A method for sorting a set of character-string keys into two sets, a low set and a high set, where each of said keys in said low set is numerically or lexicographically smaller than each of said keys in said high set, comprising:
mask computation steps including:
preliminary steps of:
ORing all keys together to form an ORed value, and ANDing all keys together to form an ANDed value,
subtracting or XORing said ANDed value output of said preliminary steps with or from said ORed value output of said preliminary steps to form an intermediate result from which a mask may be computed, and
computing from said intermediate result a mask containing all zero bits if said keys used to form said mask are equal and if not equal then all zero bits except a one in the bit position corresponding to the highest order one-bit in said intermediate result;
and a partitioning step ANDing said mask with each of said keys and a zero result assigns a key to a low set and a non-zero result assigns the key to a high set,
where as a consequence all of said keys is said low set are numerically or lexicographically less than any key in said high set.

9. A method according to claim 8, wherein each partitioning step examines only a portion of said keys corresponding to an arbitrary word size, said partitioning steps being performed first using only the first word of each of said keys until sets of keys containing only equal first words are obtained, then using each subsequent word of said words in said keys for further partitioning, thereby providing a sorting method using only word operations to sort keys longer than a word, said word operations being capable of being performed much faster than operations operating on all bits of said keys.

10. A method according to claim 8, further comprising the steps of:
setting at the beginning of every-set partitioning with all zeros as an initial value the ORed result and with all ones as an initial value the ANDed result,
performing separately said intermediate ORed and ANDed result computation steps to the keys of the low set to obtain a low set pair intermediate ORed and ANDed results and performing separately said intermediate ORed and ANDed result computation steps to the keys of the high set to obtain a high set pair of ORed and ANDed result;
said computation of said ANDed and said ORed intermediate results of said partitioning step for said keys in both said low and said high sets being effected by means of a single AND and a single OR for each said key in either said high or said low set, said single AND and said single OR being performed concurrently with said partitioning step; when all keys have been partitioned, computing a mask for further partitioning said low set and computing a mask for further partitioning said high set from said ANDed and ORed intermediate results for said low and high sets respectively; and
applying said partitioning step again recursively to said high or said low sets, until only sets containing only equal keys obtain;
thus providing computation of said ANDed and said ORed intermediate results in advance of the actual partitioning use of them while partitioning each said set of keys into a low and a high set, resulting in a sorted set or keys.

11. A method according to claim 10, wherein said partitioning steps are being performed independently on each of said high and said low sets, thereby providing a sorting method capable of sorting a number of keys in a time equal to or less than a constant multiple of the number of bits in the longest of any said keys.

12. A system for computing three output signals from a new key, a low and high key, said keys being character-strings said three output signals forming part of a control logic controlling a locating step in lexicographically-ordered binary tree, said system comprising a bitwise parallel NAND function of three input words, a bitwise parallel OR function of three input words, five bitwise parallel AND functions of two input words, two BIT REVERSAL functions accepting an input word and making available an output equal to said input word with the bits in said input word reversed from low order to high order, a twos complementer having an input word and an output word which is the twos complement of said input word, and three funnel OR logic functions, each having a word of input and a single output bit signal, said output signal having a value of one if any of the bits in said input word has a value of one.

13. A method for controlling the steps of a locating procedure operating on a selected node of a binary tree in response to an input key, said selected node having stored fields, said binary tree node providing a partition of a set of stored keys sorted into a low set and a high set in which every key in one set is lexicographically greater than every key in the other set, said stored fields enabling access of a low key and a high key for any node, said low key being the lowest of all of said keys in said low set, said high key being the lowest of all said keys in said high set, said low set containing only keys less than said high key, said high set containing only keys less than said high key, said selected node providing pointers to a low node and a high node for partitioning said low and said high sets respectively, said locating procedure comprising the steps of selecting said low node as a next node or selecting said high node as a next node or retaining said selected node as the output of said locating procedure, said controlling method comprising the steps of computing the exclusive-OR difference between said low key and said high key, computing the exclusive-OR difference between said input key and said low key, computing the exclusive-OR difference between said input key and said high key, determining which of the three said differences is numerically smallest, if said difference between said input key and said low key is said smallest difference then said selecting low node step in said locating procedure is executed, if said difference between said input key and said high key is said smallest difference then said selecting high node step in said locating procedure is executed, if said difference between said low key and said high key is said smallest difference then said retaining said selected node step in said locating procedure is executed whereupon said locating procedure terminates, said locating procedure steps and control being repeated until said locating procedure terminates, whereupon said selected node is the output of said locating procedure.

14. A method for controlling the steps of a locating procedure operating on a selected node of a binary tree in response to an input key, said selected node having stored fields, said binary tree node providing a partition of a set of stored keys sorted into a low set and a high set in which every key in one set is lexicographically either less or greater as the choice may be than every key in the other set, said stored fields enabling access of a low key and a high key for any node, said low key being the lowest of all of said keys in said low set, said high key being the lowest of all of said keys in said high set, said low set containing only keys less than said high key, said high set containing only keys not less than said high key, said selected node providing pointers to a low node and a high node for partitioning said low and said high sets respectively, said locating procedure comprising the steps of selecting said low node as a next node or selecting said high node as a next node or retaining said selected node as the output of said locating procedure, said controlling method comprising the steps of computing the exclusive-OR difference between said low key and said high key, computing the exclusive-OR difference between said input key and said low key, computing the exclusive-OR difference between said input key and said high key, determining which of three said differences is numerically smallest.

15. In a system for computing a minimal difference, compare function of three input character-string words NEW, LOW, and HIGH, and having four output signals enabling the three words NEW, LOW, AND HIGH to be sorted into two sets, each said input word comprising an unsigned binary value, said LOW input word having been predetermined to be numerically less than said HIGH input word, said system for computing a minimal difference compare function comprising means for gating said NEW and LOW inputs to a first exclusive-OR mechanism, means for gating said NEW and said HIGH inputs to a second exclusive-OR mechanism, means for gating said LOW and HIGH inputs to a third exclusive mechanism, means for gating said output of said first exclusive-OR mechanism to a first input of a first comparing mechanism, means for gating said output of said second exclusive-OR mechanism to a second input of said first comparing mechanism, means for gating said output of said first exclusive-OR mechanism to a first input of a second comparing mechanism, means for gating said output of said third exclusive-OR mechanism to a second input of said second comparing mechanism, means for gating said output of said second exclusive-OR mechanism to a first input of a third comparing mechanism, means for gating said output of said third exclusive-OR mechanism to a second input of said third comparing mechanism, means for gating said NEW input to a first input of a fourth comparing mechanism, and means for gating said LOW input to a second input of said fourth comparing mechanism, said comparing mechanisms outputting signals for sorting the three words into two sets.

16. A system according to claim 15, wherein means for gating said LESS output signal from said first comparing mechanism signal to a first input signal of a first AND logic mechanism, means for gating said LESS output signal from said second comparing mechanism to a first input of a second AND logic mechanism, means for gating said GREATER output signal from said first comparing mechanism to a first input of a third AND logic mechanism, means for goring said LESS output signal from said third comparing mechanism to a second input of said first AND logic mechanism, means for gating said LESS output signal from said third comparing mechanism to a second input of said third AND logic mechanism, means for goring said GREATER output signal from said second comparing mechanism to a first input of a fourth AND logic mechanism, means for gating said GREATER output signal from said second comparing mechanism to a first input of a fifth AND logic mechanism, means for gating said GREATER output signal from said third comparing mechanism to a second input of said second AND logic mechanism, means for gating said GREATER output signal from said third comparing mechanism to a second input of said fourth AND logic mechanism, means for gating said GREATER output signal from said third comparing mechanism to a second input of said fifth AND logic mechanism, means for gating an output signal of said first AND logic mechanisms to a first input of a first OR logic mechanism, means for gating an output signal of said second AND logic mechanism to a second input of said first OR logic mechanism, means for gating said LESS outputs signal from said fourth comparing mechanism to a third input of said fourth AND logic mechanism, and means for gating said GREATER output signal of said fourth comparing mechanism to a third input of said fifth AND logic mechanism.

17. A system for computing three output signals from a new key, a low key, and a high key, said three output signals forming part of a control logic controlling a locating step in a binary tree, said system comprising a bitwise parallel NAND function of three input words, a bitwise parallel OR function of three input words, five bitwise parallel AND functions of two input words, two BIT REVERSAL functions accepting an input word and making available an output equal to said input word with the bits in said input word reversed from low order to high order, a twos complementer having an input word and an output word which is the twos complement of said input word, three funnel OR logic functions, each having a word of input and a single output bit signal, said output signal having a value of one if any of the bits in said input word has a value of one, said new key, said low key, and said high key providing three words of input, said new key input being gated to said NAND logic mechanism as a first word of input, said low key input word being gated to said NAND logic mechanism as a second word of input, said high key input word being gated to said NAND logic mechanism as a third word of input, said new key input being gated to said OR logic mechanism as a first word of input, said low key input word being gated to said OR logic mechanism as a second word of input, said high key input word being gated to said OR logic mechanism as a third word of input, output word of said NAND logic mechanism being gated to said first AND logic mechanism as a first input word, output word of said OR logic mechanism being gated to said first AND logic mechanism as a second input word, output word of said first AND logic mechanism being gated through said first said bit reversal mechanism, output word of said first bit reversal logic mechanism being gated as an input word to said twos complementer logic mechanism, output of said twos complementer logic mechanism being gated as an input word to said second bit reversal logic mechanism, output of said second bit reversal logic mechanism being gated as a first input word to said second AND logic mechanism, output of said first AND logic mechanism being gated as a second input word to second said AND logic mechanism, output of said second AND logic mechanism being gated as a first word of input to said third AND logic mechanism, as a first word of input to said fourth AND logic mechanism, and as a first word of input to said fifth AND logic mechanism, said new input key being gated to said third AND logic mechanism as a second word of input, said low input key being gated to said fourth AND logic mechanism as a second word of input, said high input key being gated to said fifth AND logic mechanism as a second word of input, output of said third AND logic mechanism being gated to said first funnel OR logic mechanism, output of said fourth AND logic mechanism being gated to said second funnel OR logic mechanism, output of said fifth AND logic mechanism being gated to said third funnel OR logic mechanism, output of said first funnel OR logic mechanism providing an output signal S1, output of said second funnel OR logic mechanism providing an output signal S2, output of said third funnel OR logic mechanism providing an output signal S3, said output signals S1, S2, and S3 comprising control signals for controlling a locating step in a binary tree.

18. A system for computing a minimal difference compare function of three input words NEW, LOW, and HIGH, and having four output signals, each said input word comprising an unsigned binary value, said LOW input word having been predetermined to be numerically less than said HIGH input word, said system for computing a minimal difference compare function comprising: means for gating said NEW and LOW inputs to a first parallel exclusive-OR mechanism, means for gating said NEW and said HIGH inputs to a second parallel exclusive-OR mechanism, means for gating said LOW and HIGH inputs to a third exclusive-OR mechanism, each said exclusive-OR mechanism comprising means for forming the parallel exclusive-OR of corresponding bits from said inputs to form an output comprising exactly the same number of bits as each said input, means for gating said output of said first exclusive-OR mechanism to a first input of a first comparing mechanism, means for gating said output of said second exclusive-OR mechanism to a second input of said first comparing mechanism, means for gating said output of said first exclusive-OR mechanism to a first input of a second comparing mechanism, means for gating said output of said third exclusive-OR mechanism to a second input of said second comparing mechanism, means for gating said output of said second exclusive-OR mechanism to a first input of a third comparing mechanism, means for gating said output of said third exclusive-OR mechanism to a second input of said third comparing mechanism, means for gating said NEW input to a first input of a fourth comparing mechanism, means for gating said LOW input to a second input of said fourth comparing mechanism, each said comparing mechanism comprising means for comparing each said first comparing mechanism input to each said second comparing mechanism input as unsigned binary numbers, each said comparing mechanism thereby generating three output signals LESS, EQUAL, and GREATER, activating said LESS output signal if said first input of said each comparing mechanism is less than said second input of said each comparing mechanism, activating said EQUAL output signal if said first input of said each comparing mechanism is equal to said second input of said each comparing mechanism input, activating said GREATER output signal if said first input to said each comparing mechanism is greater than said second input to said each comparing mechanism, means for gating said LESS output signal from said first comparing mechanism signal to a first input signal of a first AND logic mechanism, means for gating said LESS output signal from said second comparing mechanism to a first input of a second AND logic mechanism, means for gating said GREATER output signal from said first comparing mechanism to a first input of a third AND logic mechanism, means for gating said LESS output signal from said third comparing mechanism to a second input of said first AND logic mechanism, means for gating said LESS output signal from said third comparing mechanism to a second input of said third AND logic mechanism, means for gating said GREATER output signal from said second comparing mechanism to a first input of a fourth AND logic mechanism, means for gating said GREATER output signal from said second comparing mechanism to a first input of a fifth AND logic mechanism, means for gating said GREATER output signal from said third comparing mechanism to a second input of said second AND logic mechanism, means for gating said GREATER output signal from said third comparing mechanism to a second input of said fourth AND logic mechanism, means for gating said GREATER output signal from said third comparing mechanism to a second input of said fifth AND logic mechanism, means for gating an output signal of said first AND logic mechanisms to a first input of a first OR logic mechanism, means for gating an output signal of said second AND logic mechanism to a second input of said first OR logic mechanism, means for gating said LESS output signal from said fourth comparing mechanism to a third input of said fourth AND logic mechanism, means for gating said GREATER output signal of said fourth comparing mechanism to a third input of said fifth AND logic mechanism, whereupon said first OR mechanism provides an output signal representing the fact that said NEW input word is associated with words like said LOW word, said third AND logic mechanism output signal representing the fact that said NEW word is associated with words like said HIGH word, said fourth AND logic mechanism providing an output signalling that said NEW word is numerically smaller than said LOW word and numerically smaller than said HIGH word and the insertion point is determined, said fifth AND logic mechanism providing an output signalling that the insert edge has been found and said NEW word is numerically higher than both said LOW word and said HIGH word, whereupon all of above said mechanisms and means provide four output signals of said minimal difference comparing mechanism, said four output signals comprising said output signal of said first OR logic mechanism, said output signal of said third AND logic mechanism, said output signal of said fourth AND logic mechanism, and said output signal of said fifth AND logic mechanism, said output signals providing control signals for a binary tree locating step, wherein said output of said first OR logic mechanism providing a control signal directing said locating step to process nodes in a low subtree of a selected node, said output of said third AND logic mechanism providing a control signal directing said locating step to process nodes in a high subtree of said selected node, said output of said fourth AND logic mechanism providing a control signal directing said locating step to terminate with a signal indicating an insertion is to be performed on an edge in said binary tree where said NEW data number is a low successor of a new insertion node, said output of said fifth AND logic mechanism providing a control signal to said locating step to terminate with a signal indicating an insertion is to be performed on an edge going to said selected node where said NEW data number is a high successor of said new node.

* * * * *